(12) United States Patent
Tazume

(10) Patent No.: US 11,995,928 B2
(45) Date of Patent: May 28, 2024

(54) CONTROL DEVICE, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 391 days.

(21) Appl. No.: 17/418,031

(22) PCT Filed: Apr. 30, 2020

(86) PCT No.: PCT/JP2020/018270
§ 371 (c)(1),
(2) Date: Jun. 24, 2021

(87) PCT Pub. No.: WO2021/220462
PCT Pub. Date: Nov. 4, 2021

(65) Prior Publication Data
US 2022/0335758 A1    Oct. 20, 2022

(51) Int. Cl.
*G07C 9/00*   (2020.01)
*G05B 15/02*  (2006.01)

(52) U.S. Cl.
CPC ......... *G07C 9/00309* (2013.01); *G05B 15/02* (2013.01); *G07C 9/00896* (2013.01)

(58) Field of Classification Search
CPC . G07C 9/00309; G07C 9/00896; G05B 15/02
See application file for complete search history.

(56) References Cited

U.S. PATENT DOCUMENTS

| 5,983,202 A   | * | 11/1999 | Yabe    | G06Q 10/087 |
|               |   |         |         | 705/28      |
| 2002/0116289 A1 | * | 8/2002  | Yang    | G06Q 10/08  |
|               |   |         |         | 705/26.81   |
| 2006/0237427 A1 | * | 10/2006 | Logan   | G07C 9/37   |
|               |   |         |         | 219/401     |
| 2010/0005391 A1 | * | 1/2010  | Fukuda  | G06F 21/36  |
|               |   |         |         | 715/708     |
| 2012/0251077 A1 | * | 10/2012 | Stewart | H04N 5/913  |
|               |   |         |         | 386/253     |
| 2015/0199857 A1 | * | 7/2015  | Mackin  | G07C 9/00896 |
|               |   |         |         | 340/5.26    |

(Continued)

FOREIGN PATENT DOCUMENTS

CN    204614080 U  *  9/2015
CN    204614080 U     9/2015

(Continued)

OTHER PUBLICATIONS

International Search Report for PCT/JP2020/018270 dated Sep. 24, 2020 (PCT/ISA/210).

*Primary Examiner* — Chico A Foxx
(74) *Attorney, Agent, or Firm* — Sughrue Mion, PLLC

(57) ABSTRACT

A control device (100) controls a locker that includes a storage unit that stores an article. Additionally, the control device (100) includes a forbidder (160) that forbids unlocking of the storage unit in at least one of a case in which content associated with the article has not been watched, a case in which the content has not been listened to, or a case in which the content has neither been watched nor listened to by a user that performs an operation for unlocking the storage unit.

17 Claims, 30 Drawing Sheets

(56) References Cited

U.S. PATENT DOCUMENTS

| | | | | |
|---|---|---|---|---|
| 2015/0348032 A1* | 12/2015 | Ioveva | ............... | G06Q 20/2295 |
| | | | | 705/44 |
| 2015/0371468 A1* | 12/2015 | Mackin | .............. | G06Q 10/0836 |
| | | | | 340/5.26 |
| 2018/0033235 A1* | 2/2018 | Dotterweich | ........... | G07F 17/12 |
| 2020/0250614 A1* | 8/2020 | Zhu | .................... | G06Q 10/0836 |
| 2020/0327759 A1* | 10/2020 | Neiman | .................. | G07C 9/28 |
| 2020/0402336 A1* | 12/2020 | Levy | ................. | G07C 9/00817 |
| 2021/0005038 A1* | 1/2021 | McCombs | ......... | G06Q 10/0631 |
| 2021/0272048 A1* | 9/2021 | Tazume | ............... | G06Q 10/083 |

FOREIGN PATENT DOCUMENTS

| | | | | |
|---|---|---|---|---|
| CN | 107255941 A | * | 10/2017 | ............. G05B 19/04 |
| CN | 107255941 A | | 10/2017 | |
| JP | 2002-373288 A | | 12/2002 | |
| JP | 2016-95782 A | | 5/2016 | |

* cited by examiner

FIG. 4

| DELIVERY TABLE | | | | | |
|---|---|---|---|---|---|
| DELIVERY ID | DELIVERY INFORMATION | | | | |
| | ARTICLE ID | USER ID | ADDRESS | LOCKER ID | STORAGE UNIT ID |
| D1 | G1 | U1 | ... | 500 | NULL |
| D2 | G2 | U1 | ... | 500 | NULL |
| D3 | G3 | U3 | ... | ... | ... |
| ... | ... | ... | ... | ... | ... |

FIG. 6

CONTENT TABLE

| ARTICLE ID | CONTENT ID |
|---|---|
| G1 | ./C1.mpg |
| G3 | ./C3.mpg |
| ... | ... |

FIG. 7

VIEWING TABLE

| CONTENT ID | USER ID OF VIEWER |
|---|---|
| ./C1.mpg | U11 |
| ./C1.mpg | U12 |
| ./C1.mpg | U13 |
| ... | ... |
| ./C3.mpg | G31 |
| ... | ... |

FIG. 11

STORAGE TABLE

| STORAGE UNIT ID | PASSWORD |
|---|---|
| S1 | NULL |
| S2 | NULL |
| S3 | ***** |
| ... | ... |
| S8 | ***** |

FIG. 18

QUESTION TABLE

| CONTENT ID | QUESTION | CORRECT ANSWER |
|---|---|---|
| ./C1.mpg | ... | ... |
| ./C2.mpg | ... | ... |
| ./C3.mpg | ... | ... |
| ... | ... | ... |

FIG. 26

CONTENT TABLE

| ARTICLE ID | ARTICLE ID | CONTENT ID |
|---|---|---|
| G1 | G2 | ./C12.mpg |
| G1 | G3 | ./C13.mpg |
| ... | ... | ... |
| G2 | G3 | ./C23.mpg |
| ... | ... | ... |

FIG. 29

CHANGE INFORMATION TABLE

| CONTENT ID | CHANGE INFORMATION ||
|---|---|---|
| | PLAYBACK TIME | CHANGE DIRECTION |
| ./C1.mpg | 30 SECONDS | DOWN |
| ./C3.mpg | 1 MINUTE | RIGHT |
| ... | ... | ... |

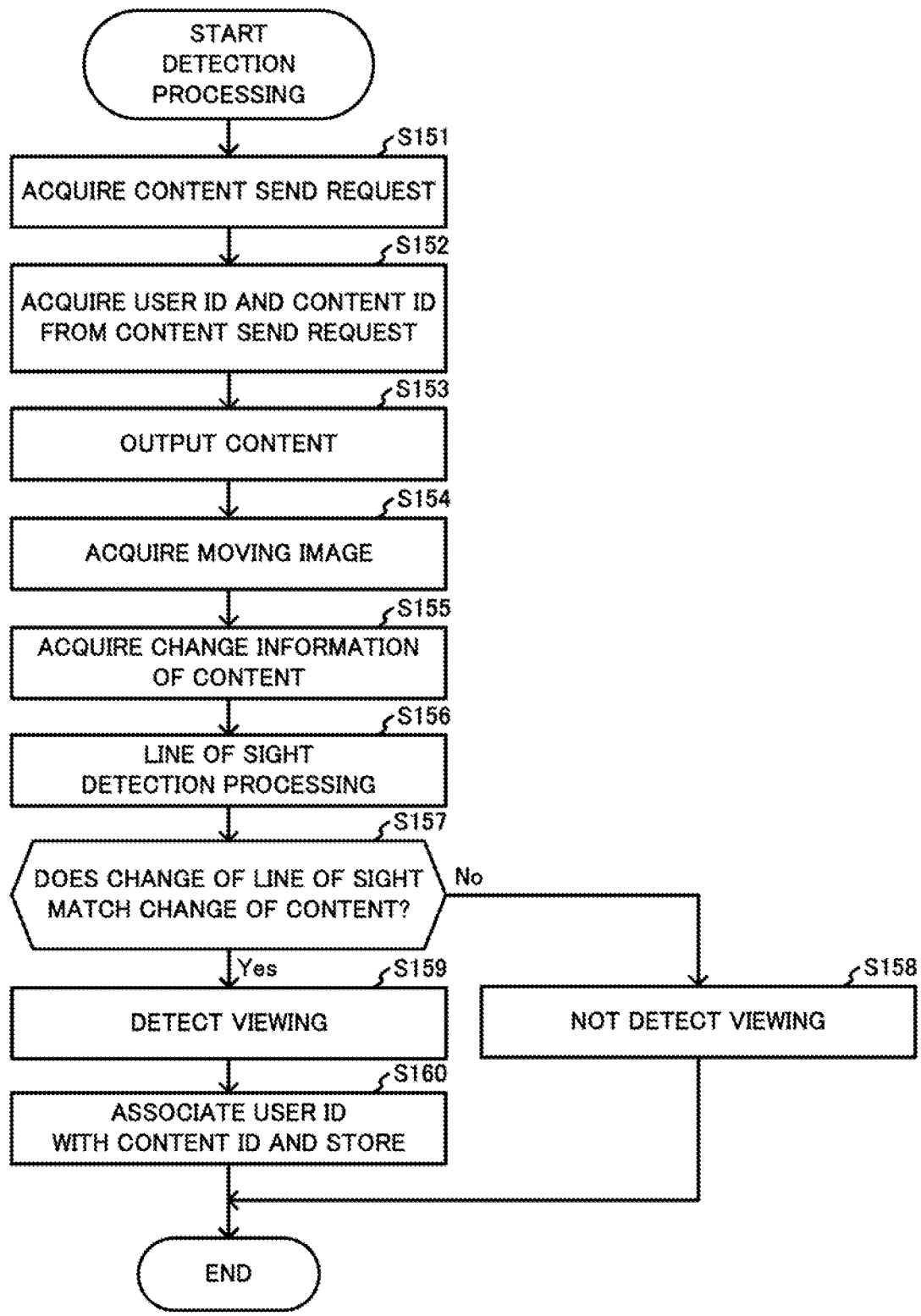

CONTROL DEVICE, SYSTEM, AND METHOD

CROSS REFERENCE TO RELATED APPLICATIONS

This application is a National Stage of International Application No. PCT/JP2020/018270 filed Apr. 30, 2020.

TECHNICAL FIELD

The present disclosure relates to a control device, a system, and a method.

BACKGROUND ART

In the related art, a method is known in which content including a questionnaire is sent to a terminal device carried by a user of a locker and, thereafter, the locker is unlocked when an answer to the questionnaire is received from the terminal device (for example, Patent Literature 1).

CITATION LIST

Patent Literature

Patent Literature 1: Unexamined Japanese Patent Application Publication No. 2002-373288

SUMMARY OF INVENTION

Technical Problem

However, in the method of Patent Literature 1, simple receipt of an answer results in the locker being unlocked. Consequently, for example, even when the sent content is content associated with an article, such as content explaining a precaution related to the article stored in the locker, there is a problem in that, in the method of Patent Literature 1, the locker is unlocked in at least one of the case in which the user has not watched, the case in which the user has not listened to, or the case in which the user has neither watched nor listened to the content.

The present disclosure is made with the view of the above situation, and an objective of the present disclosure is to provide a control device, a system, and a method whereby unlocking of a locker storing an article can be forbidden in at least one of the case in which content associated with that article has not been watched, the case in which the content has not been listened to, or the case in which the content has neither been watched nor listened to by the user.

Solution to Problem

A control device according to a first aspect of the present disclosure that achieves the objective described above controls a locker including a storage unit that stores an article, the control device comprising:
- a forbidder that forbids unlocking of the storage unit in at least one of a case in which content associated with the article has not been watched, a case in which the content has not been listened to, or a case in which the content has neither been watched nor listened to by a user that performs an operation for unlocking the storage unit.

Advantageous Effects of Invention

According to the control device, the system, and the method according to the present disclosure, unlocking of a locker storing an article can be forbidden in at least one of the case in which the user has not watched, the case in which the user has not listened to, or the case in which the user has neither watched nor listened to content associated with that article.

BRIEF DESCRIPTION OF DRAWINGS

FIG. 4 is a drawing illustrating an example of a delivery table stored in the control device of the storage system;

FIG. 6 is a drawing illustrating an example of a content table stored in the control device of the storage system according to Embodiment 1;

FIG. 7 is a drawing illustrating an example of a viewing table stored in the control device of the storage system;

FIG. 11 is a drawing illustrating an example of a storage table stored in the control device of the locker;

FIG. 18 is a drawing illustrating an example of a question table stored in the control device of the storage system;

FIG. 26 is a drawing illustrating an example of a content table stored in a control device of a storage system according to Embodiment 3;

FIG. 29 is a drawing illustrating an example of a change information table stored in the control device of the storage system; and FIG. 30 is a flowchart illustrating an example of detection processing executed by a control device of a storage system according to Embodiment 4.

DESCRIPTION OF EMBODIMENTS

Embodiment 1

Hereinafter, embodiments of the present disclosure are described while referencing the attached drawings.

Figure 1:
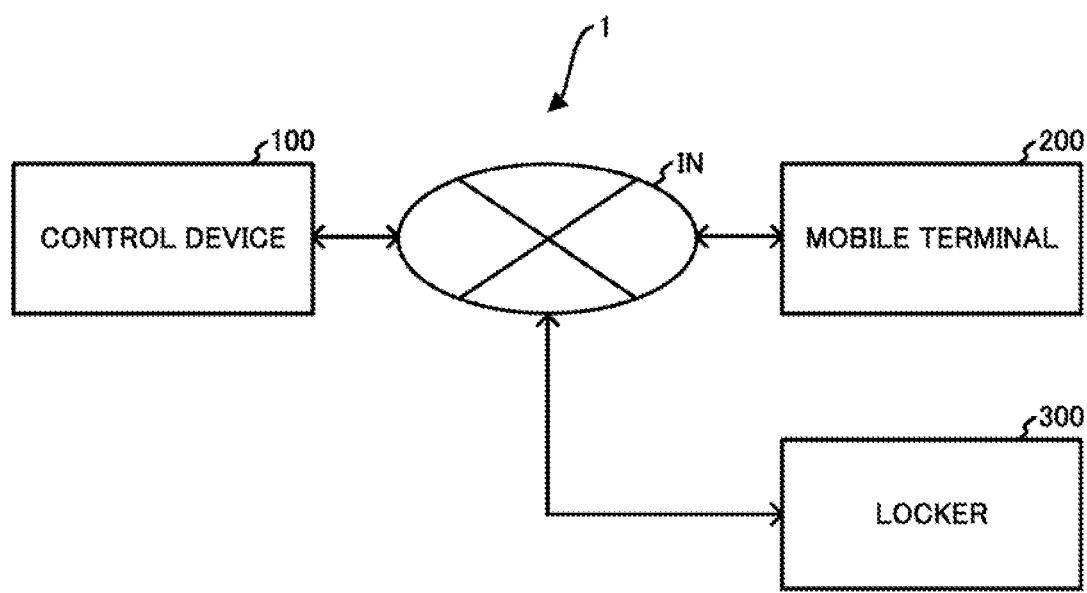
FIG. 1 is a system configuration drawing illustrating a configuration example of a storage system according to Embodiment 1 of the present disclosure.

A storage system 1 according to an embodiment of the present disclosure includes a control device 100 such as illustrated in FIG. 1 that instructs delivery of an article, a mobile terminal 200 carried by an addressee of the article to be delivered, and a locker 300 that stores the article to be delivered.

Figure 2:
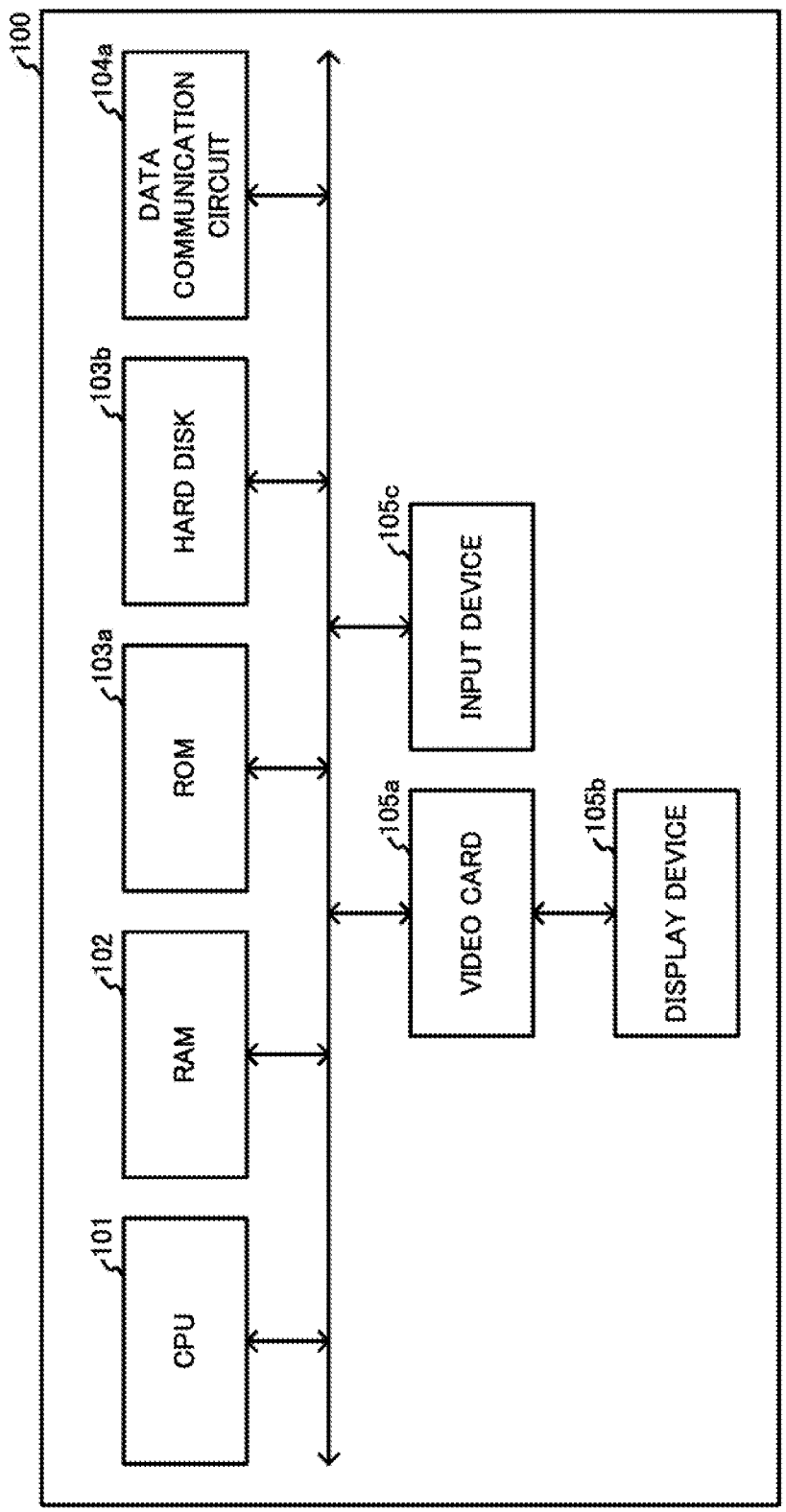
FIG. 2 is a hardware configuration drawing illustrating a configuration example of a control device of the storage system.

The control device 100 is a server device and, as illustrated in FIG. 2, includes a central processing unit (CPU) 101, a random access memory (RAM) 102, a read only memory (ROM) 103a, a hard disk 103b, a data communication circuit 104a, a video card 105a, a display device 105b, and an input device 105c. In the present embodiment, it is described that the control device 100 includes one CPU 101, but the present embodiment is not limited thereto and the control device 100 may include a plurality of CPUs.

The CPU 101 carries out total control of the control device 100 by executing programs stored in the ROM 103a or the hard disk 103b. The RAM 102 temporarily stores data to be processed at the times of execution of the programs by the CPU 101.

Various types of programs are stored in the ROM 103a and the hard disk 103b. The hard disk 103b also stores various types of data and tables in which data is stored that are used in the execution of the programs. The control device 100 may include flash memory instead of the hard disk 103b.

The data communication circuit 104a is implemented as a network interface card (NIC), and carries out data communication with the mobile terminal 200 and the locker 300 that are connected to the internet IN.

The video card 105a renders images on the basis of digital signals output from the CPU 101, and outputs image signals that represent the rendered images. The display device 105b is implemented as an electroluminescence (EL) display, and displays images in accordance with the image signals output from the video card 105a. The display device 105b may be implemented as a plasma display panel (PDP) or a liquid crystal display (LCD) instead of the EL display. The input device 105c is implemented as at least one of a keyboard, a mouse, a touchpad, or a button, and inputs signals corresponding to user operations performed on the input device 105c.

Figure 3:
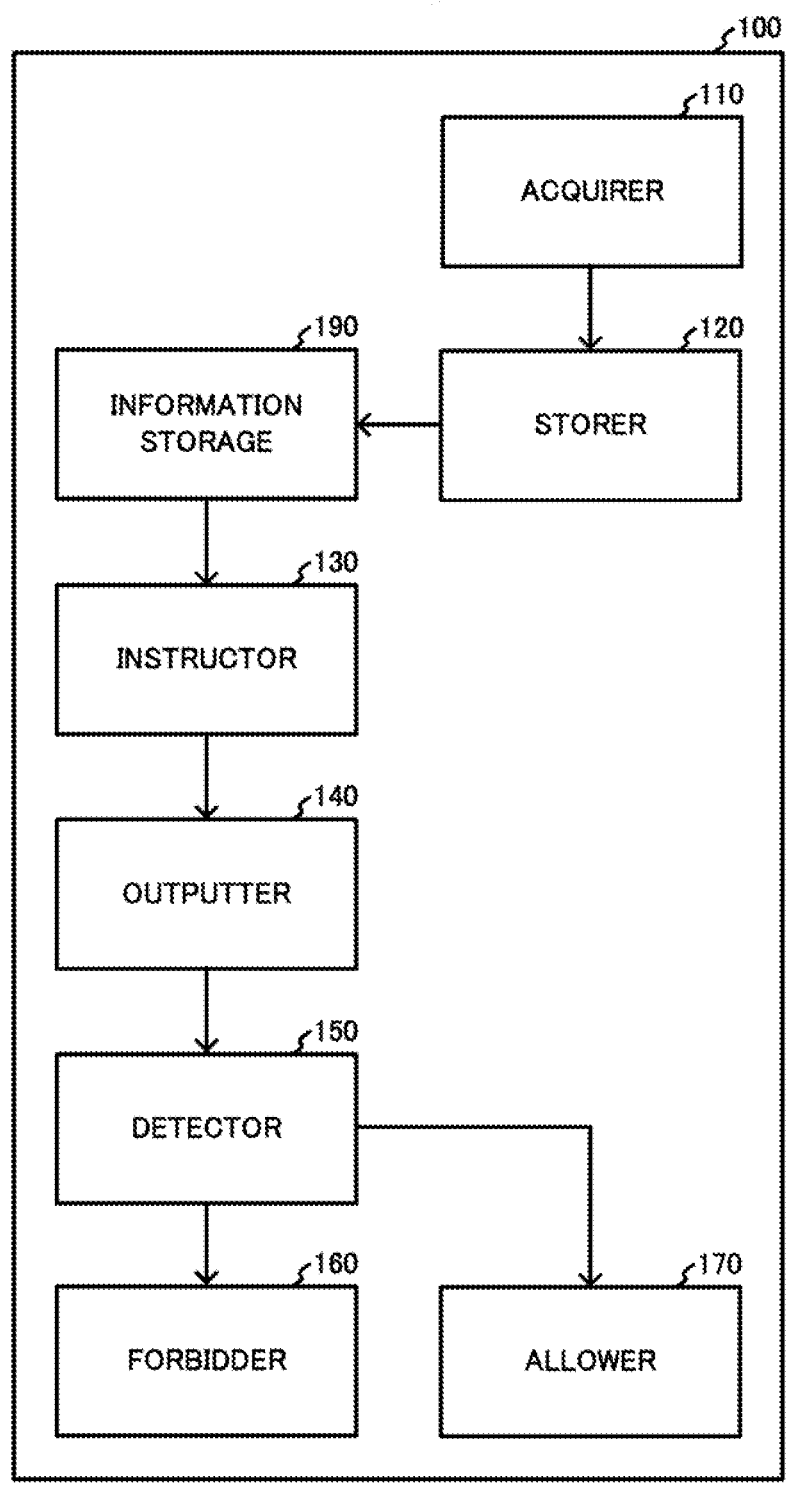
FIG. 3 is a functional block drawing illustrating an example of the functions of the control device of the storage system.

In one example, the control device 100 is managed by a non-illustrated company R that manages a website used to sell articles. When the data communication circuit 104a of the control device 100 receives, from the mobile terminal 200, a delivery request requesting delivery of a sold article, the CPU 101 executes non-illustrated delivery request storage processing for storing the delivery request. Thus, the CPU 101 functions as an acquirer 110 such as illustrated in FIG. 3 that acquires the delivery request from the data communication circuit 104a, and as a storer 120 that stores the delivery request. Additionally, the hard disk 103b of the control device 100 functions as an information storage 190 in which the delivery request is stored.

When the execution of the non-illustrated delivery information storage processing starts, the acquirer 110 of the control device 100 acquires the delivery request from the data communication circuit 104a, and the storer 120 generates a delivery identification (ID) identifying the acquired delivery request. Then, the storer 120 associates the generated delivery ID and the acquired delivery request, and stores the associated information in the information storage 190.

Thereafter, the CPU 101 of the control device 100 executes non-illustrated delivery instruction processing for instructing the delivery of the article on the basis of the delivery request stored in the information storage 190. In one example, the non-illustrated delivery instruction processing is executed at a predetermined time such as 9:00 AM. Thus, the CPU 101 functions as an instructor 130 such as illustrated in the FIG. 3 that instructs the delivery of articles.

When the execution of the non-illustrated delivery instruction processing starts, the instructor 130 of the control device 100 determines whether or not an unprocessed delivery request exists in the information storage 190. Here, the unprocessed delivery request is a delivery request that has not been processed by the current execution of the delivery instruction processing. At this time, when a determination is made that an unprocessed delivery request exists, the instructor 130 sets one of the one or plurality of unprocessed delivery requests as a delivery request to be processed.

Next, the instructor 130 of the control device 100 acquires, from the delivery request to be processed, an article ID that identifies the article requested to be delivered. Then, the instructor 130 displays, on the display device 105b, the article ID and the delivery ID of the delivery request to be processed, and a message instructing to find the article identified by the article ID in a non-illustrated warehouse and issue, to a delivery company, a request to deliver the found article.

Next, the instructor 130 of the control device 100 returns to the processing for determining whether or not an unprocessed delivery request exists, and repeats the processing described above until no unprocessed delivery requests exist. Then, when no unprocessed delivery requests exist, the instructor 130 ends the execution of the non-illustrated delivery instruction processing.

Thereafter, a worker at the company R that has viewed the message, and the delivery ID and the article ID displayed on the control device 100 finds the article identified by the viewed article ID in the non-illustrated warehouse. Next, the worker performs, on the control device 100, an input operation for inputting the viewed delivery ID.

When the input device 105c of the control device 100 outputs a signal corresponding to the input operation, the CPU 101 executes non-illustrated delivery information storage processing for storing delivery information related to the delivery of the article.

A delivery table such as illustrated in FIG. 4 is stored in advance in the information storage 190 of the control device 100. The delivery information is stored in the delivery table. A plurality of records is stored in the delivery table. A delivery ID that identifies a delivery request, and delivery information related to the delivery of an article that is performed on the basis of the delivery request are associated with each other and stored in each record.

The delivery information stored in each record includes the article ID of an article to be delivered, a user ID of the user specified as the addressee of that article, and information expressing an address of a locker specified as a delivery destination of that article. Additionally, the delivery information further includes a locker ID identifying the locker at the delivery destination, and a storage unit ID identifying a storage unit in which the article is stored from among a plurality of storage units of the locker.

When the execution of the delivery information storage processing starts, the acquirer 110 of the control device 100 acquires the delivery ID on the basis of the signal output by the input device 105c, and acquires the delivery request associated with the acquired delivery ID from the information storage. Next, the acquirer 110 acquires, from the acquired delivery request, the article ID of the article requested to be delivered, the user ID of the addressee of that article, and the locker ID of the locker specified as the delivery destination.

In the present embodiment, for ease of description, an example of a case is described hereinafter in which the delivery ID "D1", the article ID "G1" of a non-illustrated article G1, the user ID "U1" of a non-illustrated user U1, and a locker ID "300" of the locker 300 are acquired.

Next, the acquirer 110 of the control device 100 acquires, from a non-illustrated locker table, information expressing the address of the locker 300 associated with the locker ID "300." Then, the acquirer 110 generates delivery information including the acquired article ID "G1", the user ID "UT", the information expressing the address of the delivery destination, the locker ID "300" and, since delivery is not complete, a character string "NULL" expressing that the article G1 is not stored in the locker 300. Then, the storer 120 of the control device 100 associates the generated delivery ID D1" and the generated delivery information, and stores the associated information in the delivery table of FIG. 4.

Next, the acquirer 110 of the control device 100 acquires, from a non-illustrated user table, information expressing the name of the user U1 associated with the user ID "U1." Then, the acquirer 110 controls a non-illustrated printer to print the delivery ID "D1", the name of the user U1 that is the addressee, and the address of the delivery destination on a slip used by the delivery company.

Next, the instructor 130 of the control device 100 displays, on the display device 105b, the delivery ID "D1" printed on the slip and a message instructing to issue, to the delivery company, a request to deliver the article G1. The worker of the company R follows the displayed message, affixes the slip to the article G1 and, then, issues a request to a worker of the delivery company to deliver the article G1.

Figure 5:
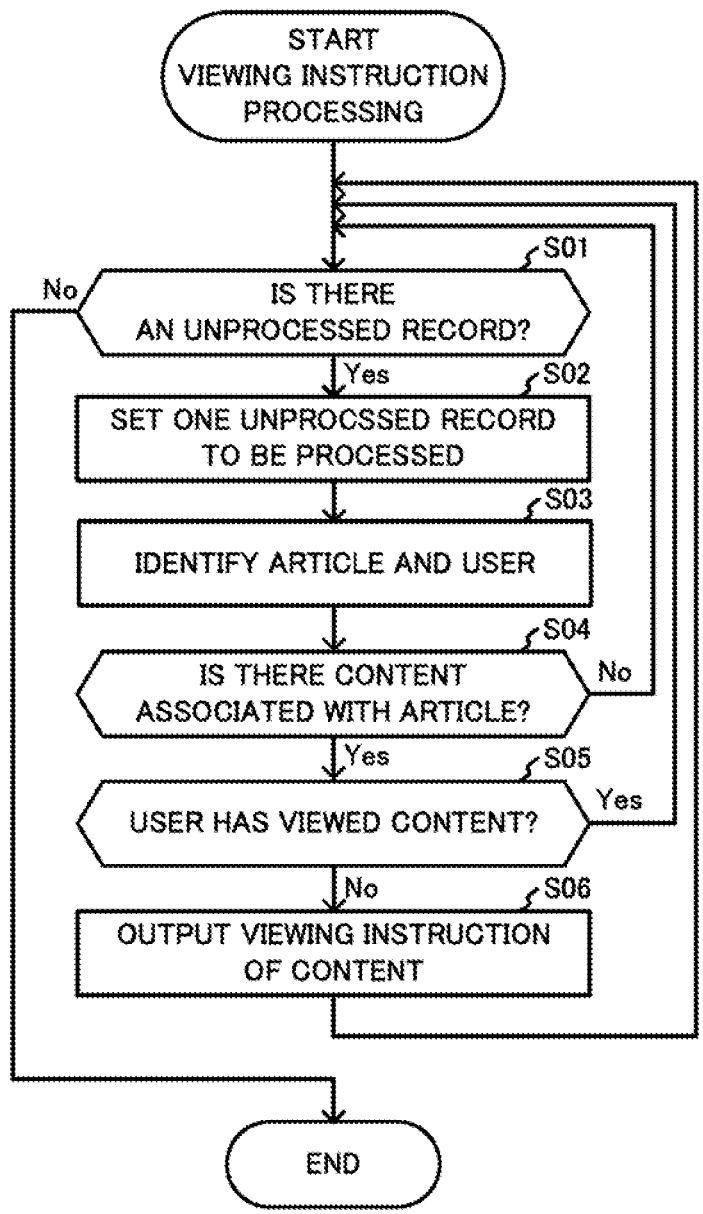
FIG. 5 is a flowchart illustrating an example of viewing instruction processing executed by the control device of the storage system according to Embodiment 1.

The CPU 101 of the control device 100 executes viewing instruction processing such as illustrated in FIG. 5 for instructing to view content associated with the article to be delivered. The viewing instruction processing is executed at a predetermined time such as 8:00 AM, for example. In the present embodiment, a description is given in which the phrase "view the content" means at least one of watching video content or listening to audio content.

A content table such as illustrated in FIG. 6 is stored in advance in the information storage 190 of the control device 100. Information related to the content is stored in advance in the content table. A plurality of records are stored in advance in the content table. An article ID identifying an article, and a content ID identifying content associated with that article are associated in advance and stored in each record.

In the present embodiment, a description is given in which the article G1 identified by the article ID "G1" is associated in advance with non-illustrated content C1 identified by a content ID "./C1.mpg." Additionally, in the present embodiment, a description is given in which the article G1 is a medical drug, and the content C1 associated with the article G1 is content explaining a precaution related to the article G1. Furthermore, a description is given in which the precaution related to the article GJ includes at least one of a precaution for use of the article G1, a precaution for storage of the article G1, or a precaution for transportation of the article G1.$_{\cdot[akpat1]}$ A viewing table such as illustrated in FIG. 7 is stored in advance in the information storage 190. Information related to viewing of the content is stored in the viewing table. A plurality of records is stored in the viewing table. A content ID identifying content, and a user ID of a user that has viewed that content are associated and stored in each record.

In the present embodiment, a description is given in which the user U1 that is the addressee of the article G1 has not viewed the content C1 at the point in time at which the viewing instruction processing of FIG. 5 is first executed after the control device 100 receives the delivery request requesting the delivery of the article G1. As such, at this point in time, the content ID "./C1.mpg" of the content C1 and the user ID "U1" of the user U1 are not associated with each other in the viewing table of FIG. 7. Additionally, in the present embodiment, a description is given in which the phrase "has not viewed the content" means has not watched the video content and also has not listened to the audio content.

When the execution of the viewing instruction processing of FIG. 5 starts, the instructor 130 of the control device 100 determines whether or not an unprocessed record exists in the delivery table of FIG. 4 (step S01). Here, the unprocessed record is a record that has not been processed by the current execution of the viewing instruction processing.

In the present embodiment, due to the execution of the delivery information storage processing, a record in which the delivery ID "D1" is stored is stored in the delivery table. As such, the instructor 130 of the control device 100 determines that an unprocessed exists in the delivery table (step S01; Yes). Next, the instructor 130 selects one of the one or plurality of unprocessed records as a record to be processed (step S02). Hereinafter, for ease of description, a description is given in which the record in which the delivery ID "D1" is stored is selected as the record to be processed.

Thereafter, the instructor 130 of the control device 100 acquires the article ID "G1" and the user ID "U1" stored in the record to be processed, thereby identifying the article G1 to be delivered and the user U1 that is the addressee of the article G1 (step S03).

Next, since the content ID "./C1.mpg" associated with the article ID "G1" is stored in the content table of FIG. 6, the instructor 130 of the control device 100 determines that the content C1 associated with the article G1 exists (step S04; Yes).

Next, since the content ID "./C1.mpg" and the user ID "U1" are not associated with each other and stored in the viewing table of FIG. 7, the instructor 130 of the control device 100 determines that the video content of the content C1 has not been watched and also the audio content has not been listened to by the user U1. That is, the instructor 130 determines that the content C1 has not been viewed by the user U1 (step S05; No).

Thereafter, the instructor 130 of the control device 100 outputs a viewing instruction instructing the user U1 to perform at least one of watching the video content of the content C1 or listening to the audio content of the content C1. That is, the instructor 130 instructs the user U1 to view the content C1 (step S06). To realize this, the instructor 130 acquires, from the non-illustrated user table, an electronic mail address of the user U1 associated with the user ID "U1", and creates an electronic mail that has the acquired electronic mail address as the destination. Next, the instructor 130 adds, as the viewing instruction to at least one of a subject line or a body of the electronic mail, a message that includes the content ID "./C1.mpg" and that instructs the user U1 to view the content C1. Then, the instructor 130 outputs the electronic mail including the viewing instruction to the data communication circuit 104a of FIG. 2, and the data communication circuit 104a sends the electronic mail.

Thereafter, the instructor 130 of the control device 100 repeats the execution of the processing of steps S01 to S06 until no unprocessed records exist. During these repetitions, when the instructor 130 determines that content associated with the article does not exist (step S04; No), the instructor 130 determines that content to instruct to view does not exist. As such, the instructor 130 returns to step S01 without executing the processing of step S06 for outputting the viewing instruction, and continues the repeating of the processing described above. Additionally, when the instructor 130 determines that the content has been viewed by the user (step S05; Yes), the instructor 130 returns to step S01, and continues the repeating of the processing described above. Then, when the instructor 130 of the control device 100 determines that no unprocessed records exist (step S01; No), the instructor 130 ends the execution of the viewing instruction processing.

Figure 8:
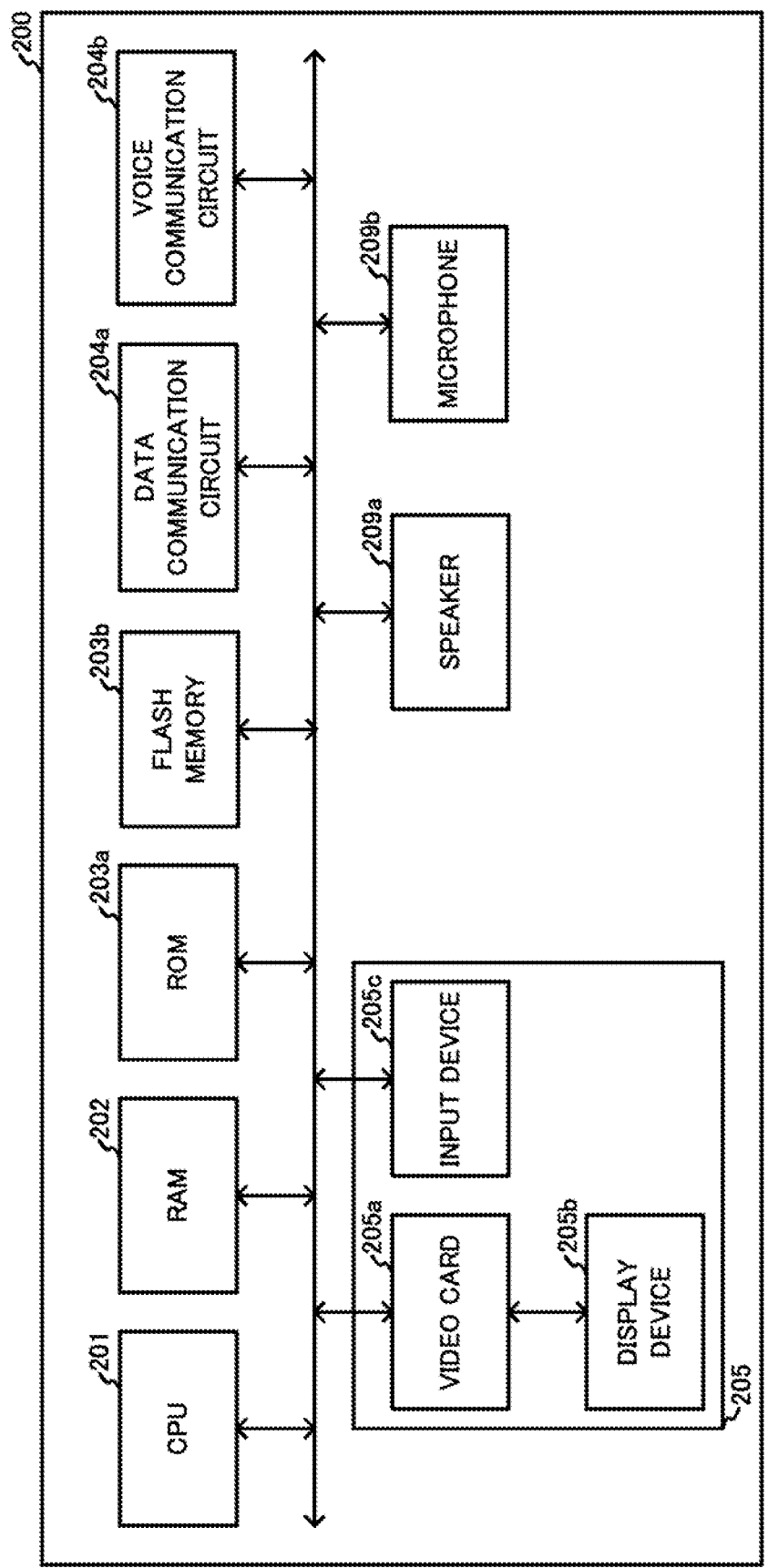
FIG. 8 is a hardware configuration drawing illustrating a configuration example of a mobile terminal.

The mobile terminal 200 is implemented as a smartphone. As illustrated in FIG. 8, the mobile terminal 200 includes a CPU 201, a RAM 202, a ROM 203a, a flash memory 203b, a data communication circuit 204a, a voice communication circuit 204b, a touch screen 205, a speaker 209a, and a microphone 209b. The mobile terminal 200 may include a plurality of CPUs.

The configurations and the functions of the CPU 201, the RAM 202, and the ROM 203a of the mobile terminal 200 are the same as the configurations and the functions of the CPU 101, the RAM 102, and the ROM 103a of the control device 100.

Various types of programs, various types of data used in the execution of the programs, and tables in which data is stored are stored in in the flash memory 203b. The mobile terminal 200 may include a hard disk instead of the flash memory 203b.

In one example, the data communication circuit 204a carries out, in accordance with a communication standard such as long term evolution (LTE) or 5th Generation (5G), data communication using radio waves with a base station (not illustrated in the drawings) that is connected to the internet IN. Thus, the data communication circuit 204a of the mobile terminal 200 carries out data communication with the control device 100 and the locker 300 that are connected to the internet IN. The voice communication circuit 204b carries out voice communication with a non-illustrated base station using radio waves.

The touch screen 205 includes a video card 205a, a display device 205b, and an input device 205c that have configurations and functions that are the same as the configurations and the functions of the video card 105a, the display device 105b, and the input device 105c of the control device 100.

The speaker 209a outputs sound in accordance with signals output by the CPU 201, and the microphone 209b outputs signals expressing sound around the mobile terminal 200.

The CPU 201 of the mobile terminal 200 executes a program for functioning as an electronic mail client, thereby causing the data communication circuit 204a to receive the electronic mail including the viewing instruction that is output in step S06 of FIG. 5. Then, the CPU 201 acquires the electronic mail from the data communication circuit 204a, and displays the electronic mail on the display device 205b.

In the present embodiment, a description is given hereinafter in which the user U1 does not confirm the electronic mail by the time the user U1 arrives at the locker 300 and, as such, the content C1 has not been viewed.

Figure 9:
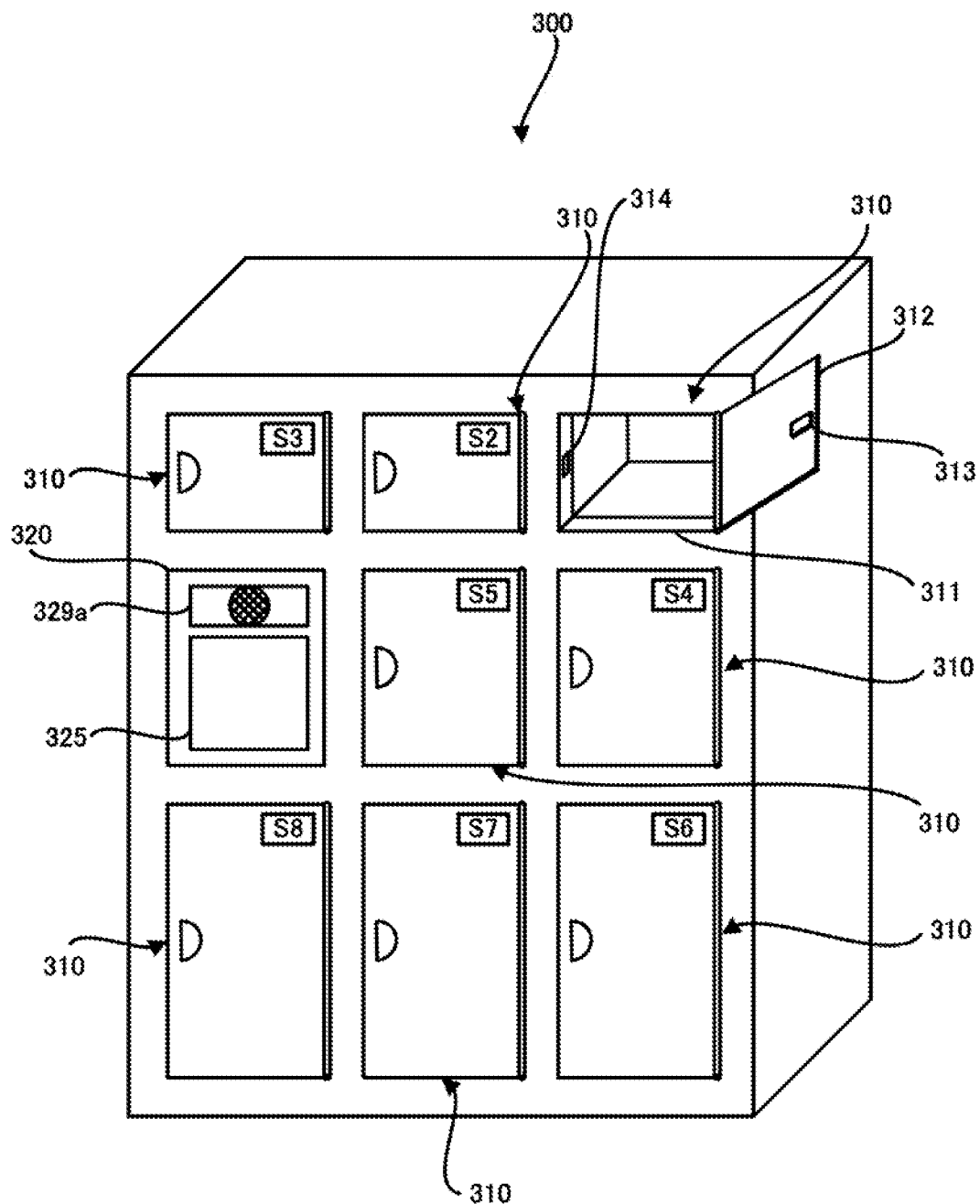
FIG. 9 is an appearance configuration drawing illustrating an example of the appearance of a locker.

The locker 300 specified as the destination of the article G1 is installed at a train station. The locker 300 includes a plurality of storage units 310 such as illustrated in FIG. 9 that store articles, and a control device 320 that controls locking and unlocking of the storage units 310. The locker 300 may include only one storage unit 310.

The storage unit 310 includes one bottom plate and ceiling plate, and two side plates. The storage unit 310 includes a non-illustrated box body that forms a space enclosed by these plates and that has an open front. A door frame 311 that receives a door 312 is installed in the opening of the box body. The door 312 includes a deadbolt 313 that is a bolt, and the door frame 311 includes a strike plate 314 that is a seat for the deadbolt 313.

The door 312 further includes a non-illustrated motor that locks the door 312 by inserting the deadbolt 313 into the strike plate 314 in accordance with a signal output from the control device 320. The motor unlocks the door 312 by pulling the deadbolt 313 from the strike plate 314 plate in accordance with a signal output from the control device 320.

Figure 10:
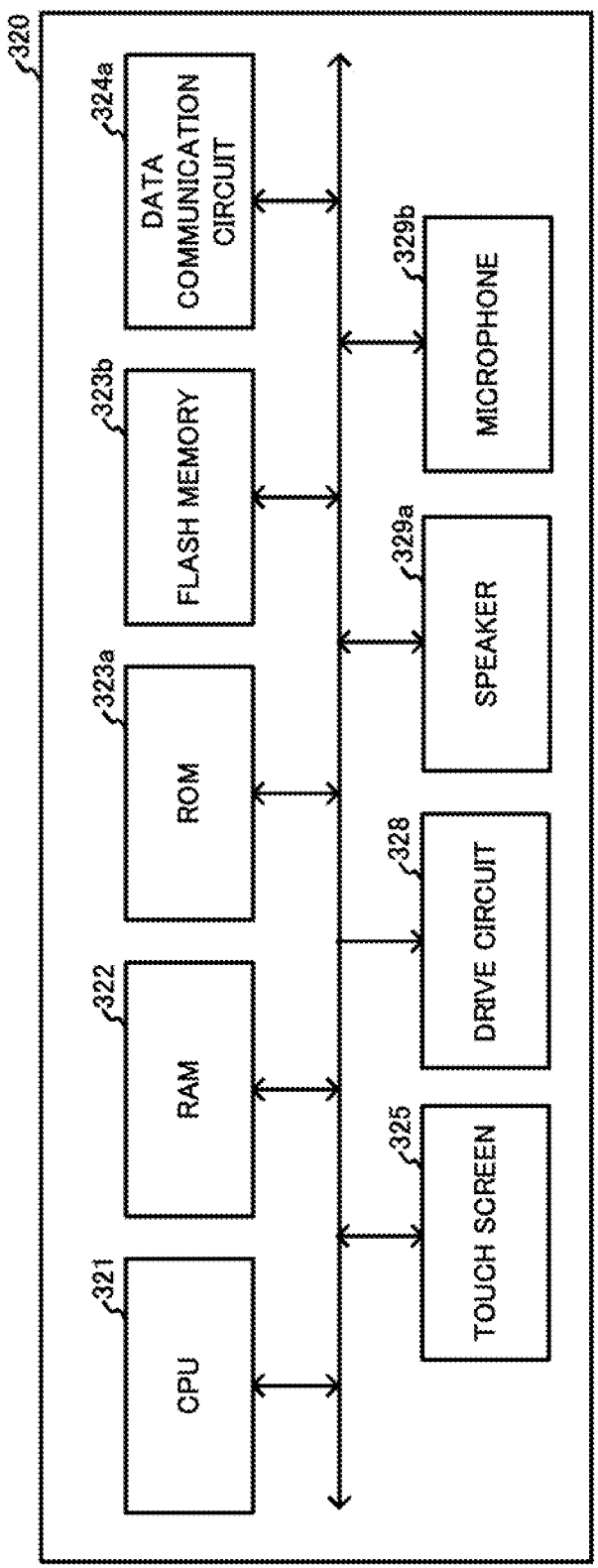
FIG. 10 is a hardware configuration diagram illustrating a configuration example of a control device of the locker.

As illustrated in FIG. 10, the control device 320 of the locker 300 includes a CPU 321, a RAM 322, a ROM 323a, a flash memory 323b, a data communication circuit 324a, a touch screen 325, a drive circuit 328, a speaker 329a, and a microphone 329b. The control device 320 may include a plurality of CPUs.

The configurations and functions of the CPU 321, the RAM 322, the ROM 323a, the flash memory 323b, the data communication circuit 324a, the touch screen 325, the speaker 329a, and the microphone 329b of the locker 300 are the same as the configurations and functions of the CPU 201, the RAM 202, the ROM 203a, the flash memory 203b, the data communication circuit 204a, and touch screen 205, the speaker 209a, and the microphone 209b of the mobile terminal 200.

A storage table such as illustrated in FIG. 11 is stored in advance in the flash memory 323b of the locker 300. Information related to the storage units 310 is stored in advance in the storage table. A plurality of records is stored in advance in the storage table. A storage unit ID identifying a storage unit 310, and a character string "NULL" expressing that the storage unit 310 is not locked or a password used to unlock that storage unit 310 are associated and stored in advance in each record.

The drive circuit 328 is connected to cables connected to each non-illustrated motor that pulls the deadbolt 313 of the door 312 out of the strike plate 314 or inserts the deadbolt 313 into the strike plate 314, and drives these motors in accordance with signals output by the CPU 101.

The worker of the delivery company delivers the article G1 to the locker 300 by automobile, motorcycle, bicycle, or walking, for example. When the worker arrives at the locker 300, the worker selects one storage unit 310 that is empty of the plurality of storage units 310, places the article G1 in the selected storage unit 310 and, then, closes the door 312. In the present embodiment, a description is given in which the worker places the article G1 in the storage unit 310 identified by the storage unit ID "S1."

Thereafter, the worker performs, on the touch screen 325 of the locker 300, an input operation for inputting the delivery ID "D1" printed on the slip of the article G1 and the storage unit ID "S1" of the storage unit 310 in which the article G1 is placed, and a locking operation for locking the storage unit 310.

Figure 12:
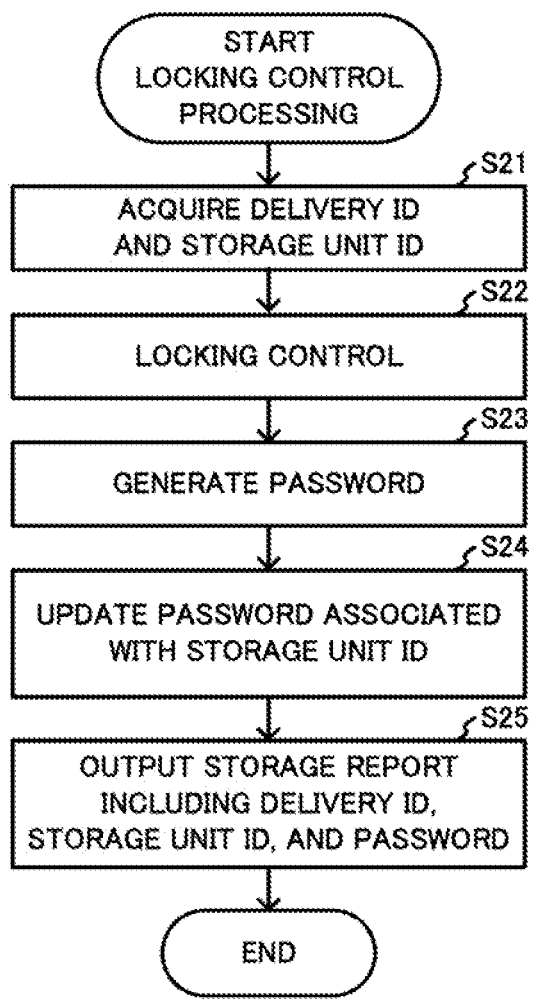
FIG. 12 is a flowchart illustrating an example of locking control processing executed by the control device of the locker.

When the touch screen 325 of the locker 300 outputs signals in response to the input operation and the locking operation of the worker, the CPU 321 executes locking control processing such as illustrated in FIG. 12 for locking the storage unit 310 identified by the inputted storage unit ID.

When the execution of the locking control processing starts, the CPU 321 of the locker 300 acquires the delivery ID "D1" and the storage unit ID "S1" on the basis of the signals output by the touch screen 325 (step S21). Next, the CPU 321 outputs, to the drive circuit 328, a control signal for locking the door 312 of the storage unit 310 identified by the storage unit ID "S1" (step S22).

Thereafter, the CPU 321 of the locker 300 generates, on the basis of software random numbers, a password to be used to unlock the storage unit 310 (step S23). In the present embodiment, an example of a case is described hereinafter in which the password "password1" is generated.

Next, in the storage table illustrated in FIG. 11, the CPU 321 of the locker 300 updates the character string "NULL" associated with the storage unit ID "S1" acquired in step S21 with the generated password "password1" (step S24).

Thereafter, the CPU 321 of the locker 300 generates a storage report that includes the delivery ID "D1", the storage unit ID "S1", and the password "password1", and that informs that the article G1 is stored in the storage unit 310 identified by the storage unit ID "S1" and that the password "password1" is set for the storage unit 310. Next, the CPU 321 outputs the storage report to the data communication circuit 324a with the control device 100 as the destination (step S25), and ends the execution of the locking control processing.

Figure 13:
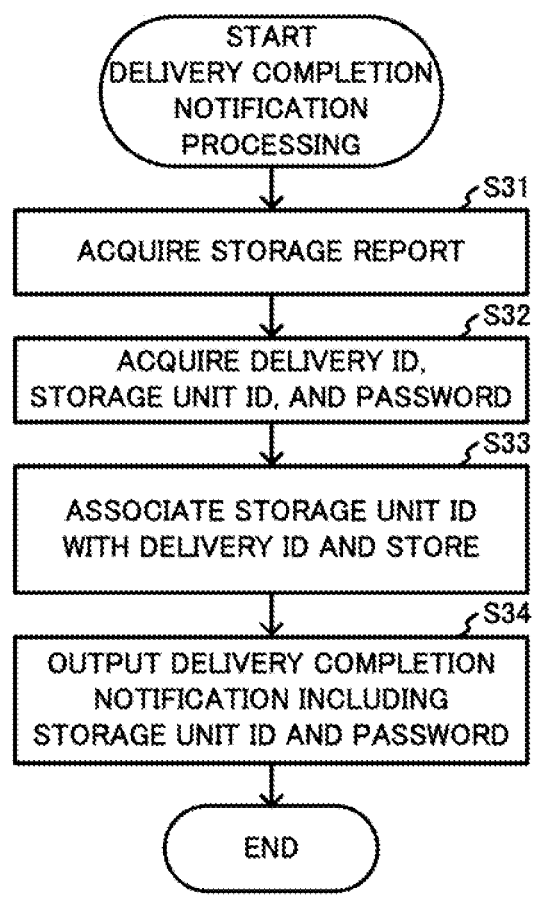
FIG. 13 is a flowchart illustrating an example of delivery completion notification processing executed by the control device of the storage system.

When the data communication circuit 104a of the control device 100 receives the storage report, the CPU 101 of the control device 100 executes delivery completion notification processing such as illustrated in FIG. 13 for notifying the user U1 that the delivery of the article G1 is complete. Thus, the CPU 101 functions as an outputter 140 such as illustrated in FIG. 3 that outputs a delivery completion notification informing that the delivery of the article G1 is complete.

When the execution of the delivery completion notification processing starts, the acquirer 110 of the control device 100 acquires the storage report from the data communication circuit 104a (step S31), and acquires the delivery ID "D1", the storage unit ID "S1", and the password "password1" included in the acquired storage report (step S32). Next, in the delivery table of FIG. 4, the storer 120 of the control device 100 updates the character string "NULL" associated with the delivery ID "D1" to the acquired storage unit ID "S1" (step S33).

Thereafter, the outputter 140 of the control device 100 generates and outputs a delivery completion notification that is a message informing that the article G1 is delivered to the storage unit 310 of the locker 300 identified by the storage unit ID "S1", and that the password "password1" is set for the storage unit 310 (step S34). To accomplish this, the outputter 140 acquires the user ID "U1" associated, in the delivery table of FIG. 4, with the delivery ID "D1" acquired in step S32. Next, as in step S06 of FIG. 5, the outputter 140 acquires the electronic mail address of the user U1 on the basis of the user ID "U1," and creates an electronic mail with the acquired electronic mail address as the destination.

The outputter 140 acquires information expressing the address of the locker 300 associated with the delivery ID "D1" in the delivery table of FIG. 4. Then, the outputter 140 generates a delivery completion notification including the acquired information expressing the address, the storage unit ID "S1", and the password "password1", and adds the generated delivery completion notification to the electronic mail. Then, the instructor 130 outputs the electronic mail including the delivery completion notification to the data communication circuit 104a, and ends the execution of the delivery completion notification processing.

When the data communication circuit 204a of the mobile terminal 200 receives the electronic mail including the delivery completion notification output in step S34 of FIG. 13, the CPU 201 of the mobile terminal 200 acquires the electronic mail from the data communication circuit 204a and displays the acquired electronic mail on the display device 205b. The user U1 carrying the mobile terminal 200 confirms the display device 205b and moves to the locker 300 in order to retrieve the delivered article G1.

Thereafter, when the user U1 arrives at the locker 300, the user U1 performs, on the touch screen 325 of the locker 300, an input operation for inputting the storage unit ID "S1" included in the delivery completion notification, and an unlocking operation for unlocking the storage unit 310 identified by the storage unit ID "S1."

Figure 14:
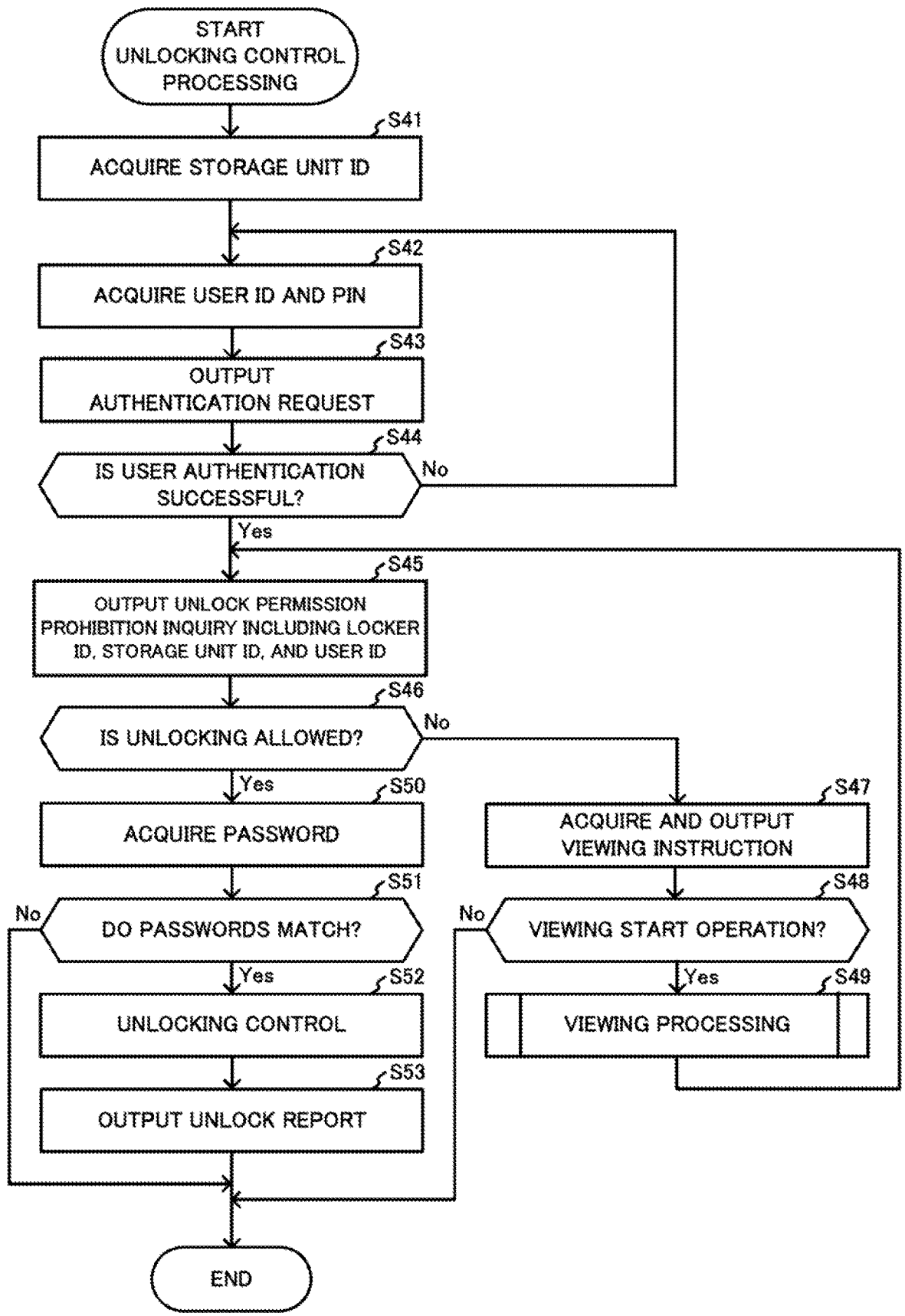
FIG. 14 is a flowchart illustrating an example of unlocking control processing executed by the control device of the locker according to Embodiment 1.

When the touch screen 325 of the locker 300 outputs signals in response to the input operation and the unlocking operation, the CPU 321 of the locker 300 executes unlocking control processing such as illustrated in FIG. 14 for unlocking the storage unit 310.

When the execution of the unlocking control processing starts, the CPU 321 of the locker 300 acquires the storage unit ID "S1" on the basis of the signals output by the touch screen 325 (step S41). Next, the CPU 321 causes the touch screen 325 or the speaker 329a to output a message instructing the user U1 to undergo user authentication.

Next, the CPU 321 of the locker 300 acquires, on the basis of a signal corresponding to an operation of the user U1 that is output by the touch screen 325, authentication information that is a combination of the user ID "U1" of the user U1 and a personal identification number (PIN) of the user U1 (step S42). Thereafter, the CPU 321 outputs, to the data communication circuit 324a with the control device 100 as the destination, an authentication request that includes the acquired authentication information and that requests execution of the user authentication (step S43).

When, after sending the authentication request, the data communication circuit 324a of the locker 300 receives information expressing a result of the user authentication, the CPU 321 acquires that information from the data communication circuit 324a. Next, when the CPU 321 determines, on the basis of the acquired information, that the user authentication has failed (step S44; No), step S42 is executed and the processing described above is repeated.

In contrast, when the CPU 321 of the locker 300 determines that the user authentication has succeeded (step S44; Yes), the CPU 321 reads the locker ID "300" that is stored in advance in the flash memory 323b. Next, the CPU 321 generates an unlock permission prohibition inquiry that includes the locker ID "300", the storage unit ID "S1", and the user ID "U1", and that inquires whether or not to allow the storage unit 310 of the locker 300 identified by the storage unit ID "S1" to be unlocked in accordance with the unlocking operation of the user U1. Then, the CPU 321 outputs the generated unlock permission prohibition inquiry to the data communication circuit 324a with the control device 100 as the destination (step S45).

Thereafter, the control device 100 that receives the unlock permission prohibition inquiry determines that the content C1 associated with the article G1 has not been viewed by the user U1, and returns a forbid unlocking command forbidding unlocking of the storage unit 310 in which the article G1 is stored, and a viewing instruction of the content C1.

When the data communication circuit 324a of the locker 300 receives the forbid unlocking command, the CPU 321 acquires the command from the data communication circuit 324a and determines that unlocking is forbidden. That is, the CPU 321 determines that unlocking is not allowed (step S46; No).

Thereafter, when the data communication circuit 324a of the locker 300 receives the viewing instruction, the CPU 321 acquires the viewing instruction from the data communication circuit 324a, and outputs the viewing instruction to the touch screen 325 or to the speaker 329a (step S47).

Figure 15:
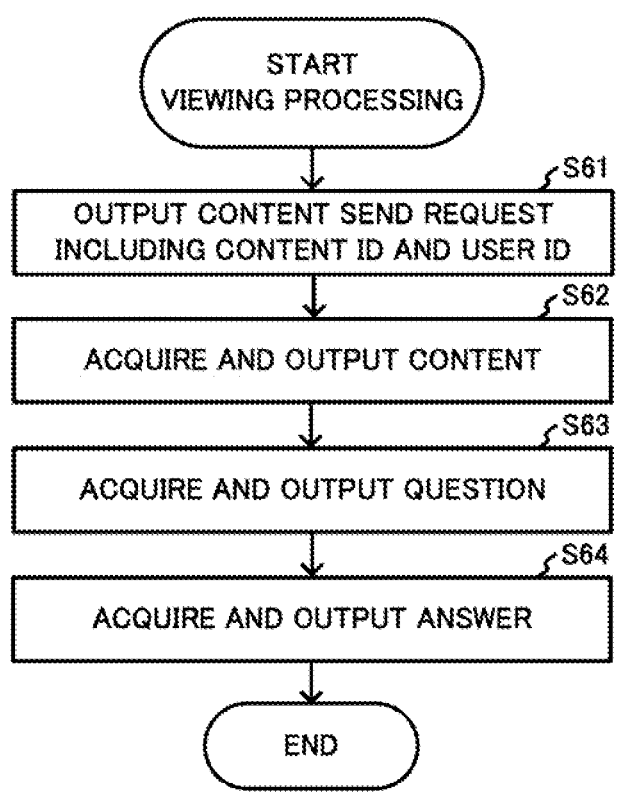
FIG. 15 is a flowchart illustrating an example of viewing processing executed by the control device of the locker according to Embodiment 1.

At this time, when, in a standby period from a time when the viewing instruction is output to a time a predetermined amount of time after the time when the viewing instruction is output, the user U1 does not perform a viewing start operation that is an operation for starting the viewing (step S48; No), the CPU 321 of the locker 300 ends the execution of the unlocking control processing without unlocking the storage unit 310. In contrast, when, in the standby period, a signal corresponding to the viewing start operation is output by the touch screen 325 (step S48; Yes), the CPU 321 executes viewing processing such as illustrated in FIG. 15, which is processing for causing the user U1 to view the content C1.

When the execution of the viewing processing starts, the CPU 321 of the locker 300 generates a content send request that includes the content ID "./C1.mpg" included in the viewing instruction and the user ID "U1" acquired in step S42, and that requests sending of the content C1 to the locker 300 operated by the user U1. Next, the CPU 321 outputs the generated content send request to the data communication circuit 324a with the control device 100 as the destination (step S61).

Thereafter, when the data communication circuit 324a of the locker 300 receives the content C1, the CPU 321 acquires the content C1 from the data communication circuit 324a. Next, the CPU 321 outputs the video content included in the content C1 to the touch screen 325 and, also, outputs the audio content included in the content C1 to the speaker 329a (step S62).

Thereafter, the data communication circuit 324a of the locker 300 receives, from the control device 100, information expressing a first question that is a question related to the video content, and information expressing a second question that is a question related to the audio content. The control device 100 sends these pieces of information in order for the control device 100 to detect, on the basis of whether or not at least one of a first answer that is an answer of the user U1 to the first question or a second answer that is an answer of the user U1 to the second question is a correct answer, whether or not the content C1 has been viewed by the user U1.

Thereafter, the CPU 321 of the locker 300 acquires these pieces of information from the data communication circuit 324a, and causes at least one of the display device 205b or the speaker 209a to output the first question and the second question expressed by the acquired pieces of information (step S63).

Next, the CPU 321 of the locker 300 acquires the first answer and the second answer of the user U1 on the basis of signals output by the touch screen 325 or the microphone 329b. Then, the CPU 321 outputs information expressing the first answer and information expressing the second answer to the data communication circuit 324a with the control device 100 as the destination (step S64), and ends the execution of the viewing processing.

After executing the viewing processing in step S49 of FIG. 14, the CPU 321 of the locker 300 outputs a second unlock permission prohibition inquiry (step S45).

When the control device 100 that receives the second unlock permission prohibition inquiry detects, on the basis of the information expressing the first answer and the information expressing the second answer output in step S64 of FIG. 15, viewing of the content C1, the control device 100 returns an unlocking permission notification. When the control device 100 does not detect viewing of the content C1, the control device 100 returns a forbid unlocking command and the viewing instruction. In the present embodiment, an example of a case is described hereinafter in which both the first answer and the second answer are incorrect answers and, as such, the control device 100 does not detect viewing of the content C1 by the user U1, and returns a second forbid unlocking command.

When the data communication circuit 324a of the locker 300 receives the second forbid unlocking command, the CPU 321 determines that unlocking is not allowed (step S46; No), and executes the processing of steps S47 to S49, and S45 again. As a result, information expressing a second first answer$_{[akpat2]}$ and information expressing a second second answer are output and, then, a third unlock permission prohibition inquiry is output (steps S47 to S49, and S45).

In the present embodiment, an example of a case is described hereinafter in which at least one of the second first answer or the second second answer is a correct answer and, as such, the control device 100 detects viewing of the content C1 by the user U1, and an allow unlocking notification is returned in response to the third unlock permission prohibition inquiry.

When the data communication circuit 324a of the locker 300 receives the allow unlocking notification, the CPU 321 acquires the notification from the data communication circuit 324a and determines that unlocking is allowed (step S46; Yes).

Next, the CPU 321 of the locker 300 causes the touch screen 325 or the speaker 329a to output a message instructing input of the password. When the user U1 confirms the message, the user U1 performs, on the touch screen 325, an input operation for inputting the password "password1" included in the delivery completion notification. When the touch screen 325 outputs a signal corresponding to the input operation, the CPU 321 acquires the password on the basis of the outputted signal (step S50).

Thereafter, the CPU 321 of the locker 300 determines whether or not the password "password1" associated in the storage table of FIG. 11 with the storage unit ID "S1" acquired in step S41 matches the password acquired in step S50 (step S51). At this time, when the CPU 321 of the locker 300 determines that these passwords do not match (step S51; No), the CPU 321 ends the execution of the unlocking control processing without unlocking the storage unit 310.

In contrast, when the CPU 321 of the locker 300 determines that these passwords match (step S51; Yes), the CPU 321 outputs, to the drive circuit 328, a control signal for unlocking the door 312 of the storage unit 310 identified by the storage unit ID "S1" (step S52).

Thereafter, the CPU 321 of the locker 300 outputs, to the data communication circuit 324a with the control device 100 as the destination, an unlock report that includes the locker ID "300" and the storage unit ID "S1" and that informs that the storage unit 310 of the locker 300 identified by the storage unit ID "S1" is unlocked (step S53) and, then, ends the execution of the unlocking control processing. When the control device 100 receives the unlock report, the control device 100 deletes, from the delivery table of FIG. 4, the record in which the locker ID "300" and the storage unit ID "S1" included in the unlock report are stored.

When the data communication circuit 104a of the control device 100 illustrated in FIG. 2 receives the authentication request output in step S43 of FIG. 14, the CPU 101 executes non-illustrated user authentication processing. When the execution of the user authentication processing starts, the acquirer 110 of the control device 100 acquires the authentication request from the data communication circuit 104a, and acquires the user ID "UT" and the PIN included in the authentication request. Next, the acquirer 110 acquires the PIN of the user U1 stored in association with the user ID "UT" in advance in the non-illustrated user table. Then, the acquirer 110 determines whether or not the PIN of the authentication request and the PIN of the user table match.

At this time, when a determination is made that these PINs do not match, the acquirer 110 of the control device 100 determines that the user authentication has failed, outputs information expressing that the user authentication has failed to the data communication circuit 104a with the locker 300 as the destination and, then, ends the execution of the user authentication processing. In contrast, when a determination is made that these PINs match, the CPU 101 determines that the user authentication has succeeded, outputs information expressing that the user authentication has succeeded and, then, ends the execution of the user authentication processing.

Figure 16:
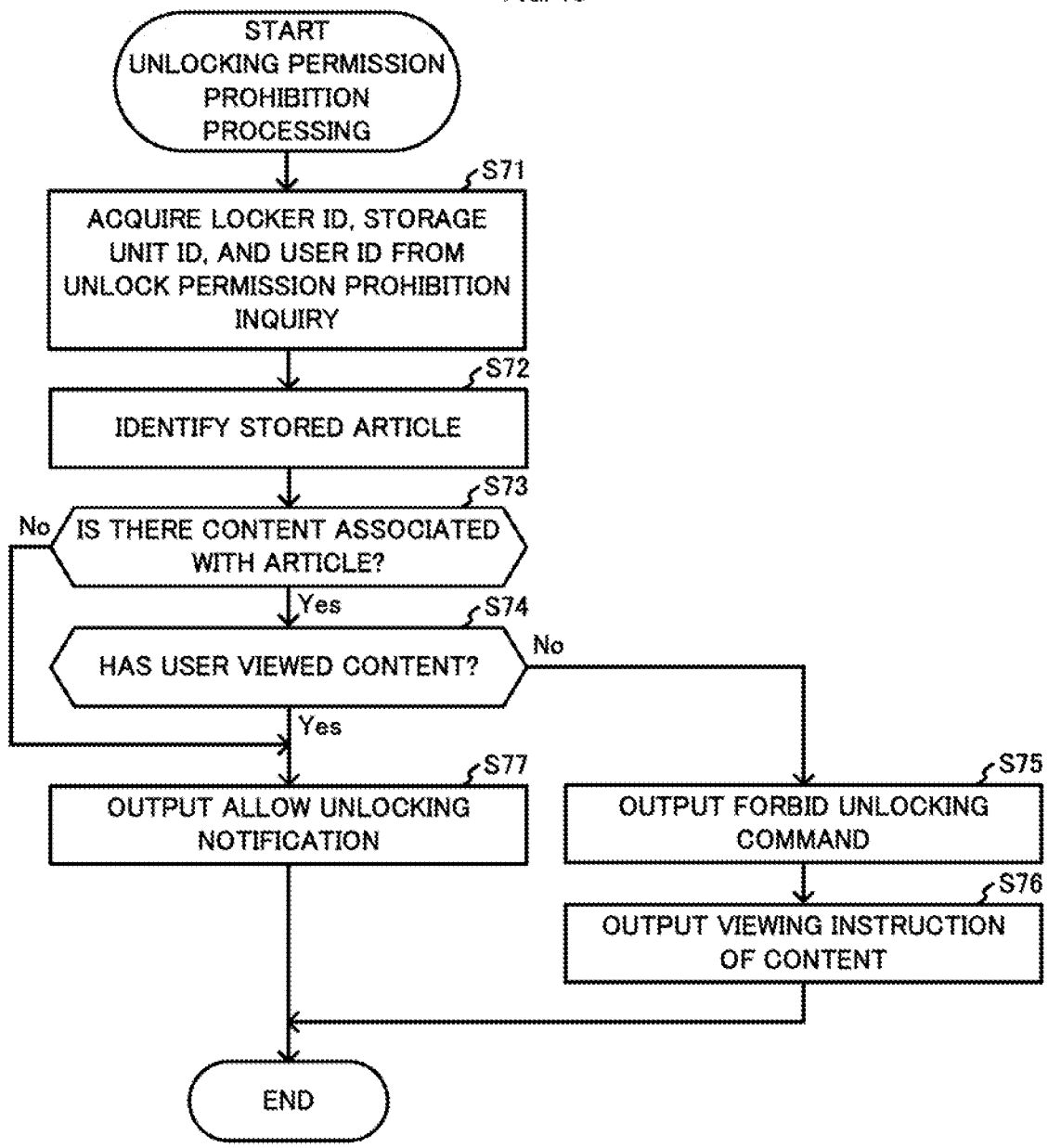
FIG. 16 is a flowchart illustrating an example of unlock permission prohibition processing executed by the control device of the storage system.

Thereafter, when the data communication circuit 104a of the control device 100 receives the first unlock permission prohibition inquiry output in step S45 of FIG. 14, the CPU 101 performs the first execution of the unlock permission prohibition processing such as illustrated in FIG. 16 for allowing or forbidding unlocking of the storage unit 310. Thus, the CPU 101 functions as a forbidder 160 such as illustrated in FIG. 3 that forbids unlocking of the storage unit 310, and as an allower 170 that allows unlocking of the storage unit 310.

When the execution of the first unlock permission prohibition processing starts, the acquirer 110 of the control device 100 acquires the unlock permission prohibition inquiry from the data communication circuit 104a, and acquires the locker ID "300", the storage unit ID "S1", and the user ID "UT" included in the acquired unlock permission prohibition inquiry (step S71). Next, the acquirer 110 acquires the article ID "G1" associated with the locker ID "300" and the storage unit ID "S1" in the delivery table of FIG. 4. As a result, the acquirer 110 identifies the article G1 stored in the storage unit 310 of the locker 300 identified by the storage unit ID "S1" (step S72).

Next, the forbidder 160 of the control device 100 executes the same processing as step S04 of FIG. 5 to determine whether or not content associated with the article G1 exists (step S73). At this time, when a determination is made that content does not exist (step S73; No), the processing of step S77 (described later) is executed.

In the present embodiment, the forbidder 160 determines that the content C1 associated with the article G1 exists (step S73; Yes). Next, the forbidder 160 executes the same processing as step S04 of FIG. 5, thereby determining that the content C1 associated with the article G1 has not been viewed by the user U1 (step S74; No). Then, the forbidder 160 outputs, to the data communication circuit 104a with the locker 300 as the destination, a forbid unlocking command that forbids unlocking of the storage unit 310 (step S75).

Next, the instructor 130 of the control device 100 executes the same processing as step S06 of FIG. 5 to generate the viewing instruction, outputs the generated viewing instruction to the data communication circuit 104a with the locker 300 as the destination (step S76) and, then ends the first execution of the unlock permission prohibition processing.

Figure 17:
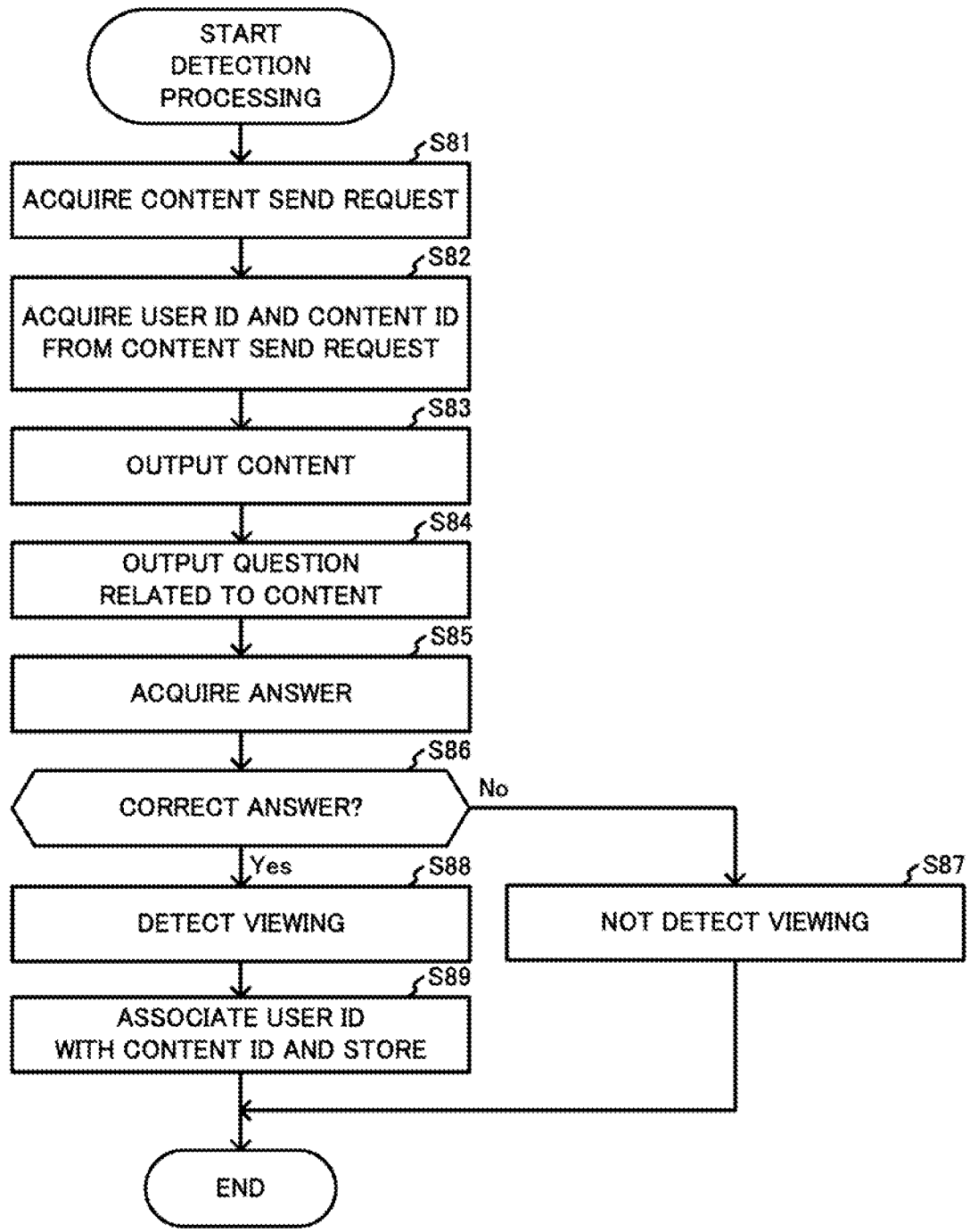
FIG. 17 is a flowchart illustrating an example of detection processing executed by the control device of the storage system according to Embodiment 1.

Thereafter, in accordance with the viewing instruction, the user U1 performs the viewing start operation on the locker 300, and a first content send request corresponding to the viewing start operation is output in step S61 of FIG. 15. When the data communication circuit 104a of the control device 100 receives the first content send request, the CPU 101 outputs the content in response to the content send request and, then, performs a first execution of detection processing such as illustrated in FIG. 17 for detecting whether or not the content has been viewed. Thus, the CPU 101 functions as a detector 150 such as illustrated in FIG. 3 that detects whether or not content has been viewed.

A question table such as illustrated in FIG. 18 is stored in advance in the information storage 190 of the control device 100. Questions related to content and answers to those questions are stored in advance in the question table. A plurality of records is stored in advance in the question table. A content ID identifying the content, information expressing a question related to that content, and information expressing a correct answer to that question are associated and stored in advance in each record.

In the present embodiment, a description is given in which the content C1 is content explaining a precaution related to the article G1, and includes both video content and audio content. As such, in the present embodiment, a description is given in which the question related to the content C1 is a question related to video content, and includes a first question that is a question related to the video content and asks about a precaution included in the video content, and a second question that is related to the audio content and asks about a precaution included in the audio content. Furthermore, in the present embodiment, a description is given in which the correct answer to the question includes both a first correct answer that is a correct answer to the first question and a second correct answer that is a correct answer to the second question.

When the execution of the first detection processing starts, the acquirer 110 of the control device 100 acquires the content send request from the data communication circuit 104a (step S81), and acquires the user ID "U1" and the content ID "./C1.mpg" included in the acquired content send request (step S82).

Next, the outputter 140 of the control device 100 reads, from the information storage 190, the content C1 identified by the acquired content ID "./C1.mpg", and outputs the read content C1 to the data communication circuit 104a with the locker 300 that sent the content send request as the destination (step S83).

Thereafter, the detector 150 of the control device 100 acquires the information expressing the first question and the information expressing the second question that are associated with the content ID "./C1.mpg" in the question table of FIG. 18. Next, the detector 150 outputs the acquired information to the data communication circuit 104a with the locker 300 as the destination (step S84).

After sending the information expressing the first question and the information expressing the second question, the data communication circuit 104a of the control device 100 receives, from the locker 300, the information expressing the first first answer and the information expressing the first second answer output in step S64 of FIG. 15. Then, the detector 150 of the control device 100 acquires these pieces of information from the data communication circuit 104a (step S85).

Next, the detector 150 of the control device 100 acquires the information expressing the first correct answer and the information expressing the second correct answer associated with the content ID "./C1.mpg" in the question table of FIG. 18. Thereafter, the detector 150 determines that the information expressing the first first answer does not match the information expressing the first correct answer and, also, that the information expressing the first second answer does not match the information expressing the second correct answer. As such, the detector 150 determines that the user U1 did not correctly answer both the first question and the second question (step S86; No). Next, the detector 150 detects that the video content included in the content C1 has not been watched and also the audio content included in the content C1 has not been listened to by the user U1. That is, the detector 150 does not detect viewing of the content C1 by the user U1 (step S87). Thereafter, the detector 150 ends the first detection processing.

Thereafter, when the second unlock permission prohibition inquiry outputted in step S45 of FIG. 14 is received, the CPU 101 of the control device 100 performs a second execution of the unlock permission prohibition processing illustrated in FIG. 16. In the first detection processing, viewing of the content C1 by the user U1 is not detected and, as such, the processing of steps S71 to S76 is executed. As a result, a second forbid unlocking command and a second viewing instruction are output.

Thereafter, when the viewing start operation is performed in accordance with the second viewing instruction and the second content send request outputted in step S61 of FIG. 15 is received, the CPU 101 of the control device 100 performs a second execution of the detection processing illustrated in FIG. 17.

When the execution of the second detection processing starts, the processing of steps S81 to S85 is executed again and, as a result, information expressing a second first answer and information expressing a second second answer are acquired (steps S81 to S85).

Next, the detector 150 of the control device 100 performs at least one of a determination that the information expressing the second first answer matches the information expressing the first correct answer, or a determination that the information expressing the second second answer matches the information expressing the second correct answer. As such, the detector 150 determines that the user U1 has correctly answered at least one of the first question or the second question (step S86; Yes).

Next, the detector 150 detects at least one of that the video content included in the content C1 has been watched by the user U1 or that the audio content included in the content C1 has been listened to by the user U1. That is, the detector 150 detects viewing of the content C1 by the user U1 (step S88).

Next, the storer 120 of the control device 100 associates and stores, in the viewing table of FIG. 7, the content ID "./C1.mpg" of the viewed content C1, and the user ID "U1" of the user U1 that performed the viewing (step S89), and ends the second detection processing.

Thereafter, when a third unlock permission prohibition inquiry outputted in step S45 of FIG. 14 is received, the CPU 101 of the control device 100 performs a third execution of the unlock permission prohibition processing illustrated in FIG. 16. In the second detection processing, viewing of the content C1 by the user U1 is detected and, as such, after the processing of steps S71 to S73 is executed, the forbidder 160 determines that the content C1 has been viewed by the user U1 (step S74; Yes).

Thereafter, the allower 170 of the control device 100 outputs, to the data communication circuit 104a with the locker 300 as the destination, an allow unlocking notification for allowing unlocking of the storage unit 310 identified by the storage unit ID "S1" (step S77), and ends the second execution of the unlock permission prohibition processing.

According to these configurations, the control device 100 controls the locker 300 that includes the storage unit 310 in which the article G1 is stored. Additionally, the control device 100 includes the forbidder 160 that forbids unlocking of the storage unit 310 when video content of the content C1 associated with the article G1 has not been watched and also audio content of the content C1 associated with the article G1 has not been listened to by the user U1 that performs an unlocking operation for unlocking the storage unit 310. As such, the control device 100 can forbid unlocking of the storage unit 310 in which the article G1 is stored when the content C1 associated with the article G1 is neither viewed nor listened to by the user U1.

Additionally, according to these configurations, the control device 100 includes the allower 170 that allows unlocking of the storage unit 310 in which the article G1 is stored in at least one of the case in which the video content of the content C1 is watched by the user U1, the case in which the audio content of the content C1 is listened to by the user U1, or the case in which the video content is watched and also the audio content is listened to by the user U1. As such, the control device 100 can allow the user UT to retrieve the article G1 from the storage unit 310 in at least one of the case in which the video content is watched by the user U1, the case in which the audio content is listened to by the user U1, or the case in which the video content is watched and also the audio content is listened to by the user U1.

Furthermore, according to these configurations, the content C1 associated with the article G1 is content explaining a precaution related to the article G1. As such, the forbidder 160 of the control device 100 forbids unlocking of the storage unit 310 in which the article G1 is stored when the precaution of the article G1 has not been watched and has not been listened to by the user U1. Therefore, the control device 100 can prevent the article G1 from being handed over to the user U1 before the user U1 watches and/or listens to the precaution. Additionally, the allower 170 of the control device 100 allows unlocking of the storage unit 310 in which the article G1 is stored in at least one of the case in which the precaution related to the article G1 has been watched, the case in which the precaution has been listened to, or the case in which the precaution has been watched and also listened to by the user U1. Therefore, the control device 100 can hand over the article G1 to the user U1 after the user U1 watches, listens to, or watches and listens to the precaution related to the article G1. Moreover, the precaution related to the article G1 includes at least one of a precaution for use of the article G1, a precaution for storage of the article G1, or a precaution for transportation of the article G1. As such, the control device 100 can improve at least one of safety in use of the article G1 by the user U1, safety in storage of the article G1 by the user U1, or safety in transportation of the article G1 by the user U1.

According to these configurations, the control device 100 includes the instructor 130 that, when the video content of the content C1 has not been watched and also the audio content of the content C1 has not been listened to, performs at least one of instructing the user U1 to watch the video content or instructing the user U1 to listen to the audio content. Additionally, the control device 100 includes the outputter 140 that outputs the content C1, and the detector 150 that detects at least one of that the video content has been watched or that the audio content has been listened to by the user U1. Furthermore, when at least one of the watching or the listening is detected, the allower 170 of the control device 100 allows unlocking of the storage unit 310 in which the article G1 is stored. Due to these configurations, the control device 100 can instruct the user U1 to perform operations required for unlocking of the storage unit 310 to be allowed, and the storage unit 310 can be unlocked when the user operates according to the instruction. As such, the control device 100 can improve the convenience of the user U1.

Furthermore, according to these configurations, the outputter 140 of the control device 100 outputs questions related to the outputted content C1. Additionally, when the answers of the user U1 to the outputted questions are correct answers, the detector 150 of the control device 100 detects at least one of that the video content of the content C1 has been watched or that the audio content of the content C1 has been listened to. Due to these configurations, the control device 100 can detect, with good accuracy, at least one of that the content C1 has been watched or that the content C1 has been listened to by the user U1.

Modified Example 1 of Embodiment 1

In Embodiment 1, an example is described of a case in which the user U1 does not follow the viewing instruction by the time the user U1 arrives at the locker 300. However, in the present modified example, an example is described of a case in which the user U1 follows the viewing instruction.

Figure 19:
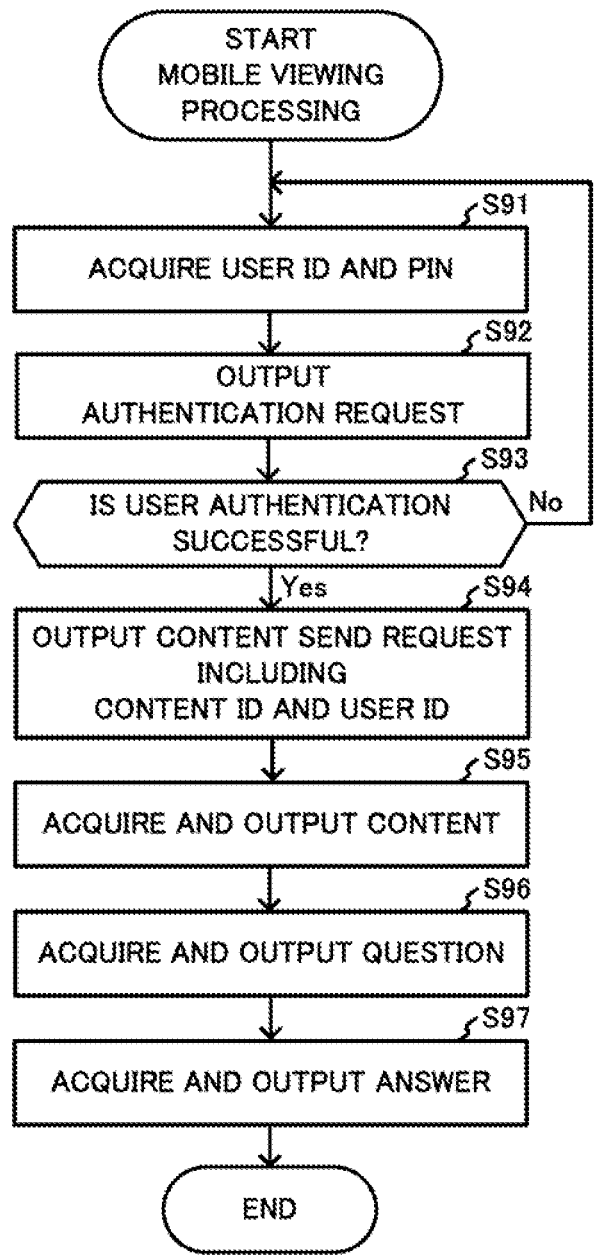
FIG. 19 is a flowchart illustrating an example of mobile viewing processing executed by the mobile terminal.

When the user U1 performs, on the input device 205c, the viewing start operation in accordance with the viewing instruction displayed on the mobile terminal 200, the input device 205c outputs a signal corresponding to that operation. When the signal is output from the input device 205c, the CPU 201 of the mobile terminal 200 starts the execution of mobile viewing processing such as illustrated in FIG. 19, and executes the same processing as steps S42 and S43 of FIG. 14. As a result, the CPU 201 acquires the PIN and the user ID "U1" of the user U1 and outputs, with the control device 100 as the destination, an authentication request including the user ID "UT" and the PIN (steps S91 and S92).

When, after the data communication circuit 204a of the mobile terminal 200 sends the authentication request, information expressing that the user authentication has failed is received (step S93; No), the CPU 201 repeats the processing from step S91. In contrast, when information expressing that the user authentication has succeeded is received (step S93; Yes), the CPU 201 executes the same processing as steps S61 to S64 of the viewing processing illustrated in FIG. 15 (steps S94 to S97), and ends the execution of the mobile viewing processing. As a result, the mobile terminal 200 sequentially performs sending of the content send request, receiving and outputting of the content C1, receiving and outputting of the first question and the second question related to the content C1, and acquiring and sending of the first answer and the second answer of the user U1.

When the content send request output in step S94 of FIG. 19 is received, the control device 100 starts the execution of the detection processing illustrated in FIG. 17, and executes the processing of steps S81 to S85. As a result, the control device 100 sequentially performs sending of the content C1, sending of the information expressing the first question and the second question, and receiving of the information expressing the first answer and the second answer.

In the present modified example, an example is described of a case in which the first answer and the second answer are incorrect answers. As such, the control device 100 executes the processing of steps S86 and S87, as a result the control device 100 does not detect that the content C1 has been viewed by the user U1, and thereafter, the control device 100 ends the execution of the detection processing.

Thereafter, after the article G1 is delivered to the locker 300, when the user U1 arrives at the locker 300 and performs an unlocking operation or the like on the locker 300, the locker 300 starts the execution of the unlocking control processing illustrated in FIG. 14. Next, as in Embodiment 1, the locker 300 executes the processing of steps S41 to S45 (steps S41 to S45), thereby sending an unlock permission prohibition inquiry to the control device 100.

In the present modified example, the user U1 follows the viewing instruction and performs the viewing start operation on the mobile terminal 200 by the time the user U1 arrives at the locker 300, but the control device 100 does not detect viewing of the content C1 by the user U1. As such, the locker 300 receives a forbid unlocking command from the control device 100 and determines that unlocking of the storage unit 310 in which the article G1 is stored is not allowed (step S46; No) Thereafter, as in Embodiment 1, the locker 300 continues the processing from step S47 in which the viewing instruction of the content C1 is output (step S47 to S53).

Modified Example 2 of Embodiment 1 In Modified Example 1 of Embodiment 1, an example is described of a case in which the user U1 follows the viewing instruction and performs the viewing start operation on the mobile terminal 200 by the time the user U1 arrives at the locker 300, but the control device 100 does not detect viewing of the content C1 by the user U1. However, in the present modified example, an example is described of a case in which viewing of the content C1 by the user U1 is detected by the time the user U1 arrives at the locker 300.

When the content send request sent by the mobile terminal 200 is received, the control device 100 executes the detection processing of FIG. 17, thereby receiving, from the mobile terminal 200, the information expressing the first answer and the information expressing the second answer.

In the present modified example, an example is described of a case in which at least one of the first answer or the second answer is a correct answer. As such, the control device 100 detects that the content C1 has been viewed by the user U1.

Thereafter, after the article G1 is delivered to the locker 300, when the user UT that arrives at the locker 300 performs an unlocking operation or the like on the locker 300, the locker 300 starts the execution of the unlocking control processing illustrated in FIG. 14. Next, as in Modified Example 1 of Embodiment 1, the locker 300 executes the processing of steps S41 to S45 (steps S41 to S45), thereby sending an unlock permission prohibition inquiry to the control device 100.

In the present modified example, viewing of the content C1 by the user U1 is detected before the user U1 arrives at the locker 300. Therefore, the locker 300 receives an allow unlocking notification from the control device 100. As such, different from Modified Example 1 of Embodiment 1, the locker 300 determines that unlocking of the storage unit 310 in which the article G1 is stored is allowed (step S46; Yes). Thereafter, the locker 300 continues the processing from step S50 in which the password is acquired (steps S50 to S53). As a result, when the acquired password and the password stored in the storage table of FIG. 11 match, the locker 300 performs unlocking of the storage unit 310.

According to these configurations, when a delivery request is received, the instructor 130 of the control device 100 sends a viewing instruction instructing viewing of the content C1 to the mobile terminal 200 of the user U1 that is the addressee of the article G1 requested to be delivered. Additionally, the user U1 can follow the viewing instruction and view the content C1 on the mobile terminal 200 even before arriving at the locker 300. As such, the control device 100 can improve flexibility in timing at which the user U1 performs the operations required for unlocking to be allowed.

Modified Example 3 of Embodiment 1

In Embodiment 1, a description is given in which, in step S76 of FIG. 16, the instructor 130 of the control device 100 outputs the viewing instruction with the locker 300 that is operated by the user U1 as the destination. However, the present disclosure is not limited thereto and, the instructor 130 of the control device 100 according to the present modified example outputs, in step S76, an electronic mail including the viewing instruction with the electronic mail address of the user U1 as the destination.

In Embodiment 1, a description is given in which the CPU 321 of the locker 300 executes the unlocking control processing illustrated in FIG. 14. At this time, it is described that, in step S47, the CPU 321 causes the touch screen 325 or the speaker 329a of the locker 300 to output the viewing instruction received by the data communication circuit 324a. Additionally, it is described that, when the user U1 follows the viewing instruction and performs the viewing start operation on the touch screen 325 (step S48; Yes), the CPU 321 executes the viewing processing of FIG. 15 (step S49) and, then, returns to step S45 and repeats the processing.

Figure 20:
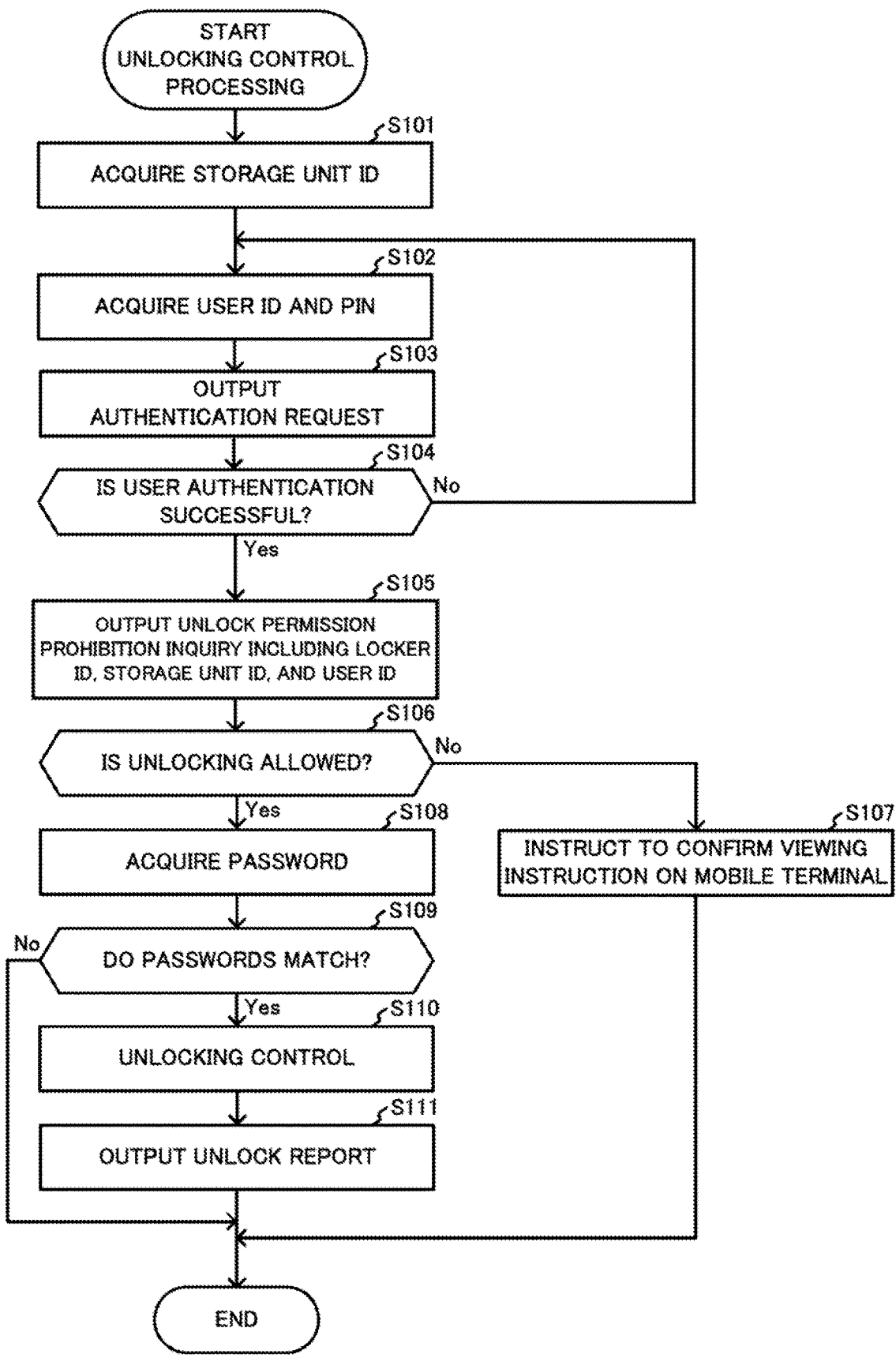
FIG. 20 is a flowchart illustrating an example of unlocking control processing executed by a control device of a locker according to Modified Example 3 of Embodiment 1.

However, the present disclosure is not limited thereto. The CPU 321 of the locker 300 according to the present modified example executes unlocking control processing such as illustrated in FIG. 20. When the execution of the unlocking control processing of FIG. 20 starts, the CPU 321 of the locker 300 executes the same processing as steps S41 to S45 of FIG. 14 (steps S101 to S105). Thereafter, when the CPU 321 determines that unlocking is forbidden (step S106; No), the CPU 321 causes the touch screen 325 or the speaker 329a to output a confirmation instruction (step S107), and ends the execution of the unlocking control processing. Here, the configuration instruction is a message instructing to confirm the viewing instruction using the mobile terminal 200.

Thereafter, when the viewing start operation is performed on the mobile terminal 200 by the user U1 that confirms the viewing instruction using the mobile terminal 200, the mobile terminal 200 according to the present modified example executes the mobile viewing processing illustrated in FIG. 19, thereby sending a content send request to the control device 100. The control device 100 that receives the content send request executes the detection processing of FIG. 17, thereby returning the content C1 and detecting whether or not the content C1 has been viewed by the user UT.

The user U1 that has completed viewing the content C1 performs the unlocking operation or the like again on the touch screen 325 of the locker 300. When the touch screen 325 outputs a signal corresponding to that operation, the CPU 321 of the locker 300 executes the unlocking control processing of FIG. 20 again.

When the execution of the unlocking control processing starts again, the CPU 321 of the locker 300 executes the processing of steps S101 to S105 again. At this time, when viewing is not detected by the control device 100, the CPU 321 of the locker 300 determines that unlocking is not allowed (step S106; No), executes the processing of step S107 again and, then, ends the execution of the unlocking control processing.

In contrast, when viewing is detected, the CPU 321 of the locker 300 determines that unlocking is allowed (step S106; Yes). Thereafter, the CPU 321 executes the same processing as steps S50 to S53 of FIG. 14 (steps S108 to S111), thereby unlocking the storage unit 310. Then, the CPU 321 ends the execution of the unlocking control processing.

According to these configurations, the control device 100 sends the viewing instruction and the content C1 to the mobile terminal 200. The mobile terminal 200 displays the viewing instruction and, when the user U1 that follows the viewing instruction performs the viewing start operation, the mobile terminal 200 visually outputs or audibly outputs the content C1. As such, the control device 100 can reduce the time that the user U1 exclusively uses the locker 300 compared to when the control device 100 sends the viewing instruction and the content C1 to the locker 300, and the locker 300 visually outputs or audibly outputs the viewing instruction and the content C1. Therefore, the control device 100 can improve the utilization efficiency of the locker 300. In the present embodiment, the utilization efficiency of the locker 300 is expressed as the number of users that use the locker 300 in a unit time, for example.

In the present modified example, a description is given in which, in step S107 of FIG. 20, the locker 300 displays a message instructing to confirm the viewing instruction using the mobile terminal 200 and, then, ends the execution of the unlocking control processing. However, the present disclosure is not limited thereto, and a configuration is possible in which the locker 300 executes the processing of step S107 of FIG. 20 and, then, returns to step S105 and repeats the processing.

Modified Example 4 of Embodiment 1

In Embodiment 1, a description is given in which the user U1 that is the addressee performs, on the locker 300, the unlocking operation for unlocking the storage unit 310 of the locker 300. However, the present disclosure is not limited thereto. In the present modified example, the unlocking operation is performed by a mandatary to whom the user U1 communicates the password and to whom retrieval of the article G1 is entrusted.

In step 42 of FIG. 14, the CPU 321 of the locker 300 according to the present modified example acquires the user ID and the PIN of the mandatary instead of the user ID "U1" and the PIN of the user U1. The CPU 101 of the control device 100 according to the present modified example carries out the user authentication on the basis of the user ID and the PIN of the mandatary that are included in the authentication request.

In step S45 of FIG. 14, the CPU 321 of the locker 300 outputs an unlock permission prohibition inquiry including the user ID of the mandatary instead of the user ID "U1" of the user U1. Furthermore, the CPU 101 of the control device 100 executes the unlock permission prohibition processing of FIG. 16 using the user ID of the mandatary included in the unlock permission prohibition inquiry. Specifically, when a determination is made that the content C1 is viewed by the mandatary (step S74; Yes), the CPU 101 of the control device 100 outputs the allow unlocking notification with the locker 300 as the destination (step S77). In contrast, when a determination is made that the content C1 is not viewed by the mandatary (step S74; No), the CPU 101 of the control device 100 outputs the forbid unlocking notification and the viewing instruction (steps S75 and S76).

Furthermore, in step S61 of FIG. 15, the CPU 321 of the locker 300 outputs a content send request that includes the user ID of the mandatary, and the CPU 101 of the control device 100 executes the detection processing of FIG. 17 using the user ID of the mandatary included in the content send request.

Modified Example 5 of Embodiment 1

In Embodiment 1, a description is given in which the phrase "view the content" means at least one of watching the video content or listening to the audio content. Additionally, in Embodiment 1, a description is given in which the phrase "has not viewed the content" means has not watched the video content and has not listened to the audio content.

However, in the present modified example, the phrase "view the content" means both watching the video content and listening to the audio content. Additionally, in the present modified example, the phrase "has not viewed the content" means at least one of has not watched the video content, or has not listened to the audio content.

As such, in step S05 of FIG. 5, when the content ID "./C1.mpg" and the user ID "U1" are associated with each other in the viewing table of FIG. 7, the instructor 130 of the control device 100 according to the present modified example determines that the content C1 has been viewed by the user U1 (step S05; Yes). That is, the instructor 130 determines that the user U1 has watched the video content included in the content C1 and also listened to the audio content included in the content C1.

In contrast, when the content ID "./C1.mpg" and the user ID "U1" are not associated with each other, the instructor 130 of the control device 100 determines that the content C1 has not been viewed by the user U1 (step S05; No). That is, the instructor 130 makes at least one of a determination that the video content has not been watched by the user U1 or a determination that the audio content has not been listened to by the user U1. Thereafter, the instructor 130 outputs a viewing instruction instructing the user U1 to both watch the video content and listen to the audio content. That is, the instructor 130 instructs the user U1 to view the content C1 (step S06).

In step S86 of FIG. 17, when a determination is made that the user U1 correctly answers both the first question related to the video content and the second question related to the audio content (step S86; Yes), the detector 150 of the control device 100 according to the present modified example detects that the content C1 has been viewed by the user U1 (step S88). Specifically, the detector 150 detects that the video content has been watched and also the audio content has been listened to by the user U1.

In contrast, when a determination is made that the user U1 does not correctly answer at least one of the first question or the second question (step S86; No), the detector 150 of the control device 100 detects at least one of that the video content has not been watched or that the audio content has not been listened to by the user U1. Specifically, the detector 150 detects that the content C1 has not been viewed by the user U1 (step S87).

Thereafter, when a determination is made in step S74 of FIG. 16 that the content C1 has not been viewed by the user U1 (step S74; No), the forbidder 160 of the control device 100 outputs a forbid unlocking command (step S75). In contrast, when a determination is made that the content C1 has been viewed by the user U1 (step S74; Yes), the allower 170 outputs an allow unlocking notification (step S77).

According to these configurations, the forbidder 160 of the control device 100 forbids unlocking the storage unit 310 in at least one of the case in which the video content included in the content C1 associated with the article G1 has not been watched, the case in which the audio content included in the content C1 has not been listened to, or the case in which the video content has not been watched and also the audio content has not been listened to by the user U1 that performs the unlock operation for unlocking the storage unit 310. As such, the control device 100 can forbid unlocking of the storage unit 310 of the locker 300 in which the article G1 is stored in at least one of the case in which the content C1 associated with the article G1 has not been watched, the case in which the content C1 has not been listened to, or the case in which the content C1 has neither been watched nor listened to by the user U1.

According to these configurations, the control device 100 includes the allower 170 that allows unlocking of the storage unit 310 in which the article G1 is stored when the video content of the content C1 has been watched and also the audio content of the content C1 has been listened to by the user U1. As such, the control device 100 can allow the user U1 to retrieve the article G1 from the storage unit 310 when the content C1 has been watched and listened to by the user U1.

In the present modified example, a description is given in which the term "content" includes both video content and audio content, and means both watching the video content and listening to the audio content. Additionally, in the present modified example, a description is given in which the phrase "has not viewed the content" means at least one of has not watched the video content or has not listened to the audio content. However, the present disclosure is not limited thereto, and the term "content" may include both the video content and the audio content, or may include the video content but not include the audio content. Additionally, the phrase "view the content" may mean watching the video content, and the phrase "has not viewed the content" may mean has not watched the video content.

Additionally, the present disclosure is not limited thereto, and the term "content" may include both the video content and the audio content, or may include the audio content but not include the video content. Moreover, the phrase "view the content" may mean listening to the audio content, and the phrase "has not viewed the content" may mean has not listened to the audio content.

Modified Example 6 of Embodiment 1

Figure 21:
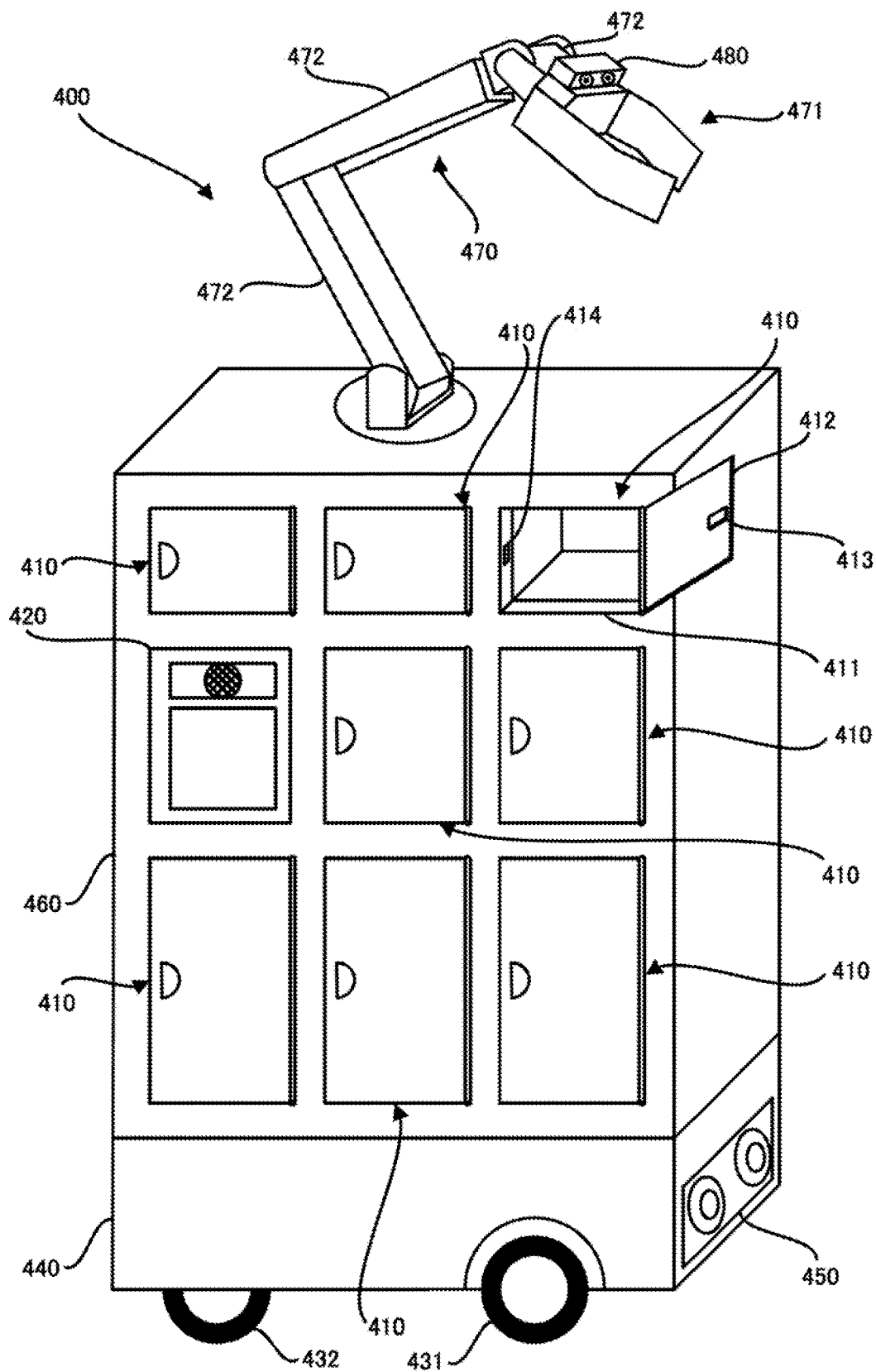
FIG. 21 is an appearance configuration drawing illustrating an example of the appearance of a delivery vehicle according to Modified Example 6 of Embodiment 1.

In Embodiment 1, it is described that a worker of a delivery company delivers the article G1. However, the present disclosure is not limited thereto. In the present modified example, a delivery vehicle 400 such as illustrated in FIG. 21 delivers the article G1. In this case, the delivery vehicle 400 is an unmanned ground vehicle that travels on the ground.

Figure 22:
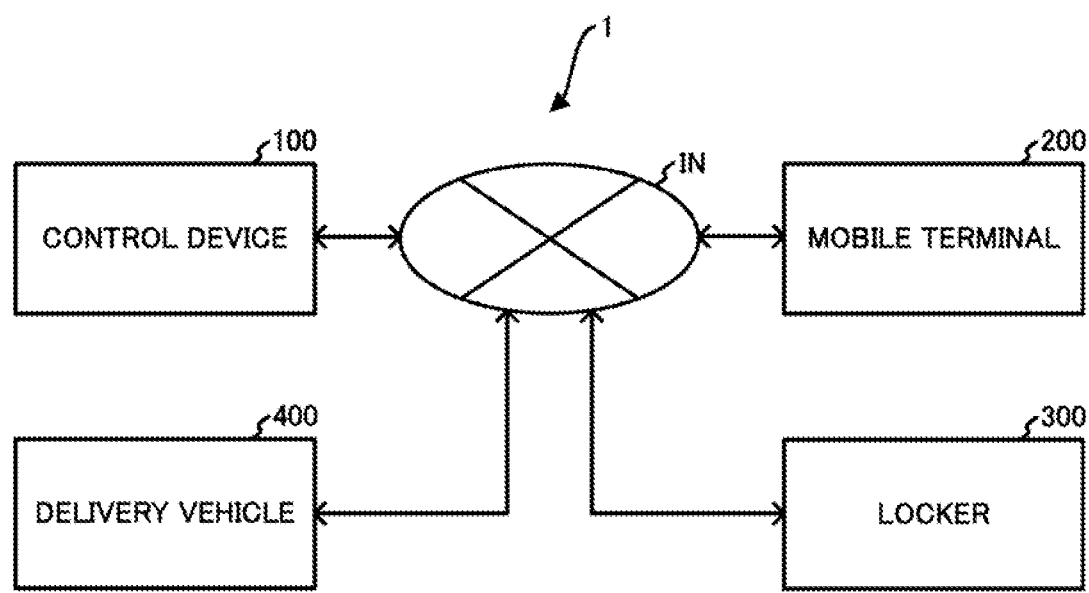
FIG. 22 is a system configuration drawing illustrating a configuration example of a storage system according to Modified Example 6 of Embodiment 1.

As such, as illustrated in FIG. 22, the storage system 1 according to the present modified example includes the control device 100, the mobile terminal 200, and the locker 300 described in Embodiment 1, and the delivery vehicle 400.

The delivery vehicle 400 is located at an office of the delivery company. As illustrated in FIG. 21, the delivery vehicle 400 includes a chassis 440 that is provided with a plurality of wheels including wheels 431 and 432, and an imaging device 450 that is installed on a front face of the chassis 440 and of which the optical axis and angle of view are adjusted such that space in front of the delivery vehicle 400 is included in the imaging range.

The imaging device 450 is implemented as a digital stereo camera. The imaging device 450 outputs signals expressing two images that have parallax with each other. The imaging device 450 outputs such signals in order to allow the delivery vehicle 400 to identify, on the basis of the parallax, three-dimensional coordinate values, sizes, and the like of obstacles located in front of the delivery vehicle 400 or a user located in front of the delivery vehicle 400.

Furthermore, the delivery vehicle 400 includes a locker 460 that is installed on the chassis 440. The locker 460 includes a plurality of storage units 410, and a control device 420. The locker 460 may include only one storage unit 410.

Each storage unit 410 of the locker 460 includes a door frame 411, a door 412, a dead bolt 413, a strike plate 414, and a non-illustrated motor. These configurations and functions of the locker 460 are the same as the configurations and functions of the door frame 311, the door 312, the deadbolt 313, the strike plate 314, and the non-illustrated motor of the locker 300 illustrated in FIG. 9.

In order to deliver an article stored in a storage unit 410, the control device 420 of the locker 460 causes the plurality of wheels to rotate on the basis of the signals output from the imaging device 450 so as to travel while avoiding obstacles.

The control device 420 includes a CPU, a RAM, a ROM, a flash memory, a data communication circuit, a touch screen, and a speaker that are non-illustrated. These configurations and features of the control device 420 are the same as the configurations and features of the CPU 321, the RAM 322, the ROM 323a, the flash memory 323b, the data communication circuit 324a, the touch screen 325, and the speaker 329a of the locker 300 illustrated in FIG. 10.

The control device 420 further includes a global positioning system (GPS) circuit, an input/output port, and a drive circuit that are non-illustrated. The non-illustrated GPS circuit receives a GPS signal emitted from a GPS satellite, measures the latitude and longitude of the delivery vehicle 400 on the basis of the received GPS signal, and outputs a signal expressing the measured latitude and longitude.

The non-illustrated input/output port is connected to the imaging device 450 via a non-illustrated cable, outputs, to the imaging device 450, the signals output by the non-illustrated CPU, and inputs, into the CPU, the signals output by the imaging device 450.

The non-illustrated drive circuit is connected, via a non-illustrated plurality of cables, to the non-illustrated motor of each of the plurality of doors 412, and the non-illustrated plurality of motors that rotate each of the plurality of wheels. The non-illustrated drive circuit drives each of the motors in accordance with signals output by the non-illustrated CPU.

The locker 460 further includes a robot arm 470 that transfers the articles stored in the storage units 410 from the locker 460 to the locker 300. The robot arm 470 is implemented as a vertical articulated robot. The robot arm 470 includes a drive circuit that drives a non-illustrated motor in accordance with signals output from the non-illustrated input/output port of the control device 420 of the locker 460, and a two-claw-type gripper 471 that is opened and closed in parallel by the motor.

The robot arm 470 also includes an imaging device 480 that is mounted on the gripper 471 and that has an optical axis and an angle of view that are adjusted such that the tips of the claws of the gripper 471 are included in the imaging range, a plurality of joint structures that can be moved by non-illustrated motors, and a plurality of arms 472 that move around the joint structures. The gripper 471 is not limited to two-claw-type grippers and may have three or more claws, or may include a plurality of fingers instead of the two claws.

The imaging device 480 of the robot arm 470 is implemented as a digital stereo camera. The imaging device 480 performs imaging in accordance with signals output from the non-illustrated input/output port of the control device 420, and outputs, to the control device 420, a signal expressing two images that have parallax with each other. Such a signal is output to the control device 420 because the control device 420 identifies, on the basis of the parallax of the two images, the positional coordinates in three-dimensional space, the size, and the like of the article set to be gripped by the gripper 471.

When the article G1 is brought to the office, the worker of the delivery company places the article G1 in the storage unit 410 of the delivery vehicle 400 and, then, confirms the delivery ID "D1" and the address of the delivery destination printed on the slip. Thereafter, the worker performs, on a non-illustrated touch screen of the delivery vehicle 400, an operation for inputting the delivery ID "D1" and the address of the delivery destination.

Figure 23:
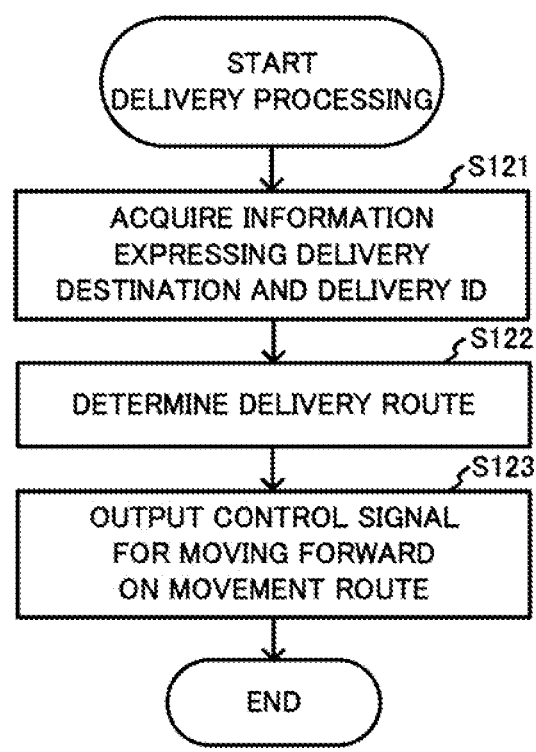
FIG. 23 is a flowchart illustrating an example of delivery processing executed by the delivery vehicle.

When the touch screen of the delivery vehicle 400 outputs a signal corresponding to the operation, the non-illustrated CPU of the delivery vehicle 400 starts execution of delivery processing such as illustrated in FIG. 23. When the execution of the delivery processing starts, the CPU acquires, on the basis of the signal output by the touch screen, the delivery ID "D1" and information expressing the address of the delivery destination (step S121). Next, the CPU acquires, from a non-illustrated address table stored in advance in the non-illustrated flash memory, information expressing the latitude and longitude associated with the acquired information expressing the address.

Next, the CPU of the delivery vehicle 400 identifies the latitude and longitude of the delivery vehicle 400 on the basis of the signal output from the non-illustrated GPS circuit. Thereafter, the CPU of the delivery vehicle 400 reads a plurality of records from a non-illustrated partial route table in which information related to partial routes on which the delivery vehicle 400 can move, such as roads, for example, is stored in advance. The partial route table is stored in advance in the non-illustrated flash memory. The latitude and longitude of a start node of a partial route, the latitude and longitude of an end node of the partial route, and a length of an edge that is the partial route are associated and stored in advance in each record of the partial route table.

The CPU of the delivery vehicle 400 executes a route search algorithm such as, for example, Dijkstra's algorithm using the identified latitude and longitude of the delivery vehicle 400, the length of the edge that is the partial route and the latitude and longitude of the nodes stored in each of the read plurality of records, and the latitude and longitude of the delivery destination. Thus, the CPU calculates the shortest overall route from the current position of the delivery vehicle 400 to the delivery destination, and determines the calculated overall route as a delivery route (step S122).

Next, in order to cause the delivery vehicle 400 to move forward on the delivery route, the CPU of the delivery vehicle 400 acquires a signal from the GPS circuit, and generates a control signal for performing traveling so as to reduce the difference between the latitude and longitude of the delivery vehicle 400 expressed in the acquired signal and the latitude and longitude of the closest node of the plurality of un-passed nodes included in the delivery route. Thereafter, the CPU outputs the generated control signal to the non-illustrated drive circuit that is connected to the non-illustrated motors that rotate the plurality of wheels (step S123). Next, as long as there are un-passed nodes, the CPU of the delivery vehicle 400 repeats the processing described above from the acquiring of the signal from the GPS circuit.

Thereafter, when there are no un-passed nodes left, the CPU of the delivery vehicle 400 determines that the delivery vehicle 400 has arrived at the delivery destination, and ends the execution of the delivery processing.

Thereafter, the CPU of the delivery vehicle 400 reads, from the non-illustrated flash memory, the positional coordinates and the size of the opening of the storage unit 410 of the delivery vehicle 400. Additionally, the CPU outputs a control signal that causes the robot arm 470 to operate so that the storage unit 310 of the locker 300 is included in the imaging range of the imaging device 480 of the robot arm 470. Next, the CPU outputs, to the imaging device 480, a control signal commanding imaging to be performed, and calculates, on the basis of the signal output from the imaging device 480, the positional coordinates and the size of the opening of the storage unit 310 of the locker 300.

Thereafter, the CPU of the delivery vehicle 400 generates, on the basis of the read positional coordinates and size of the opening of the storage unit 410 and the calculated positional coordinates and size of the opening of the storage unit 310, a control signal for causing the robot arm 470 to transfer the article stored in the storage unit 410 to the storage unit 310. Then, the CPU outputs the generated control signal to the robot arm 470, and the robot arm 470 operates in accordance with the control signal to transfer the article G1.

Thereafter, the CPU of the delivery vehicle 400 generates a locking command that includes the delivery ID "D1" acquired in step S121, and the storage unit ID "S1" identifying the storage unit 310 of the locker 300 in which the article G1 is stored, and that commands locking of the storage unit 310. Next, the CPU outputs the locking command to the non-illustrated data communication circuit with the control device 100 as the destination. Then, the CPU of the delivery vehicle 400 outputs a control signal for traveling back on the delivery route, thereby causing the delivery vehicle 400 to return to the office of the delivery company.

When the data communication circuit 104a of the control device 100 receives the locking command, the CPU 101 acquires the locking command from the data communication circuit 104a, and acquires the delivery ID "D1" included in the locking command. Next, the CPU 101 acquires the locker ID "300" associated with the delivery ID "D1" in the delivery table of FIG. 4, and outputs the locking command to the data communication circuit 104a with the locker 300 identified by the locker ID "300" as the destination.

When the data communication circuit 324a of the locker 300 receives the locking command, the CPU 321 of the locker 300 executes the locking control processing illustrated in FIG. 12. As a result, the CPU 321 executes the processing of steps S21 to S25, thereby acquiring the delivery ID "D1" and the storage unit ID "S1" included in the locking command, and locking the storage unit 310 identified by the acquired storage unit ID "S1."

In the present modified example, a description is given in which the delivery vehicle 400 includes the robot arm 470, and uses the robot arm 470 to transfer the article G1 from the delivery vehicle 400 to the locker 300. However, the present disclosure is not limited thereto. A configuration is possible in which the locker 300 includes a non-illustrated robot arm that has configurations and functions that are the same as the configurations and functions of the robot arm 470, and uses this robot arm to transfer the article G1 from the delivery vehicle 400 to the locker 300.

In the present modified example, a description is given in which the delivery vehicle 400 sends the locking command to the control device 100, and the control device 100 transfers the received locking command to the locker 300. However, the present disclosure is not limited thereto. A configuration is possible in which the control device 100 does not transfer the locking command, and the delivery vehicle 400 sends the locking command to the locker 300 instead of to the control device 100.

Furthermore, in the present modified example, a description is given in which the delivery vehicle 400 is located at the office of the delivery company, and the worker of the delivery company places the article G1 in the storage unit 410 of the delivery vehicle 400 and performs an input operation for inputting the delivery ID "D1" and the address of the delivery destination into the delivery vehicle 400. However, the present disclosure is not limited thereto. A configuration is possible in which the delivery vehicle 400 is located at an office of a company R that sells the article G1, and a worker of the company R performs the input operation after placing the article G1 in the storage unit 410.

The present disclosure is not limited to the worker of the company R operating the delivery vehicle 400. A configuration is possible in which the worker of the company R places the article G1 in the storage unit 410 and, then, performs an operation for inputting the delivery ID "D1" into the input device 105c of the control device 100. In this case, when the input device 105c of the control device 100 outputs a signal corresponding to that operation, the CPU 101 of the control device 100 acquires the delivery ID "D1" on the basis of that signal. Next, the CPU 101 acquires the information expressing the address of the delivery destination associated, in the delivery table of FIG. 4, with the acquired delivery ID "D1", and outputs, to the data communication circuit 104a with the delivery vehicle 400 as the destination, a delivery command including the information expressing the address of the delivery destination and the acquired delivery ID "D1." Then, when the data communication circuit of the delivery vehicle 400 receives the delivery command, the CPU of the delivery vehicle 400 acquires the information expressing the address of the delivery destination and the delivery ID "D1" included in the received delivery command. Then, the CPU of the delivery vehicle 400 executes the same processing as steps S122 and S123 of FIG. 23, thereby delivering the article G1 to the delivery destination.

In the present embodiment, a description is given in which the delivery vehicle 400 includes a plurality of wheels. However, the present disclosure is not limited thereto, and a configuration is possible in which the delivery vehicle 400 includes two legs that include a plurality of joints, and walks bipedally.

Furthermore, in the present modified example, a description is given in which the delivery vehicle 400 is an unmanned ground vehicle. However, the delivery vehicle 400 need not be unmanned and, provided that, with the exception of the control by the control device 420, the delivery vehicle 400 is an autonomous traveling object, a person may ride the delivery vehicle 400.

Modified Example 7 of Embodiment 1

In Modified Example 6 of Embodiment 1, a description is given in which the storage system 1 includes the locker 300, and the delivery vehicle 400 that is an unmanned ground vehicle and that is provided with the robot arm 470 illustrated in FIG. 21. Additionally, in Modified Example 6 of Embodiment 1, the delivery vehicle 400 uses the robot arm 470 to transfer the article G1 from the delivery vehicle 400 to the locker 300.

Figure 24:
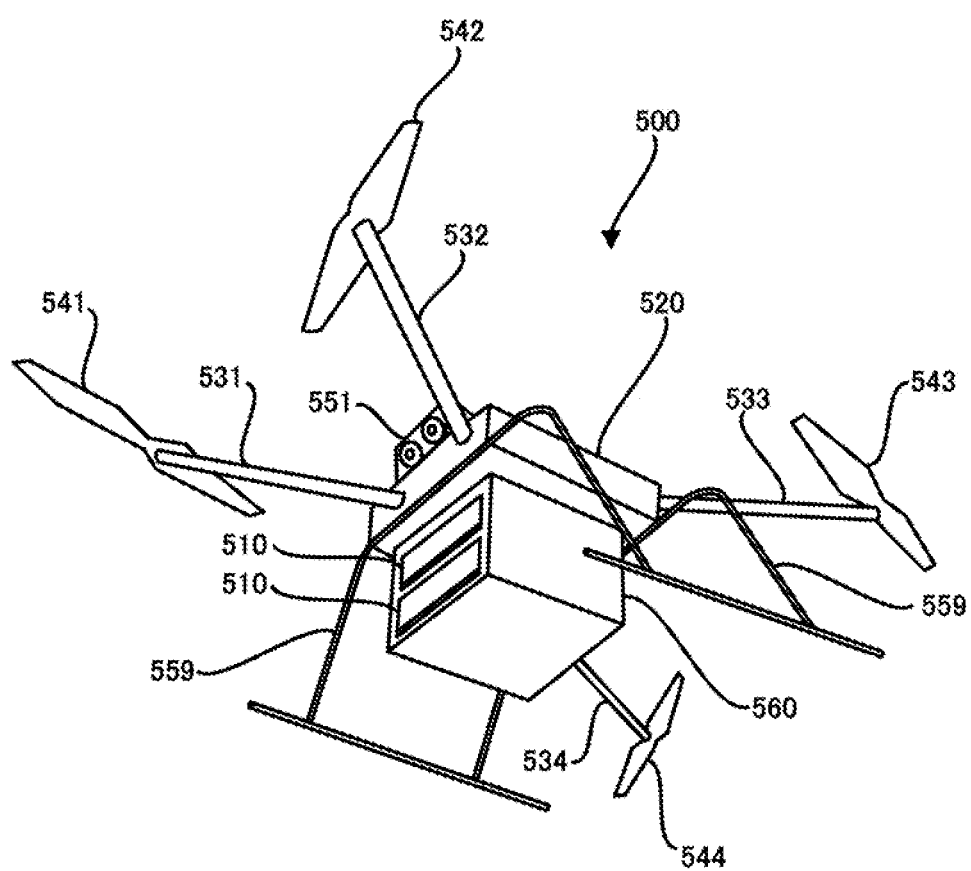
FIG. 24 is an appearance configuration drawing illustrating an example of the appearance of a delivery vehicle according to Modified Example 7 of Embodiment 1.

However, the present disclosure is not limited thereto, and the storage system 1 according to the present modified example includes a delivery vehicle 500 such as illustrated in FIG. 24 that is an unmanned aircraft such as a drone, for example. Additionally, the locker 300 according to the present modified example includes a non-illustrated robot arm that has configurations and functions that are the same as the configurations and functions of the robot arm 470 illustrated in FIG. 21, and uses this robot arm to transfer the article G1 from the delivery vehicle 500 to the locker 300.

The delivery vehicle 500 includes a control device 520 such that controls the attitude and flight of the delivery vehicle 500, and propeller arms 531 to 534 that respectively protrude forward to the right and forward to the left, and backward to the left and backward to the right from the control device 520. Additionally, the delivery vehicle 500 includes propellers 541 to 544 that are respectively installed on the tips of the propeller arms 531 to 534, and non-illustrated motors that rotate the propellers 541 to 544 in accordance with the control of the control device 520.

Furthermore, the delivery vehicle 500 includes an imaging device 551 that is provided on the top surface of the control device 520 and of which the optical axis and angle of view are adjusted such that space in front of the delivery vehicle 500 is included in the imaging range, and a support leg 559 that protrudes downward from a bottom surface of the control device 520 and that supports the control device 520. The imaging device 551 is implemented as a digital stereo camera. The imaging device 551 performs imaging in accordance with signals output from the control device 520, and outputs a signal expressing two images obtained by imaging that have parallax with each other to the control device 520.

Additionally, the delivery vehicle 500 includes a locker 560 that is fixed to the bottom surface of the control device 520. The locker 560 includes a plurality of storage units 510. The configurations and function of the storage units 510 are the same as the configurations and functions of the storage units 410 of the delivery vehicle 400 illustrated in FIG. 21.

The control device 520 of the delivery vehicle 500 includes a CPU, a RAM, a ROM, a flash memory, a data communication circuit, a touch screen, a GPS circuit, an input/output port, a drive circuit, and a speaker that are non-illustrated. These configurations and functions of the control device 520 of the delivery vehicle 500 are the same as the configurations and the functions of the CPU, the RAM, the ROM, the flash memory, the data communication circuit, the touch screen, the GPS circuit, and the speaker of the control device 420 of the delivery vehicle 400.

The input/output port of the delivery vehicle 500 is connected to a non-illustrated cable that is connected to the imaging device 551, outputs the signals output by the CPU to the imaging device 551, and inputs the signals output by the imaging device 551 into the CPU.

The drive circuit of the control device 520 is connected to non-illustrated cables connected to each of the non-illustrated plurality of motors that rotate the propellers 541 to 544, and drives the non-illustrated plurality of motors that rotate the propellers 541 to 544 in accordance with signals output by the CPU.

The non-illustrated CPU of the delivery vehicle 500 executes the delivery processing illustrated in FIG. 23 to deliver the article G1. When the execution of the delivery processing starts, the CPU executes the processing of steps S121 and S122, thereby determining the delivery route.

Next, the CPU of the delivery vehicle 500 outputs a control signal for taking off to the drive circuit that drives the motors of the propellers 541 to 544 and, then, generates and outputs a control signal for flying forward on the delivery route (step S123). Then, when the CPU determines that the delivery vehicle 500 has arrived at the delivery destination, the CPU generates a control signal for landing at a geographical location in the vicinity of the locker 300, or for continuing to hover at an altitude lower than a predetermined altitude in the air above a geographical location in the vicinity of the locker 300. The vicinity of the locker 300 is located a shorter distance than a predetermined distance from the locker 300. Next, the CPU outputs the generated control signal and, then, ends the execution of the delivery processing.

Thereafter, the CPU of the delivery vehicle 500 outputs, to the non-illustrated data communication circuit with the control device 100 as the destination, an arrival report that includes the delivery ID "D1" and that informs that the delivery vehicle 500 has arrived at the delivery destination.

When the data communication circuit 104a of the control device 100 receives the arrival report, the CPU 101 acquires the arrival report from the data communication circuit 104a, and acquires the delivery ID "D1" included in the arrival report. Next, the CPU 101 acquires the locker ID "300" associated with the delivery ID "D1" in the delivery table of FIG. 4, and outputs a transfer command commanding to transfer the article G1 from the delivery vehicle 500 to the locker 300, and a locking command to the data communication circuit 104a with the locker 300 identified by the locker ID "300" as the destination.

When the data communication circuit 324a of the locker 300 receives the transfer command and the locking command, the CPU 321 of the locker 300 executes the same processing as in Modified Example 6 of Embodiment 1, thereby generating a control signal for causing the non-illustrated robot arm to transfer the article G1 from the delivery vehicle 500 to the locker 300, and outputting the generated signal to the robot arm. Then, when the transferring of the article G1 by the robot arm is complete, a transfer completion report informing that the transfer is complete is output to the data communication circuit 324a with the control device 100 as the destination. Thereafter, the CPU 321 of the locker 300 executes the locking control processing illustrated in FIG. 12 in accordance with the locking command, thereby locking the storage unit 310 in which the article G1 is stored.

When the control device 100 receives the transfer completion report from the locker 300, the control device 100 forwards the transfer completion report to the delivery vehicle 500. Then, when the delivery vehicle 500 receives the transfer completion report, the delivery vehicle 500 starts to return to the office.

In the present modified example, a description is given in which the locker 300 includes a non-illustrated robot arm, and uses the robot arm to transfer the article G1 from the delivery vehicle 500 to the locker 300. However, the present disclosure is not limited thereto. A configuration is possible in which the delivery vehicle 500 includes a non-illustrated robot arm, and uses that robot arm to transfer the article G1 from the delivery vehicle 500 to the locker 300.

In the present modified example, a description is given in which the delivery vehicle 500 sends the arrival report to the control device 100, and the control device 100 that receives the arrival report sends the transfer command and the locking command to the locker 300. However, the present disclosure is not limited thereto. A configuration is possible in which the delivery vehicle 500 does not send the arrival report to the control device 100 and also sends the transfer command and the locking command to the locker 300. Furthermore, in the present modified example, a description is given in which the locker 300 sends the transfer completion report to the control device 100, and the control device 100 forwards the received transfer completion report to the delivery vehicle 500. However, the present disclosure is not limited thereto. A configuration is possible in which the control device 100 does not forward the transfer completion report, and the locker 300 sends the transfer completion report to the delivery vehicle 400 instead of to the control device 100.

In the present modified example, a description is given in which the delivery vehicle 500 is an unmanned aircraft. However, the delivery vehicle 500 need not be unmanned and, provided that, with the exception of the control by the control device 520, the delivery vehicle 500 is an autonomous flying object, a person may ride the delivery vehicle 500.

Modified Example 8 of Embodiment 1

In Embodiment 1, a description is given in which, in step S06 of FIG. 5, the control device 100 outputs an electronic mail that includes the viewing instruction and that has the electronic mail account of the user U1 as the destination. Additionally, a description is given in which, in step S34 of FIG. 13, the control device 100 outputs an electronic mail that includes the delivery completion notification and that has the electronic mail account of the user U1 as the destination. Furthermore, a description is given in which the mobile terminal 200 executes a program for functioning as an electronic mail client to receive and display these electronic mails.

However, the present disclosure is not limited thereto, and a configuration is possible in which the mobile terminal 200 executes an application distributed by the non-illustrated company R to receive and display the viewing instruction and the delivery completion notification. The application distributed by the company R may be any type of application provided that the application includes a function for displaying a push-sent message. For example, the application may include a chat function or a short message service (SMS) function.

To realize this, in step S06 of FIG. 5 and step S34 of FIG. 13, the control device 100 may push-send the viewing instruction and the delivery completion notification to the application that is being executed by the mobile terminal 200.

Modified Example 9 of Embodiment 1

In Embodiment 1, a description is given in which, in steps S83 and S84 of FIG. 17, the control device 100 outputs the content C1 and, then, outputs questions related to the content C1. However, the present disclosure is not limited thereto. A configuration is possible in which the control device 100 outputs a question related to an outputted portion of the content C1 while the content C1 is being output. Additionally, the number of times questions are output is not limited to one time, and the control device 100 may output questions over a plurality of times.

Modified Example 10 of Embodiment 1

In Embodiment 1, it is described that the locker 300 is installed at a train station, but the present disclosure is not limited thereto and the locker 300 may be installed at a bus stop or at a street car station, for example. Additionally, the locker 300 may be installed in the entrance or lobby of an apartment complex or office building, or on the doorstep of a house, for example. Furthermore, the locker 300 may be installed in the entrance or lobby of public facilities including schools, hospitals, government offices, courthouses, and airports, or in the entrance or lobby of commercial facilities including department stores, hotels, and outlet malls. Moreover, the locker 300 may be installed in the yards or parking spaces of houses, apartment complexes, office buildings, public facilities, or commercial facilities, or in parks, river beaches, forests, or mountains.

Modified Example 11 of Embodiment 1

In Embodiment 1, a description is given in which the control device 100 is managed by the non-illustrated company R that manages a website used to sell articles. However, the present disclosure is not limited thereto. For example, a configuration is possible in which the control device 100 is managed by a manufacturing company that manufactures articles, a storage company that stores articles, or a delivery company that delivers articles.

Modified Example 12 of Embodiment 1

In Embodiment 1, a description is given in which the control device 100 executes the viewing instruction processing illustrated in FIG. 5 at a predetermined time. However, the present disclosure is not limited thereto. Provided that the timing is in the period from when the article G1 is sold to when the article G1 is delivered to the locker 300, the control device 100 may execute the viewing instruction processing at any timing, and may execute the viewing instruction processing at any frequency. For example, the control device 100 may execute the viewing instruction processing at the timing at which the message instructing to issue, to the delivery company, a request to deliver the article G1 is output, or at the timing at which the delivery completion notification is output in step S34 of FIG. 13.

According to these configurations, the control device 100 outputs the viewing instruction in the period from when the article G1 is sold to when the article G1 is delivered to the locker 300. As such, compared to cases in which the control device 100 instructs a user considering a purchase of the article G1 to view the content C1 associated with the article G1, the burden on the user when purchasing the article G1 can be reduced. Additionally, since the control device 100 outputs the viewing instruction after the article G1 is sold, it is possible to prevent instructing users that consider but do not purchase the article G1 to view the content C1. As such, the processing load of the control device 100 required for the viewing instruction can be reduced.

Modified Example 13 of Embodiment 1

In Embodiment 1, a description is given in which the article G1 is a medical drug. However, the present disclosure is not limited thereto. The article G1 may be a medical product such as adhesive plasters and bandages, a medical device, health food, detergent, liquor, or cigarettes. Additionally, the article G1 may be a recording medium on which video containing sexual, violent, or cruel expressions are recorded. Furthermore, the article G1 may be an article of which the seller of the article G1 is obligated, legally or voluntarily by persons selling the article G1, to inform or make an effort to inform the user of a precaution related to at least one of transportation, storage, or use of the article G1.

"Use of the article G1" includes using the article G1 internally and externally, for example, and the "precaution for use" includes matters related to how to use the article G1 such as dissolving the article G1 in water and then taking the article G1, for example. Moreover, the "precaution for use" of the article G1 includes a precaution related to the timing of use of the article G1 such as, for example, ante cibos, inter cibos, post cibos, and hora somni, and a precaution related to the amount of the article G1 used such as one tablet per day, for example. Furthermore, the "precaution for use" of the article G1 includes a precaution related to users forbidden to use to the article G1. Users forbidden to use the article G1 include, for example, users that are pregnant or may be pregnant, users under a predetermined age such as minors, toddlers, and infants, and users that are allergic to specific substances. The "precaution for storage" and the "precaution for transportation" of the article G1 include matters related to temperatures suitable for storing and transporting the article G1, such as a requirement for refrigeration, for example.

In Embodiment 1, a description is given in which the content C1 associated with the article G1 is content explaining a precaution related to the article G1. However, the present disclosure is not limited thereto. A configuration is possible in which the content C1 associated with the article G1 is content including explanations related to the article G1 such as explanations about how to transport, how to store, and how to use the article G1, for example.

Furthermore, a configuration is possible in which the content C1 associated with the article G1 is advertising content that advertises the article G1, for example.

Modified Example 14 of Embodiment 1

In Embodiment 1, a description is given in which the article G1 is sold through a website. However, the present disclosure is not limited thereto. The article G1 need not be an article to be bought or sold and, for example, may be an article to be rented or may be an unfinished product that is not to be bought or sold.

Modified Example 15 of Embodiment 1

In Embodiment 1, a description is given in which the CPU 321 of the locker 300 acquires authentication information that is a combination of a user ID and a PIN. However, the present disclosure is not limited thereto. A configuration is possible in which the CPU 321 of the locker 300 acquires authentication information that is a combination of a user ID and a password.

Additionally, a configuration is possible in which the locker 300 includes a non-illustrated imaging device that is implemented as a digital camera and that has an optical axis and an angle of view that are adjusted such that the face or a hand of the user viewing the touch screen 325 is included in the imaging range. In this case, the CPU 321 of the locker 300 may identify, from an image generated by the imaging device, a feature of the face including an eye, an iris, the nose, the mouth, an ear, or a wrinkle, or a feature of a fingerprint or a vein. Then, the CPU 321 may acquire authentication information that is a combination of the user ID and information expressing the identified feature.

Modified Example 16 of Embodiment 1

A description is given in which the storage system 1 according to Modified Example 6 of Embodiment 1 includes the control device 100, the mobile terminal 200, the locker 300, and the delivery vehicle 400 as illustrated in FIG. 22. However, the present disclosure is not limited thereto. A configuration is possible in which the storage system 1 does not include the control device 100, and the control device 420 of the delivery vehicle 400 demonstrates the functions of the control device 100 according to Modified Example 6 of Embodiment 1.

A description is given in which the storage system 1 according to Modified Example 7 of Embodiment 1 includes the control device 100, the mobile terminal 200, the locker 300, and the delivery vehicle 500. However, the present disclosure is not limited thereto. A configuration is possible in which the storage system 1 does not include the control device 100, and the control device 520 of the delivery vehicle 500 demonstrates the functions of the control device 100 according to Modified Example 7 of Embodiment 1.

Embodiment 2

In Modified Example 6 of Embodiment 1, a description is given in which the storage system 1 includes the control device 100, the mobile terminal 200, the locker 300, and the delivery vehicle 400 that is an unmanned ground vehicle illustrated in FIG. 22. Additionally, in Modified Example 6 of Embodiment 1, a description is given in which the delivery vehicle 400 delivers the article G1 to the locker 300, the locker 300 locks the storage unit 310 in which the delivered article G1 is stored, and the user U1 that is the addressee of the article G1 performs the unlocking operation on the locker 300 to retrieve the article G1.

Figure 25:
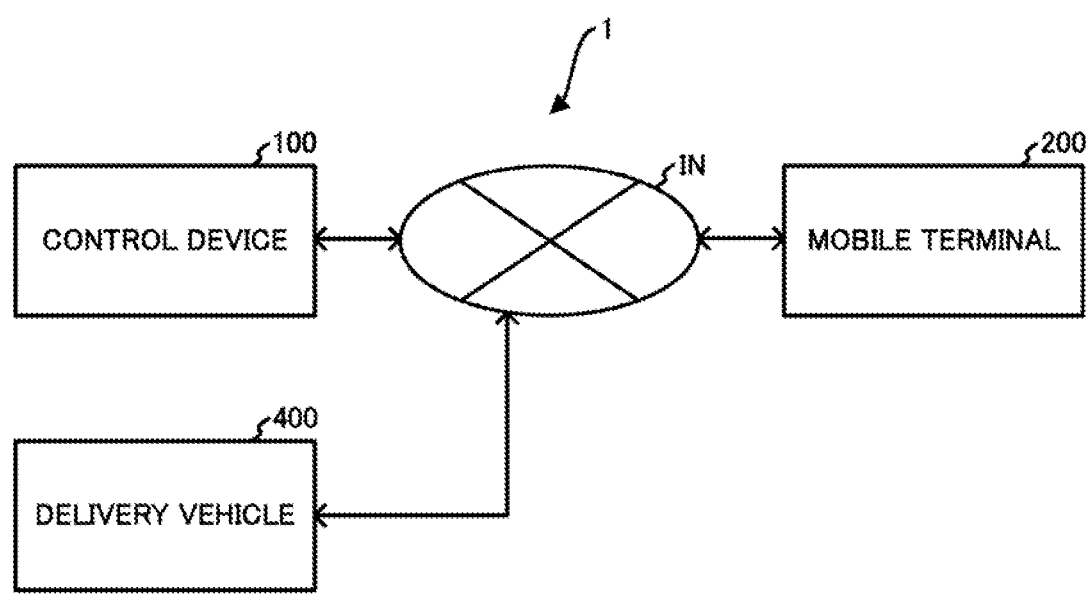
FIG. 25 is a system configuration drawing illustrating a configuration example of a storage system according to Embodiment 2.

However, the present disclosure is not limited thereto and, as illustrated in FIG. 25, the storage system 1 according to the present embodiment includes the control device 100, the mobile terminal 200, and the delivery vehicle 400, but does not include the locker 300. The user U1 that is the addressee of the article G1 performs the unlocking operation on the delivery vehicle 400 that is stopped at the delivery destination. In the following, the configurations that are the same as those in Embodiment 1 are marked with the same reference numerals used in Embodiment 1, and the description focuses on the differences between the present embodiment and Embodiment 1.

A delivery request according to the present embodiment includes information expressing the address of a railway station specified as the delivery destination instead of the locker ID "300" of the locker 300 specified as the delivery destination. When the control device 100 receives a delivery request requesting delivery of the article G1, the control device 100 executes the non-illustrated delivery request storage processing described in Embodiment 1, thereby generating a delivery ID "D1" that identifies the delivery request.

Next, the control device 100 executes the non-illustrated delivery instruction processing and delivery information storage processing described in Embodiment 1, thereby displaying a message instructing to issue, to the delivery company, a request to deliver the article G1.

The control device 100 generates, on the basis of the delivery request, delivery information including an article ID "G1", a user ID "U1", information expressing the address of the delivery destination, and a character string "NULL." Thereafter, the control device 100 stores the delivery ID "D1" identifying the delivery request and the delivery information generated on the basis of the delivery request in the delivery table of FIG. 4.

The worker of the delivery company requested to deliver the article G1 places the article G1 in a storage unit 410 of the delivery vehicle 400 and, then, performs, on a non-illustrated touch screen of the delivery vehicle 400, an operation for inputting the address of the delivery destination. In the present embodiment, a description is given in which the worker places the article G1 in the storage unit 410 identified by the storage unit ID "S1."

The storage table illustrated in FIG. 11 is stored in advance in the non-illustrated flash memory of the delivery vehicle 400. When the touch screen outputs a signal corresponding to the operation performed by the worker, the non-illustrated CPU of the delivery vehicle 400 executes steps S21 to S24 of FIG. 12, thereby setting a password "password1" for the storage unit 410 in which the article G1 is stored and, then, locking the storage unit 410. Then, the CPU executes the delivery processing illustrated in FIG. 23, thereby performing control for delivering the article G1 to the delivery destination.

Thereafter, when the execution of the delivery processing ends, the CPU of the delivery vehicle 400 outputs a control signal for stopping at the delivery destination. Additionally, the CPU reads a locker ID "460" of the locker 460 that is stored in advance in the non-illustrated flash memory. Next, the CPU generates an arrival report that includes the delivery ID "D1" printed on the slip of the article G1, the locker ID "460" of the locker 460 in which the article G1 is stored, the storage unit ID "S1" of the storage unit 410, and the password "password1" set for the storage unit 410, and that informs of arrival at the delivery destination. Thereafter, the CPU outputs the arrival report to the data communication circuit with the control device 100 as the destination.

When the data communication circuit 104a of the control device 100 receives the arrival report, the CPU 101 executes the non-illustrated delivery completion notification processing. When the execution of the non-illustrated delivery completion notification processing starts, the CPU 101 acquires the arrival report from the data communication circuit 104a, and acquires the delivery ID "D1", the locker ID "460", the storage unit ID "S1", and the password "password1" from the acquired arrival report. Then, the CPU 101 updates the character string "NULL" associated with the delivery ID "D1" in the delivery table of FIG. 4 to the acquired locker ID "460" and the storage unit ID "S1." Next, the CPU 101 executes the same processing as step S34 of FIG. 13, thereby outputting a delivery completion notification that includes the information expressing the address of the delivery destination, the storage unit ID "S1", and the password "password1", and that informs that delivery of the article G1 is complete. Then, the CPU 101 ends the execution of the non-illustrated delivery completion notification processing.

The user U1 that confirms the delivery completion notification using the mobile terminal 200 moves to the specified delivery destination, and performs an unlocking operation or the like on the non-illustrated touch screen of the delivery vehicle 400 that is stopped at the delivery destination.

When the non-illustrated touch screen of the delivery vehicle 400 outputs a signal corresponding to the unlocking operation or the like, the CPU of the delivery vehicle 400 executes the unlocking control processing illustrated in FIG. 14. As a result, the delivery vehicle 400 sends an unlock permission prohibition inquiry to the control device 100, and the control device 100 that receives the unlock permission prohibition inquiry executes the unlock permission prohibition processing of FIG. 16. When, as a result, the content C1 associated with the article G1 has been viewed by the user U1, the control device 100 returns an allow unlocking notification and, when the content C1 has not been viewed, returns a forbid unlocking command.

The delivery vehicle 400 unlocks the storage unit 410 in which the article G1 is stored when an allow unlocking notification is received. In contrast, when a forbid unlocking command is received, the delivery vehicle 400 executes the viewing processing illustrated in FIG. 15 that is processing for causing the user U1 to view the content C1 and, then, sends the unlock permission prohibition inquiry to the control device 100 again.

Thereafter, when the delivery vehicle 400 receives an allow unlocking notification, the delivery vehicle 400 unlocks the storage unit 410. When the article G1 is retrieved by the user U1, or when a predetermined period of time elapses from arriving at the delivery destination without the article G1 being retrieved, the delivery vehicle 400 starts to return to the office of the delivery company.

According to these configurations, the delivery vehicle 400 moves to the delivery destination while storing the article G1 in the storage unit 410. Additionally, when unlocking of the storage unit 410 is forbidden due to the content C1 associated with the article G1 not having been viewed by the user U1, the delivery vehicle 400 executes the viewing processing illustrated in FIG. 15. As such, regardless of the location specified as the delivery destination, provided that the delivery vehicle 400 can move to the delivery destination, the user U1 can be caused to view the content C1 at the delivery destination. As such, the convenience of the user can be improved.

In the present embodiment, a description is given in which the delivery destination of the article G1 is a railway station, but the present disclosure is not limited thereto and the delivery destination may be a bus stop, a street car station, the entrance or lobby of an apartment complex or office building, or the doorstep of a house, for example. Additionally, the delivery destination may be a yard or parking space of a house, an apartment complex, an office building, a public facility, or a commercial facility, or a park, a river beach, a forest, or a mountain.

In the present embodiment, it is described that the delivery vehicle 400 stops at the delivery destination, but the present disclosure is not limited thereto. The delivery vehicle 400 may stop at a geographical location in the vicinity of the delivery destination. The vicinity of the delivery destination is located a shorter distance than a predetermined distance from a representative geographical location of the delivery destination. The geographical location in the vicinity where the delivery vehicle 400 stops may be a road, a river beach, a park, or a geographical location of a parking lot where the delivery vehicle 400 is allowed to park. Furthermore, the delivery vehicle 400 may travel around in the vicinity of the delivery destination at a predetermined speed. Additionally, the delivery vehicle 400 may stop once in the vicinity of the delivery destination and, then, travel around in the vicinity of the delivery destination, stop after traveling around, or repeat stopping and traveling around.

Modified Example 1 of Embodiment 2

In Embodiment 2, a description is given in which the storage system 1 includes the control device 100, the mobile terminal 200, and the delivery vehicle 400 that is an unmanned ground vehicle, the delivery vehicle 400 travels to a specified delivery destination while storing the article G1 in the storage unit 410, and the user U1 performs, on the delivery vehicle 400 that is stopped at the delivery destination, an unlocking operation for unlocking the storage unit 410.

However, the present disclosure is not limited thereto, and a configuration is possible in which the storage system 1 includes the control device 100, the mobile terminal 200, and a delivery vehicle 500 that is an unmanned aircraft, the delivery vehicle 500 flies to the delivery destination while storing the article G1 in a storage unit 510, and the user U1 performs, on the delivery vehicle 500 that is stopped at the delivery destination, the unlocking operation for unlocking the storage unit 510.

A description is given in which the delivery vehicle 500 lands at the delivery destination, but the present disclosure is not limited thereto and a configuration is possible in which the delivery vehicle 500 lands at a geographical location in the vicinity of the delivery destination. The vicinity of the delivery destination is located a shorter distance than a predetermined distance from a representative geographical location of the delivery destination. Additionally, a configuration is possible in which the delivery vehicle 500 does not land at the delivery destination or a geographical location in the vicinity of the delivery destination, and hovers at an altitude lower than a predetermined altitude in the air above the delivery destination or a geographical location in the vicinity of the delivery destination. Furthermore, a configuration is possible in which the delivery vehicle 500 circles or flies back and forth above the vicinity of the delivery destination. Moreover, a configuration is possible in which the delivery vehicle 500 lands once at the delivery destination or at a geographical location in the vicinity of the delivery destination and, then, hovers or the like, hovers or the like and then lands, or repeats landing and hovering or the like.

Embodiment 3

In Embodiment 1, a description is given in which the article G1 and the content C1 are associated with each other, but the present disclosure is not limited thereto. In the present embodiment, the article G1 that is a first article, and a non-illustrated article G2 that is a second article are associated with non-illustrated content C12. In the following, the configurations that are the same as those in Embodiment 1 are marked with the same reference numerals used in Embodiment 1, and the description focuses on the differences between the present embodiment and Embodiment 1.

In the present embodiment, for ease of description, an example is described of a case in which the user U1 is specified as the addressee, the locker 300 is specified as the delivery destination, and a first delivery request requesting delivery of the first article G1 is received by the control device 100. Additionally, in the present embodiment, an example is described of a case in which the user U1 is specified as the addressee, the locker 300 is specified as the delivery destination, and a second delivery request requesting delivery of the second article G2 is received by the control device 100 one month after the first delivery request is received.

When first delivery request is received, the control device 100 executes the non-illustrated delivery request storage processing, thereby generating a delivery ID of the first delivery request. In the present embodiment, a description is given in which a delivery ID "D1" is generated.

Next, the control device 100 executes the non-illustrated delivery instruction processing, thereby displaying the delivery ID "D1" and the article ID "G1", and a message instructing to find the article G1 in a non-illustrated warehouse and issue, to the delivery company, a request to deliver the article G1.

Thereafter, the worker of the company R that views the display of the control device 100 discovers that the first article G1 is not in the warehouse, and places an order for the first article G1. The first article G1 is delivered to the warehouse one month after ordering. As such, the worker of the company R performs, on the control device 100, an input operation for inputting the delivery ID "D1" of the first delivery request requesting delivery of the first article G1.

When the input operation is performed, the control device 100 executes the non-illustrated delivery information storage processing. Thus, the control device 100 acquires the delivery ID "D1" on the basis of the signal corresponding to the input operation and output by the input device 105*c*. Additionally, the control device 100 generates, on the basis of the delivery request identified by the delivery ID "D1", delivery information including the article ID "G1", the user ID "UT", information expressing the address of the locker 300 of the delivery destination, the locker ID "300", and the character string "NULL." Thereafter, the control device 100 associates the generated delivery information and the delivery ID "D1" with each other, and stores the associated information in the delivery table of FIG. 4.

Additionally, the control device 100 displays a message instructing to issue, to the delivery company, a request to deliver the first article G1. Then, the worker of the company R that confirms the display of the control device 100 affixes a slip, on which the delivery ID "D1" is printed, to the first article G1 and, then, issues a request to a worker of the delivery company to deliver the first article G1.

When the worker of the delivery company arrives at the locker 300, the worker places the first article G1 in one of the empty storage units 310 of the locker 300. In the present embodiment, a description is given in which the worker of the delivery company places the first article G1 in the storage unit 310 identified by the storage unit ID "S1."

Thereafter, the worker performs, on the locker 300, an input operation for inputting the delivery ID "D1" printed on the slip of the first article G1 and the storage unit ID "S1" of the storage unit 310 in which the first article G1 is placed, and a locking operation for locking the storage unit 310.

Next, the locker 300 executes the locking control processing illustrated in FIG. 12, thereby sending a storage report that includes the delivery ID "D1" and the storage unit ID "S1" to the control device 100.

The control device 100 that receives the storage report executes the delivery completion notification processing illustrated in FIG. 13, thereby updating the character string "NULL" associated, in the delivery table of FIG. 4, with the delivery ID "D1" included in the storage report to the storage unit ID "S1" included in the storage report.

Figure 27:
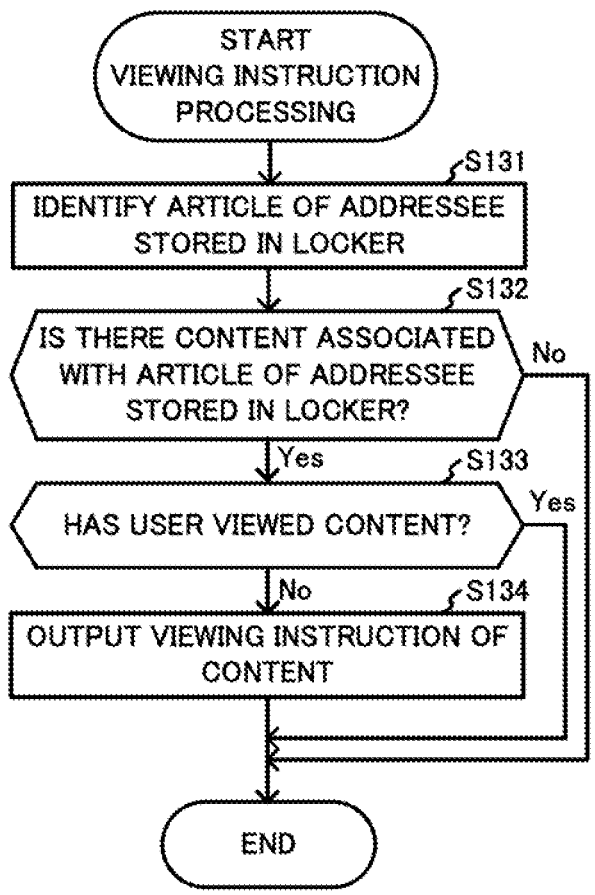
FIG. 27 is a flowchart illustrating an example of viewing instruction processing executed by the control device of the storage system according to Embodiment 3.

Thereafter, the CPU 101 of the control device 100 executes viewing instruction processing such as illustrated in FIG. 27 with the delivery ID "D1" as an argument.

When the execution of the viewing instruction processing of FIG. 27 starts, the instructor 130 of the control device 100 acquires the delivery ID "D1" from the argument, and acquires the user ID "UT" and the locker ID "300" associated with the delivery ID "D1" in the delivery table of FIG. 4. As a result, the instructor 130 identifies that the addressee of the delivered article is the user U1, and that the delivered article is stored in the locker 300.

Next, the instructor 130 of the control device 100 acquires the article IDs that are associated, in the delivery table of FIG. 4, with the user ID "U1" and the locker ID "300" and, also, that are associated with a character string different than the character string "NULL" expressing that the delivery is not complete, and counts the number of acquired article IDs. As a result, the instructor 130 identifies the articles that have the user U1 as the addressee from among the articles stored in the locker 300, and counts the number of identified articles.

In the present embodiment, a description is given hereinafter in which the locker 300 does not store any articles, other than the first article G1, that have the user U1 as the addressee.

As such, the instructor 130 of the control device 100 acquires only the article ID "G1", thereby identifying that the only article that has the user U1 as the addressee and that is stored in the locker 300 is the first article G1, and counts the number of stored articles as "1" (step S131). Next, the instructor 130 determines that the number "1" of counted articles is less than "2." As such, a determination is made that, there is no content associated with the articles that have the user UT as the addressee and that are among the articles stored in the locker 300 (step S132; No). Such a determination is made because, in the present embodiment, the content is associated with two articles. Thereafter, the instructor 130 ends the execution of the viewing instruction processing without outputting the viewing instruction.

Next, when a second delivery request is received, the control device 100 executes the non-illustrated delivery request storage processing. In the present embodiment, a description is given in which a delivery ID "D2" of the second delivery request is generated due to the execution of the non-illustrated delivery request storage processing.

The control device 100 executes the non-illustrated delivery instruction processing and delivery information storage processing, thereby storing the delivery ID "D2", and delivery information including the article ID "G2", the user ID "U1", information expressing the address of the delivery destination, the locker ID "300", and the character string "NULL" in the delivery table of FIG. 4. The worker of the company R affixes a slip, on which the delivery ID "D2" is printed, to the second article G2 and issues a request to the worker of the delivery company to deliver the second article G2.

A content table such as illustrated in FIG. 26 is stored in the information storage 190 of the control device 100. A plurality of records is stored in advance in the content table of FIG. 26. An article ID identifying a first article, an article ID identifying a second article, and a content ID identifying content associated with the first article and the second article are associated and stored in advance in each record.

In the present embodiment, a description is given in which a content ID "./C12.mpg" identifying non-illustrated content C12 is associated in advance with the article ID "G1" identifying the first article G1 and the article ID "G2" identifying the second article G2, and the associated information is stored in the content table.

Additionally, in the present embodiment, a description is given in which the content C12 is content explaining a precaution related to the combination of the first article G1 and the second article G2. Furthermore, in the present embodiment, a description is given in which the precaution related to the combination of the first article G1 and the second article G2 is a precaution for use of the first article G1 and the second article G2 at the same time or within a time interval shorter than a predetermined interval For example, the content C12 may be content that informs a precaution indicating that the first article G1 is an acidic detergent and the second article G2 is chlorine bleach, and that mixing the first article G1 and the second article G2 may result in chlorine gas being produced.

Before the first article G1 is retrieved from the locker 300, the worker of the delivery company arrives at the locker 300 and places the second article G2 in one of the empty storage units 310 of the locker 300. In the present embodiment, a description is given in which the worker of the delivery company places the second article G2 in the storage unit 310 identified by a storage unit ID "S2."

Thereafter, the worker performs, on the locker 300, an input operation for inputting the delivery ID "D2" printed on the slip of the second article G2 and the storage unit ID "S2" of the storage unit 310 in which the second article G2 is placed, and a locking operation for locking the storage unit 310.

Next, the locker 300 executes the locking control processing illustrated in FIG. 12, thereby sending a storage report including the delivery ID "D2" and the storage ID "S2" to the control device 100.

The control device 100 that receives the storage report executes the delivery completion notification processing illustrated in FIG. 13, thereby updating the character string "NULL" associated, in the delivery table of FIG. 4, with the delivery ID "D2" included in the storage report to the storage unit ID "S2" included in the storage report.

Thereafter, the CPU 101 of the control device 100 executes the viewing instruction processing illustrated in FIG. 27 again, with the delivery ID "D2" as the argument.

When the execution of the viewing instruction processing of FIG. 27 starts again, the instructor 130 of the control device 100 executes the processing of steps S131 and S132. As a result, the instructor 130 identifies the first article G1 and the second article G2 that have the user U1 as the addressee and are stored in the locker 300.

Next, the instructor 130 of the control device 100 determines that the content ID "./C12.mpg" associated with the article ID "G1" of the first article G1 and the article ID "G2" of the second article G2 is stored in the content table of FIG. 26. As such, the instructor 130 determines that the content C12 associated with the first article G1 and the second article G2 exists (step S132; Yes).

Next, when the content ID "./C12.mpg" and the user ID "U1" are not associated with each other and are not stored in the viewing table of FIG. 7, the instructor 130 of the control device 100 determines that the content C12 has not been viewed by the user U1 (step S133; No).

Thereafter, the instructor 130 of the control device 100 outputs a viewing instruction that includes the content ID "./C12.mpg" of the content C12 and that instructs the user U1 to view the content C12 (step S134) and, then, ends the execution of the viewing instruction processing.

In contrast, when the instructor 130 of the control device 100 determines that the content C12 has been viewed by the user (step S133; Yes), the instructor 130 determines that instructing the viewing of the content C12 is unnecessary, and ends the execution of the viewing instruction processing. Additionally, in step S132, when the instructor 130 determines that content associated with the first article G1 and the second article G2 does not exist (step S132; No), the instructor 130 determines that content of which viewing is to be instructed does not exist, and ends the execution of the viewing instruction processing.

When the mobile terminal 200 receives the delivery completion notification output in step S34 of FIG. 13, the mobile terminal 200 displays that delivery completion notification. The user U1 confirms the displayed delivery completion notification and moves to the locker 300 in order to retrieve the first article G1 and the second article G2 of which delivery is complete.

Additionally, when the mobile terminal 200 receives the viewing instruction output in step S134 of FIG. 27, the mobile terminal 200 displays that viewing instruction. When the user U1 follows the displayed viewing instruction and performs, on the mobile terminal 200, a viewing start operation for starting viewing of the content C12 by the time the user U1 arrives at the locker 300, the mobile terminal 200 executes the mobile viewing processing illustrated in FIG. 19. As a result, the mobile terminal 200 sends a content send request to the control device 100, and the control device 100 that receives the content send request executes the detection processing illustrated in FIG. 17 to perform the sending of the content C12 and the detecting of viewing of the content C12 by the user U1.

When the user U1 arrives at the locker 300, the user U1 performs an unlocking operation or the like on the locker 300 for unlocking the storage unit 310 of the locker 300, and the locker 300 executes the unlocking control processing illustrated in FIG. 14.

In the present embodiment, a description is given in which, firstly, the user U1 performs the unlocking operation for unlocking the storage unit 310 in which the first article G1 is stored. Additionally, in the present embodiment, a description is given in which, after retrieving the first article G1 from the storage unit 310, the user U1 performs the unlocking operation for unlocking the storage unit 310 in which the second article G2 is stored.

The locker 300 that executes the unlocking control processing sends, to the control device 100, an unlock permission prohibition inquiry inquiring whether or not to allow unlocking of the storage unit 310 in which the first article G1 is stored.

When the unlock permission prohibition inquiry is received from the locker 300, the control device 100 starts the execution of the unlock permission prohibition processing illustrated in FIG. 16, and acquires the locker ID "300" and the user ID "U1" included in the unlock permission prohibition inquiry (step S71). Next, the control device 100 executes the same processing as step S131 of FIG. 27, thereby identifying, from among the articles stored in the locker 300, the first article G1 and the second article G2 that have the user U1 as the addressee (step S72).

Next, the control device 100 executes the same processing as step S132 of FIG. 27, thereby determining that the content C12 associated with the first article G1 and the second article G2 exists (step S73). Then, the control device 100 executes the same processing as step S133, thereby determining whether or not the content C12 has been viewed by the user U1 (step S74). At this time, when a determination is made that the content C12 has not been viewed (step S74; No), the control device 100 sends, to the locker 300, a forbid unlocking command and a viewing instruction instructing the user UT to view the content C12 (steps S75 and S76), and ends the execution of the unlock permission prohibition processing. When the locker 300 receives the forbid unlocking command and the viewing instruction, the locker 300 executes the viewing processing illustrated in FIG. 15 and sends the unlock permission prohibition inquiry again.

In contrast, when a determination is made that the content C12 has been viewed (step S74; Yes), the control device 100 sends the allow unlocking notification to the locker 300 (step S77) and, then, ends the unlock permission prohibition processing. When the locker 300 receives the allow unlocking notification, the locker 300 unlocks the storage unit 310 in which the first article G1 is stored.

When the user U1 retrieves the first article G1 from the unlocked storage unit 310 of the locker 300, the user UT performs the unlocking operation or the like for unlocking the storage unit 310 in which the second article G2 is stored. Thereafter, the locker 300 executes the unlocking control processing of FIG. 14, thereby unlocking the storage unit 310 in which the second article G2 is stored.

According to these configurations, when the first article G1 and the second article G2 are stored in the locker 300, the forbidder 160 of the control device 100 forbids unlocking of the storage unit 310 in which the first article G1 is stored when the content C12 including the precaution related to the combination of the first article G1 and the second article G2 has not been viewed by the user U1. As such, the control device 100 can prevent the first article G1 from being handed over to the user U1 before the user U1 watches, listens to, or watches and listens to the precaution related to the combination of the first article G1 and the second article G2.

Typically, it is difficult to predict what type of article is to be handed over to the user U1 together with the first article G1. This is because, for example, even if the first delivery request requesting delivery of the first article G1 is sent at a timing earlier than the second delivery request requesting delivery of the second article G2, if, for example, the shipping of the first article G1 is delayed due to a shortage or the like, or if retrieval of the first article G1 from the locker 300 is delayed, the first article G1 and the second article G2 may be stored together in the locker 300. As such, it is difficult to cause the user U1 to watch and listen to the precaution related to the combination of the first article G1 and the second article G2 before handing the combination of the first article G1 and the second article G2 over to the user U1. However, according to these configurations, the allower 170 of the control device 100 allows unlocking of the storage unit 310 in which the first article G1 is stored and unlocking of the storage unit 310 in which the second article G2 is stored in at least one of the case in which the precaution related to the combination of the first article G1 and the second article G2 has been watched, the case in which the precaution has been listened to, or the case in which the precaution has been watched and listened to by the user U1. Therefore, the control device 100 can hand over the first article G1 and the second article G2 to the user U1 after the user U1 has watched, listened to, or watched and listened to the precaution related to the combination of the first article G1 and the second article G2.

According to these configurations, the precaution related to the combination of the first article G1 and the second article G2 includes a precaution for use of the first article G1 and the second article G2 at the same time or within a time interval shorter than a predetermined interval. As such, the control device 100 can hand over the first article G1 and the second article G2 to the user U1 after the user U1 has watched, listened to, or watched and listened to the precaution related to the combination of the first article G1 and the second article G2, for which it is difficult to predict use at the same time or use within an interval shorter than a predetermined interval. Therefore, safety in use of the first article G1 or the second article G2 by the user U1 can be improved.

Modified Example 1 of Embodiment 3

In Embodiment 3, a description is given in which two articles that have the user UT as the addressee are stored in the locker 300, but the present disclosure is not limited thereto, and a configuration is possible in which n (where n is an integer of 3 or greater) articles that have the user U1 as the addressee are stored in the locker 300.

In this case, in step S132 of FIG. 27, it is sufficient that the instructor 130 of the control device 100 determines, for n×(n−1)/2 combinations of articles, whether or not content associated with two of the articles of the combination exists. When the instructor 130 determines that content does not exist for all of the combinations (step S132; No), it is sufficient that the instructor 130 ends the viewing instruction processing.

In contrast, when the instructor 130 of the control device 100 determines that content associated with at least one of the n×(n−1)/2 combinations of articles exists (step S132; Yes), it is sufficient that the instructor 130 determines whether or not all of such content has been viewed by the user UT (step S133). At this time, when the instructor 130 determines that all of such content has been viewed (step S133; Yes), it is sufficient that the instructor 130 ends the viewing instruction processing.

In contrast, when a determination is made that all of such content has not been viewed (step S133; No), it is sufficient that the instructor 130 outputs a viewing instruction instructing the viewing of all of the unviewed content of such content (step S134) and, then, ends the viewing instruction processing.

Modified Example 2 of Embodiment 3

In Embodiment 3, a description is given in which the control device 100 stores the content C12 that is associated with two articles, namely the first article G1 and the second article G2, and that also includes a precaution related to the combination of the first article G1 and the second article G2. Additionally, in Embodiment 3, a description is given in which, when the first article G1 and the second article G2 are stored in the locker 300, the forbidder 160 of the control device 100 forbids unlocking of the storage unit 310 in which the first article G1 is stored when the content C12 has not been viewed by the user U1. Furthermore, a description is given in which, when the first article G1 and the second article G2 are stored in the locker 300, the allower 170 of the control device 100 allows unlocking of the storage unit 310 in which the first article G1 is stored when the content C12 has been viewed by the user U1.

However, the present disclosure is not limited thereto, and a configuration is possible in which the control device 100 stores a content Cm that is associated with m articles (where m is an integer of 3 or greater) and that also includes a precaution related to a combination of the m articles. In this case, when the m articles are stored in the locker 300, the forbidder 160 of the control device 100 may forbid unlocking of the storage unit 310 in which any of the m articles is stored when the content Cm has not been viewed by the user U1. Additionally, when the m articles are stored in the locker 300, the allower 170 of the control device 100 may allow unlocking of the storage unit 310 in which any of the m articles is stored when the content Cm has been viewed by the user U1.

Modified Example 3 of Embodiment 3

In Embodiment 3, a description is given in which, when the first article G1 is stored in a first storage unit 310 and also the second article G2 is stored in a second storage unit 310, the forbidder 160 of the control device 100 forbids unlocking of the first storage unit 310 and the second storage unit 310 when the content C12 associated with the first article G1 and the second article G2 has not been viewed by the user U1. Furthermore, a description is given in which, when the first article G1 is stored in the first storage unit 310 and also the second article G2 is stored in the second storage unit 310, the allower 170 of the control device 100 allows unlocking of the first storage unit 310 and the second storage unit 310 when the content C12 has been viewed by the user U1.

However, the present disclosure is not limited thereto, and a configuration is possible in which, when the first article G1 and the second article G2 are stored in the same storage unit 310, the forbidder 160 of the control device 100 forbids unlocking of the storage unit 310 in which the first article G1 and the second article G2 are stored when the content C12 has not been viewed by the user U1. Additionally, a configuration is possible in which, when the first article G1 and the second article G2 are stored in the same storage unit 310, the allower 170 of the control device 100 allows unlocking of the storage unit 310 in which the first article G1 and the second article G2 are stored when the content C12 has been viewed by the user U1.

Modified Example 4 of Embodiment 3

In Embodiment 1, a description is given in which the control device 100 stores the content C1 associated with the article G1. Additionally, in Embodiment 1, a description is given in which the forbidder 160 of the control device 100 forbids unlocking of the storage unit 310 of the locker 300 in which the article G1 is stored when the content C1 has not been viewed by the user U1.

In contrast, in Embodiment 3, a description is given in which the control device 100 stores the content C12 that is associated with the first article G1 and the second article G2, and that also includes a precaution related to the combination of the first article G1 and the second article G2. Additionally, in Embodiment 3, a description is given in which, when the first article G1 and the second article G2 are stored in the locker 300, the forbidder 160 of the control device 100 forbids unlocking of the storage unit 310 in which the first article G1 is stored when the content C12 has not been viewed by the user U1.

However, the present disclosure is not limited thereto, and Embodiment 1 and Embodiment 3 can be combined. Specifically, a configuration is possible in which, when the first article G1 and the second article G2 are stored in the locker 300, the forbidder 160 of the control device 100 forbids unlocking of the storage unit 310 in which the first article G1 is stored when at least one of the content C1 associated with the first article G1 or the content C12 associated with the first article G1 and the second article G2 has not been viewed. Additionally, a configuration is possible in which, when the first article G1 and the second article G2 are stored in the locker 300, the forbidder 160 forbids unlocking of the storage unit 310 in which the second article G2 is stored when at least one of content C2 or the content C12 has not been viewed.

Likewise, a configuration is possible in which, when the first article G1 and the second article G2 are stored in the locker 300, the allower 170 of the control device 100 allows unlocking of the storage unit 310 in which the first article G1 is stored when both the content C1 and the content C12 have been viewed by the user U1. Additionally, a configuration is possible in which, when the first article G1 and the second article G2 are stored in the locker 300, the allower 170 allows unlocking of the storage unit 310 in which the second article G2 is stored when both the content C2 and the content C12 have been viewed by the user U1.

Furthermore, a configuration is possible in which the instructor 130 of the control device 100 instructs the user U1 to view all of the content C1, the content C2, and the content C12. Additionally, a configuration is possible in which the outputter 140 outputs all of the content C1, the content C2, and the content C12. Furthermore, a configuration is possible in which the detector 150 detects all of that the content C1 has been viewed, that the content C2 has been viewed, and that the content C12 has been viewed by the user U1.

Modified Example 5 of Embodiment 3

In Embodiment 3, a description is given in which, when the first article G1 and the second article G2 are stored in the locker 300, the instructor 130 of the control device 100 instructs the user U1 to view the content C12 when the content C12 associated with the first article G1 and the second article G2 has not been viewed by the user U1. Additionally, a description is given in which, when the first article G1 and the second article G2 are stored in the locker 300, the forbidder 160 of the control device 100 forbids unlocking of the storage unit 310 in which the first article G1 is stored when the content C12 associated with the first article G1 and the second article G2 has not been viewed by the user U1.

However, the present disclosure is not limited thereto. A configuration is possible in which, when the first article G1 and the second article G2 are shipped with the user U1 as the addressee, when the content C12 has not been viewed by the user U1, the instructor 130 of the control device 100 instructs the user UT to view the content C12 even when the first article G1 and the second article G2 are not stored in the locker 300. Additionally, a configuration is possible in which, when the first article G1 and the second article G2 are shipped with the user U1 as the addressee, when the content C12 has not been viewed by the user U1, the forbidder 160 of the control device 100 forbids unlocking of the storage unit 310 in which the first article G1 is stored even when the second article G2 is not stored in the locker 300.

To accomplish this, it is sufficient that the forbidder 160 and the instructor 130 of the control device 100 determine whether a record in which the user ID "UT" of the user U1 and the article ID "G1" of the first article G1 are stored and a record in which the user ID "UT" and the article ID "G2" of the second article G2 are stored exist in the delivery table of FIG. 4. That is, when a determination is made that these two records exist, it is sufficient that the instructor 130 and the forbidder 160 determine that the first article G1 and the second article G2 have been shipped with the user U1 as the addressee.

However, the present disclosure is not limited thereto. A configuration is possible in which, when the first article G1 and the second article G2 are purchased by the user U1, when the content C12 has not been viewed by the user U1, the instructor 130 of the control device 100 instructs the user U1 to view the content C12 even when the first article G1 and the second article G2 are not stored in the locker 300. Additionally, a configuration is possible in which, when the first article G1 and the second article G2 are purchased by the user U1, when the content C12 has not been viewed by the user U1, the forbidder 160 of the control device 100 forbids unlocking of the storage unit 310 in which the first article G1 is stored even when the second article G2 is not stored in the locker 300.

To accomplish this, a non-illustrated purchase history table is stored in advance in the information storage 190 of the control device 100. Information related to purchase history is stored in the non-illustrated purchase history table. A plurality of records is stored in the purchase history table. Information expressing a date and time when an article is purchased, the article ID of the purchased article, and a user ID of the user that purchased the article are associated and stored in each record.

The instructor 130 and the forbidder 160 of the control device 100 acquire a system date and time from an operating system (OS), for example, and calculate a period from a date and time, that is a predetermined amount of time earlier than the system date and time, to the system date and time. Next, the instructor 130 and the forbidder 160 determine whether or not a first record exists in the non-illustrated purchase history table in which information expressing a date and time included in the calculated period, the user ID "U1" of the user U1, and the article ID "G1" of the first article G1 are stored. Additionally, the instructor 130 and the forbidder 160 determine whether or not a second record exists in the purchase history table in which information expressing a date and time included in the calculated period, the user ID "UT", and the article ID "G2" of the second article G2 are stored. Then, when the instructor 130 and the forbidder 160 determine that the first record and the second record exist, it is sufficient that a determination is made that the first article G1 and the second article G2 have been purchased by the user U1.

Modified Example 6 of Embodiment 3

In Embodiment 3, a description is given in which the control device 100 stores, in advance, the content C12 associated with the first article G1 and the second article G2. However, the present disclosure is not limited thereto. A configuration is possible in which the control device 100 does not store, in advance, the content C12 associated with the first article G1 and the second article G2 and, instead, generates the content C12.

To realize this, a non-illustrated characteristic table is stored in the information storage 190 of the control device 100 according to the present modified example. The article ID of an article, a name of that article, and a characteristic of that article are associated and stored in advance in the characteristic table. In the present modified example, the article ID "G1" of the first article G1, a name "acidic detergent G1" of the first article G1, and a chemical property "acidic" characterizing the first article G1, are associated and stored in advance in the characteristic table. Additionally, the article ID "G2" of the second article G2, a name "chlorine bleach G2" of the second article G2, and one substance of the chemical substances included in the second article G2 that characterizes the second article G2, namely "chlorine", are associated and stored in advance in the characteristic table.

A basic content table is stored in the information storage 190 of the control device 100. Information related to basic content that is the basis of content generation is stored in the basic content table. A plurality of records is stored in advance in the basic content table. A first characteristic, a second characteristic, and a content ID of basic content explaining a precaution for use of an article having the first characteristic and an article having the second characteristic at the same time or within an interval shorter than a predetermined time interval are associated in advance and this associated information is stored in advance in the basic content table. In the present modified example, a description is given in which the chemical property "acidic" that is the first characteristic, the chemical substance "chlorine" that is the second characteristic, and a content ID "./CB.mpg" of a non-illustrated basic content that includes text and audio explaining a precaution of "when mixed, chlorine gas may be produced" are associated and stored in advance.

In step S131 of FIG. 27, the instructor 130 of the control device 100 according to the present modified example identifies the first article G1 and the second article G2 that are stored in the locker 300 (step S131). Next, the instructor 130 determines whether or not a content ID exists, in the content table of FIG. 26, that is associated with the article ID "G1" of the first article G1 and the article ID "G2" of the second article G2 (step S132). At this time, when the content C12 that explains the precaution related to the combination of the first article G1 and the second article G2 is already generated, the instructor 130 determines that the content ID "./C12.mpg" of the content C12 exists (step S132; Yes), and continues the processing from step S133, thereby instructing the user U1 to view the content C12.

In contrast, when the content C12 is not yet generated, the instructor 130 of the control device 100 determines that the content ID "./C12.mpg" does not exist (step S132; No), and determines that a precaution related to the combination of the first article G1 and the second article G2 does not exist or that the content C12 explaining such a precaution has not yet been generated.

Next, the instructor 130 of the control device 100 acquires, from the non-illustrated characteristic table, the name "acidic detergent G1" and the characteristic "acidic" associated with the article ID "G1" of the first article G1, and the name "chlorine bleach G2" and the characteristic "chlorine" associated with the article ID "G2" of the second article G2. Thereafter, the instructor 130 determines that the content ID "./Cb.mpg" of the basic content CB associated with the characteristic "acidic" and the characteristic "chlorine" exists in the non-illustrated basic content table, and determines that the content C12 has not yet been generated. In contrast, when the instructor 130 determines that a content ID associated with the characteristic "acidic" of the first article G1 and the characteristic "chlorine" of the second article G2 does not exist, the instructor 130 determines that a precaution related to the combination of the first article G1 and the second article G2 does not exist and ends the execution of the viewing instruction processing.

After determining that the content C12 has not yet been generated, the instructor 130 of the control device 100 adds text expressing the acquired name "acidic detergent G1" of the first article G1, and text expressing "chlorine bleach G2" of the second article G2 to the text "when mixed, chlorine gas may be produced" of the basic content CB identified by the content ID "./CB.mpg." Furthermore, the instructor 130 adds audio expressing the names of the first article G1 and the second article G2 to the audio of the basic content CB. As a result, the instructor 130 generates the content C12 that includes video content and audio content explaining the precaution of "when the acidic detergent G1 and the chlorine bleach G2 are mixed, chlorine gas may be produced."

Thereafter, the storer 120 of the control device 100 associates the article ID "G1" of the first article G1, the article ID "G2" of the second article G2, and the content ID "./C12.mpg" of the generated content C12, and stores the associated information in the content table of FIG. 26.

Thereafter, the instructor 130 of the control device 100 continues the processing from step S133 of FIG. 27 and, as a result, the instructor 130 instructs the user U1 to view the generated content C12.

According to these configurations, when the first article G1 and the second article G2 are stored in the locker 300, the instructor 130 of the control device 100 generates content explaining a precaution related to the combination of the first article G1 and the second article G2. As such, compared to a case in which content explaining a precaution related to a combination is stored in advance for all of the combinations of the articles possible to be delivered to the locker 300, the amount of information stored in the control device 100 can be reduced until all of the combinations of the articles are stored in the locker 300.

Modified Example 7 of Embodiment 3

In Embodiment 3, a description is given in which the first article G1 is an acidic detergent, the second article G2 is chlorine bleach, and the content C12 is content informing of the precaution that mixing the first article G1 and the second article G2 may result in chlorine gas being produced. However, the present disclosure is not limited thereto, and a configuration is possible in which the first article G1 and the second article G2 are medical drugs, and the content C12 is content informing of a precaution related to using the first article G1 and the second article G2 together. Additionally, a configuration is possible in which the first article G1 is a medical drug, the second article G2 is alcohol, and the content C12 is content informing of a precaution related to using the first article G1 and the second article G2 together. The precaution related to using the first article G1 and the second article G2 together includes, for example, the risk of side effects, and the risk of increased or decreased medicinal effects of the first article G1.

In Embodiment 3, a description is given in which the content C12 associated with the first article G1 and the second article G2 is a content explaining a precaution related to the combination of the first article G1 and the second article G2. Additionally, a description is given in which the precaution related to the combination of the first article G1 and the second article G2 includes a precaution for use of the first article G1 and the second article G2 at the same time or within a time interval shorter than a predetermined interval.

However, the present disclosure is not limited thereto, and the precaution related to the combination of the first article G1 and the second article G2 includes a precaution for storage of the first article G1 and the second article G2 separated from each other by an interval shorter than a predetermined distance interval. Additionally, the precaution related to the combination of the first article GT and the second article G2 includes a precaution for transportation of the first article G1 and the second article G2 at the same time.

Embodiment 4

In Embodiment 1, a description is given in which the detector 150 of the control device 100 detects, on the basis of whether or not answers of the user U1 to questions related to the content C1 are correct answers, whether or not the content C1 has been viewed by the user U1.

However, the present disclosure is not limited thereto, and the detector 150 of the control device 100 according to the present embodiment detects a line of sight of the user U1 on the basis of a moving image of the user U1, and detects, on the basis of the detected line of sight, whether or not the content C1 has been watched by the user U1. In the following, the configurations that are the same as those in Embodiment 1 are marked with the same reference numerals used in Embodiment 1, and the description focuses on the differences between the present embodiment and Embodiment 1.

In Embodiment 1, a description is given in which the phrase "view the content" means at least one of watching the video content or listening to the audio content, and the phrase "has not viewed the content" means has not watched the video content and also has not listened to the audio content. In contrast, in the present embodiment, the phrase "view the content" means watching the video content, and the phrase "has not viewed the content" means has not watched the video content.

The control device 320 of the locker 300 according to the present embodiment includes a non-illustrated imaging device that is implemented as a digital camera and that has an optical axis and an angle of view that are adjusted such that a user viewing the touch screen 325 is included in the imaging range.

Figure 28:
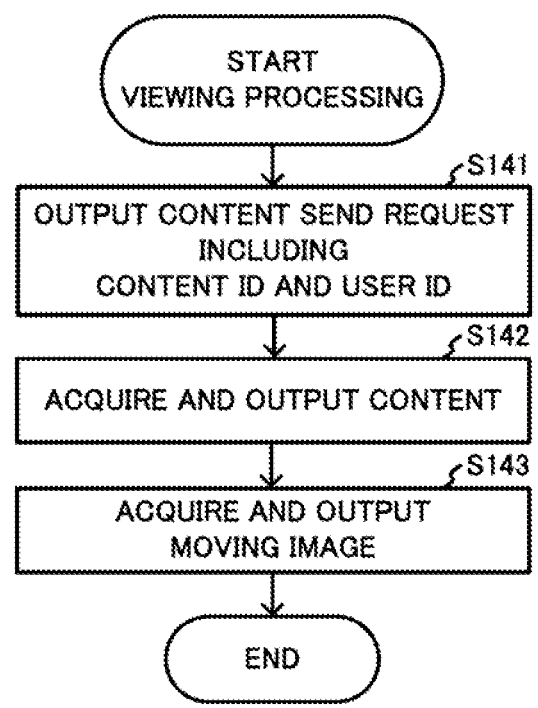
FIG. 28 is a flowchart illustrating an example of viewing processing executed by a control device of a locker according to Embodiment 4.

When a signal corresponding to a viewing start operation performed by the user U1 is output from the touch screen 325, the CPU 321 of the locker 300 executes viewing processing such as illustrated in FIG. 28. When the execution of the viewing processing starts, the CPU 321 executes the same processing as steps S61 and S62 of FIG. 15 (steps S141 and S142). As a result, the locker 300 sends a content send request to the control device 100 and, then, receives the content C1 from the control device 100.

The locker 300 starts displaying, on the touch screen 325, the video content included in the received content C1. Next, the CPU 321 of the locker 300 outputs a signal to the non-illustrated imaging device commanding the start of recording and, when the displaying of the video content ends, outputs a signal to the imaging device commanding stopping of the recording. Thereafter, the CPU 321 acquires data expressing the moving picture generated by the imaging device, outputs the acquired data to the non-illustrated data communication circuit with the control device 100 as the destination (step S143) and, then, ends the execution of the viewing processing.

A change information table such as illustrated in FIG. 29 is stored in advance in the control device 100. Change information that is information related to a change in the content is stored in advance in the change information table. A plurality of records is stored in the change information table. A content ID identifying content, and change information of that content are associated with each other and stored in advance in each record. The change information includes information expressing a playback time at which a display position of an object changes when the video content is replayed, and information expressing a direction of that change. Here, the object expresses a precaution related to an article.

In the present embodiment, a description is given in which, in the video content of the content C1 associated with the article G1, the display position of an object explaining a precaution related to the article G1 changes from a position upward from the center of the image to a position downward from the center of the image when "30 seconds" elapses from the start of replay. As such, the content ID "./CT.mpg", information expressing the playback time "30 seconds", and information expressing the change direction "down" of the display position of the object are associated and stored in advance in the change information table of FIG. 29.

When the content send request is received from the locker 300, the control device 100 starts execution of detection processing such as illustrated in FIG. 30. Then, the CPU 101 of the control device 100 executes the same processing as steps S81 to S83 of FIG. 17 (steps S151 to S153), thereby outputting the content C1 in response to the content send request.

Next, when the data communication circuit 104a of the control device 100 receives the data expressing the moving image of the user U1 from the locker 300, the acquirer 110 of the control device 100 acquires that data from the data communication circuit 104a (step S154).

Next, the detector 150 of the control device 100 acquires the change information of the content C1 associated with the content ID "./C1.mpg" in the change information table of FIG. 29 (step S155).

Next, the detector 150 of the control device 100 acquires the information expressing the playback time "30 seconds" and the information expressing the change direction "down" of the display position of the object included in the acquired change information. Then, the detector 150 detects the line of sight of the user U1 in the recording period from the time at which "30 seconds" has elapsed from the start of recording to a time that is a predetermined amount of time later than that time.

To accomplish this, the detector 150 of the control device 100 acquires, from the moving image, a plurality of frames each generated at a time included in the recording period, and executes a known line of sight detection processing, for example, for the acquired plurality of frames (step S156). The known line of sight detection processing may be processing in which the following first to fourth processes are sequentially performed.

As a first process, the detector 150 of the control device 100 performs template matching on a frame to detect an image region corresponding to an eye of the user U1 and an image region corresponding to a pupil of the user U1. Then, as a second process, the detector 150 executes processing for determining whether or not the center of the image region corresponding to the pupil is positioned upward in the frame from the center of the image region corresponding to the eye.

Here, when the detector 150 of the control device 100 determines that the center of the image region of the pupil is positioned upward from the center of the image region of the eye, as a third process, the detector 150 executes processing for detecting an upward looking line of sight of the user U1. In contrast, when the detector 150 determines that the center of the image region of the pupil is not positioned upward from the center of the eye, as a fourth process, the detector 150 executes processing for detecting a downward looking line of sight of the user U1.

Thereafter, the detector 150 of the control device 100 detects the direction of the change in the line of sight of the user U1 in the recording period on the basis of the lines of sight of the user U1 detected from the plurality of frames. In the present embodiment, an example is described of a case in which the detector 150 detects that the line of sight of the user U1 changes in the "down" direction in the recording period.

Thereafter, the detector 150 of the control device 100 determines that the direction "down" of the change in the line of sight in the recording period matches the direction "down" of the change in the display position of the object in the content C1 (step S157; Yes). As such, the detector 150 detects that the content C1 has been watched by the user U1. In the present embodiment, the phrase "view the content" means watching the video content and, as such, the detector 150 detects that the content C1 has been viewed by the user U1 (step S159).

Thereafter, the detector 150 of the control device 100 executes the same processing as step S89 of FIG. 17 (step S160) and, then, ends the execution of the detection processing.

In contrast, when the detector 150 of the control device 100 determines that the direction of the change in the line of sight in the recording period does not match the direction of the change in the display position of the object in the content C1 (step S157; No), the detector 150 detects that the content C1 has not been watched by the user U1. In the present embodiment, the phrase "has not viewed the content" means has not watched the video content and, as such, the detector 150 detects that the content C1 has not been viewed by the user U1 (step S158). Thereafter, the detector 150 ends the execution of detection processing.

As with the locker 300 according to the present modified example, the mobile terminal 200 according to the present embodiment further includes a non-illustrated imaging device that is implemented as a digital camera and that has an optical axis and an angle of view that are adjusted such that a user viewing the non-illustrated touch screen of the mobile terminal 200 is included in the imaging range.

When a signal corresponding to a viewing start operation is output from the touch screen, the non-illustrated CPU of the mobile terminal 200 executes the same processing as steps S91 to S93 of FIG. 19, thereby causing the control device 100 to authenticate the user U1. When the CPU of the mobile terminal 200 determines that the user authentication by the control device 100 has succeeded, the CPU executes the same processing as steps S141 to S143 of FIG. 28. As a result, the mobile terminal 200 causes the content C1 to be displayed on the non-illustrated display device, and sends data expressing the moving image of the user U1 to the control device 100. The control device 100 detects, on the basis of the moving image of the user U1, whether or not the content C1 has been viewed by the user U1.

In the present embodiment, a description is given in which the detector 150 of the control device 100 detects, on the basis of the moving image of the user U1, that the line of sight of the user U1 changes in the "down" direction. However, the present disclosure is not limited thereto, and a configuration is possible in which the detector 150 detects that the line of sight of the user U1 changes in the "up" direction, the "left" direction, or the "right" direction, or does not change.

Modified Example 1 of Embodiment 4

In Embodiment 1, a description is given in which the detector 150 of the control device 100 detects, on the basis of whether or not a first answer that is an answer related to the video content is a correct answer, whether or not the video content has been watched by the user U1. Additionally, in Embodiment 4, a description is given in which the detector 150 of the control device 100 detects, on the basis of whether or not a change in the line of sight of the user U1 matches a change in a display position of an object in the video content, whether or not the video content has been watched by the user U1.

However, the present disclosure is not limited thereto, and Embodiment 1 and Embodiment 4 can be combined. Specifically, a configuration is possible in which the detector 150 of the control device 100 detects that the video content has been watched by the user U1 when the first answer is a correct answer and also the change in the line of sight of the user U1 matches the change in the display position of the object in the video content. Additionally, a configuration is possible in which the detector 150 detects that the video content has not been watched by the user U1 in at least one of the case in which the first answer is an incorrect answer, the case in which the change in the line of sight of the user U1 does not match the change in the video content, or the case in which the first answer is an incorrect answer and also the change in the line of sight of the user U1 does not match the change in the video content.

Additionally, the present disclosure is not limited thereto, and a configuration is possible in which the detector 150 of the control device 100 detects that the video content has been watched by the user U1 in at least one of the case in which the first answer is a correct answer, the case in which the change in the line of sight of the user U1 matches the change in the video content, or the case in which the first answer is a correct answer and also the change in the line of sight of the user U1 matches the change in the video content. Moreover, a configuration is possible in which the detector 150 detects that the video content has not been watched by the user U1 when the first answer is an incorrect answer and also the change in the line of sight of the user U1 does not match the change in the video content.

Embodiments 1 to 4, Modified Examples 1 to 16 of Embodiment 1, Modified Examples 1 of Embodiments 2 and 4, and Modified Examples 1 to 7 of Embodiment 3 can each be combined with each other. It is possible to provide a control device 100 that includes configurations for realizing the functions according to any of Embodiments 1 to 4, Modified Examples 1 to 15 of Embodiment 1, Modified Examples 1 of Embodiments 2 and 4, and Modified Examples 1 to 7 of Embodiment 3, and a control device 420 or 520 that includes configurations for realizing the functions according to Modified Example 16 of Embodiment 1. In addition, it is possible to provide a system that includes a plurality of devices that includes, as an overall system, configurations for realizing the functions according to any of Embodiments 1 to 4, Modified Examples 1 to 16 of Embodiment 1, Modified Examples 1 of Embodiments 2 and 4, and Modified Examples 1 to 7 of Embodiment 3.

Additionally, by applying a program, an existing control device can be made to function as the control device 100 according to each of Embodiments 1 to 4, Modified Examples 1 to 15 of Embodiment 1, Modified Examples 1 of Embodiments 2 and 4, and Modified Examples 1 to 7 of Embodiment 3. That is, by applying a program for realizing the various functional configurations of the control device 100 described in any of Embodiments 1 to 4, Modified Examples 1 to 15 of Embodiment 1, Modified Examples 1 of Embodiments 2 and 4, and Modified Examples 1 to 7 of Embodiment 3 so as to be executable by a computer (CPU or the like) that controls an existing control device, that existing control device can be caused to function as the control device 100 according to any of Embodiments 1 to 4, Modified Examples 1 to 15 of Embodiment 1, Modified Examples 1 of Embodiments 2 and 4, and Modified Examples 1 to 7 of Embodiment 3.

Furthermore, by applying a program, an existing control device can be made to function as the control device 420 or 520 according to Modified Example 16 of Embodiment 1. That is, by applying a program for realizing the various functional configurations of the control device 420 or 520 described in Modified Example 16 of Embodiment 1 so as to be executable by a computer (CPU or the like) that controls an existing control device, that existing control device can be caused to function as the control device 420 or 520 according to Modified Example 16 of Embodiment 1.

Any distribution method of such a program can be used. For example, the program can be stored and distributed on a recording medium such as a memory card, a compact disc read-only memory (CD-ROM), or a digital versatile disk read-only memory (DVD-ROM), or can be distributed via a communication medium such as the internet.

A method according to the present disclosure can be implemented using the storage system 1 according to any of Embodiments 1 to 4, Modified Examples 1 to 16 of Embodiment 1, Modified Examples 1 of Embodiments 2 and 4, and Modified Examples 1 to 7 of Embodiment 3. Additionally, the method according to the present disclosure can be implemented using the control device 100 according to any of Embodiments 1 to 4, Modified Examples 1 to 15 of Embodiment 1, Modified Examples 1 of Embodiments 2 and 4, and Modified Examples 1 to 7 of Embodiment 3, and the control devices 420 and 520 according to Modified Example 16 of Embodiment 1.

Preferred embodiments of the present disclosure have been described, but the present disclosure should not be construed as being limited to these specific embodiments. Various modifications and changes may be made within the broader spirit and scope of the invention as set forth in the claims.

APPENDICES

Appendix 1

A control device that controls a locker including a storage unit that stores an article, the control device including:
 a forbidder that forbids unlocking of the storage unit in at least one of a case in which content associated with the article has not been watched, a case in which the content has not been listened to, or a case in which the content has neither been watched nor listened to by a user that performs an operation for unlocking the storage unit.

Appendix 2

The control device according to appendix 1, further including:
 an allower that allows the unlocking in at least one of a case in which the content has been watched, a case in which the content has been listened to, or a case in which the content has been watched and listened to by the user.

Appendix 3

The control device according to appendix 2, further including:
 a storer that, in at least one of the case in which the content has been watched, the case in which the content has been listened to, or the case in which the content has been watched and listened to by the user, associates information identifying the user with information identifying the content stored in a storage in association with information identifying the article, and stores the associated information, wherein
 the forbidder forbids the unlocking when the information identifying the user is not associated with the information identifying the content, and
 the allower allows the unlocking when the information identifying the user is associated with the information identifying the content.

Appendix 4

The control device according to appendix 2 or 3, further including:
 an instructor that instructs the user to perform at least one of watching the content or listening to the content in at least one of the case in which the content has not been watched, the case in which the content has not been listened to, or the case in which the content has neither been watched nor listened to;
 an outputter that outputs the content; and
 a detector that detects at least one of that the outputted content has been watched or that the content has been listened to by the user, wherein
 the allower allows the unlocking when the at least one is detected.

Appendix 5

The control device according to appendix 4, wherein
 the outputter outputs a question related to the outputted content, and the detector detects the at least one of that the content has been watched or that the content has been listened to when an answer of the user to the outputted question is a correct answer.

Appendix 6

The control device according to appendix 4 or 5, further including:
an acquirer that acquires an image of the user, wherein the detector
detects, based on the acquired image, a line of sight of the user, and
detects, based on the detected line of sight, that the content has been watched.

Appendix 7

The control device according to any one of appendices 1 to 6, wherein when a first article that is the article and a second article that is an article different than the first article are stored in the locker, the forbidder forbids the unlocking in at least one of a case in which content that is associated with the first article and the second article and that includes a precaution related to a combination of the first article and the second article has not been watched, a case in which the content has not been listened to, or a case in which the content has neither been watched nor listened to by the user.

Appendix 8

A system including:
a locker that includes a storage unit that stores an article; and
a forbidder that forbids unlocking of the storage unit in at least one of a case in which content associated with the article has not been watched, a case in which the content has not been listened to, or a case in which the content has neither been watched nor listened to by a user that performs an operation for unlocking the storage unit.

Appendix 9

A method in which a control device or a system controls a locker that includes a storage unit that stores an article, the method including:
forbidding, by the control device or the system, unlocking of the storage unit in at least one of a case in which content associated with the article has not been watched, a case in which the content has not been listened to, or a case in which the content has neither been watched nor listened to by a user that performs an operation for unlocking the storage unit.

REFERENCE SIGNS LIST

1 Storage system
100, 320, 420, 520 Control device
101, 201, 321 CPU
102, 202, 322 RAM
103a, 203a, 323a ROM
103b Hard disk
104a, 204a, 324a Data communication circuit
105a, 205a Video card
105b, 205b Display device
105c, 205c Input device
110 Acquirer
120 Storer
130 Instructor
140 Outputter
150 Detector
160 Forbidder
170 Allower
200 Mobile terminal
203b, 323b Flash memory
205, 325 Touch screen
209a, 329a Speaker
209b, 329b Microphone
300, 460 Locker
310, 410, 510 Storage unit
311, 411 Door frame
312, 412 Door
313, 413 Deadbolt
314, 414 Strike plate
328 Drive circuit
400, 500 Delivery vehicle
431, 432 Wheel
440 Chassis
450, 480, 551 Imaging device
470 Robot arm
471 Gripper
472 Arm
531 to 534 Propeller arm
541 to 544 Propeller
549 Support leg
IN Internet

The invention claimed is:

1. A control device comprising:
at least one memory storing program code; and
at least one processor operable to read the program code and operate as instructed by the program code, wherein the program code includes:
instructing code configured to cause the at least one processor, in a case in which content associated with an article stored in a storage unit of a locker has not been watched or a case in which the content has neither been watched nor listened to by a user that performs an operation for unlocking the storage unit, to instruct the user to perform either (a) watching the content or (b) (i) watching and (ii) listening to the content;
outputting code configured to cause the at least one processor to output the content;
detecting code configured to cause the at least one processor to detect at least one of (a) that the outputted content has been watched or (b) that the content has been (i) watched and (ii) listened to by the user;
allowing code configured to cause the at least one processor to allow unlocking of the storage unit in (a) a case in which it is detected that the content has been watched or (b) a case in which it is detected that the content has been (i) watched and (ii) listened to; and
forbidding code configured to: cause the at least one processor to forbid the unlocking in (a) a case in which it is not detected that the content has been watched or (b) a case in which it is not detected that the content has been (i) watched and (ii) listened to,
the program code further includes acquiring code configured to cause the at least one processor to acquire an image of the user, and the detecting code is configured to cause the at least one processor to
  detect, based on the acquired image, a line of sight of the user, and
  detect, based on the detected line of sight, that the outputted content has been watched by the user.

2. The control device according to claim 1, wherein
the program code further includes a-storing code configured to cause the at least one processor, in (a) the case in which it is detected that the content has been watched, or (b) the case in which it is detected that the content has been (i) watched and (ii) listened to by the user, to associate information identifying the user with information identifying the content stored in a storage in association with information identifying the article, and to store the associated information,
the forbidding code is configured to cause the at least one processor to forbid the unlocking when the information identifying the user is not associated with the information identifying the content, and
the allowing code is configured to cause the at least one processor to allow the unlocking when the information identifying the user is associated with the information identifying the content.

3. The control device according to claim 2, wherein
the outputting code is configured to cause the at least one processor to output a question related to the outputted content,
the detecting code is configured to cause the at least one processor to detect the at least one of that the content has been watched or that the content has been listened to when an answer of the user to the outputted question is a correct answer, and
the storing code is configured to cause the at least one processor, in at least one of (a) the case in which it is detected that the content has been watched, (b) the case in which it is detected that the content has been (i) watched and (ii) listened to, and (c) a case in which it is detected that the content has been listened to by the user, to associate the information identifying the user with the information identifying the content.

4. The control device according to claim 2, wherein the forbidding code is configured to, when a first article that is the article and a second article that is an article different than the first article are stored in the locker, cause the at least one processor to forbid the unlocking in at least one of a case in which content that is associated with the first article and the second article and that includes a precaution related to a combination of the first article and the second article has not been watched, a case in which the content has not been listened to, or a case in which the content has neither been watched nor listened to by the user.

5. The control device according to claim 1, wherein
the outputting code is configured to cause the at least one processor to output a question related to the outputted content,
the detecting code is configured to cause the at least one processor to detect the at least one of that the content has been watched or that the content has been listened to when an answer of the user to the outputted question is a correct answer, and
the allowing code is configured to cause the at least one processor to allow the unlocking in at least one of (a) the case in which it is detected that the content has been watched, (b) the case in which it is detected that the content has been (i) watched and (ii) listened to, or (c) a case in which it is detected that the content has been listened to by the user.

6. The control device according to claim 1, wherein the forbidding code is configured to, when a first article that is the article and a second article that is an article different than the first article are stored in the locker, cause the at least one processor to forbid the unlocking in at least one of a case in which content that is associated with the first article and the second article and that includes a precaution related to a combination of the first article and the second article has not been watched, a case in which the content has not been listened to, or a case in which the content has neither been watched nor listened to by the user.

7. The control device according to claim 1, wherein
the content associated with the article is content that includes a precaution related to the article.

8. The control device according to claim 1, wherein
the content associated with the article includes at least one of a precaution for use of the article, a precaution for storage of the article, or a precaution for transportation of the article.

9. The control device according to claim 1, wherein
the content associated with the article is content that includes explanations related to the article, and
the explanations related to the article includes at least one of an explanation about how to transport the article, an explanation about how to store the article, or an explanation about how to use the article.

10. The control device according to claim 1, further comprising a communication circuit configured to
  receive, from the locker, unlock permission inquiry that inquires whether or not to allow the storage unit to be unlocked in accordance with the operation of the user, and
  transmit, to the locker, a forbid unlocking command that forbids the storage unit to be unlocked, when the unlocking of the storage unit is forbidden by the at least one processor.

11. The control device according to claim 1, further comprising a communication circuit configured to
  receive, from the locker, an unlock permission inquiry that inquires whether or not to allow the storage unit to be unlocked in accordance with the operation of the user, and
  transmit, to the locker, an allow unlocking notification that allows the storage unit to be unlocked, when the unlocking of the storage unit is allowed by the at least one processor.

12. A system comprising:
a locker that includes a storage unit configured to store an article;
at least one memory storing program code; and
at least one processor operable to read the program code and operate as instructed by the program code, wherein
the program code includes:
  forbidding code configured to, when a first article that is the article and a second article that is an article different than the first article are stored in the locker, cause the at least one processor to forbid unlocking of the storage unit in at least one of a case in which content that is associated with the first article and the second article and that includes a precaution related to a combination of the first article and the second article has not been watched, a case in which the content has not been listened to, a case in which the content has neither been watched nor listened to by a user that performs an operation for unlocking the storage unit of the locker, the storage unit storing the first article and the second article.

13. A control device comprising:

at least one memory storing program code; and at least one processor operable to read the program code and operate as instructed by the program code, wherein the program code includes:

forbidding code configured to, when a first article and a second article that is an article different than the first article are stored in a locker, cause the at least one processor to forbid unlocking of a storage unit in at least one of a case in which content that is associated with the first article and the second article and that includes a precaution related to a combination of the first article and the second article has not been watched, a case in which the content has not been listened to, or a case in which the content has neither been watched nor listened to by a user that performs an operation for unlocking the storage unit of the locker, the storage unit storing the first article and the second article.

14. The control device according to claim 13, wherein the program code further includes allowing code configured to cause the at least one processor to allow the unlocking in at least one of a case in which the content has been watched, a case in which the content has been listened to, or a case in which the content has been watched and listened to by the user.

15. The control device according to claim 14, wherein the program code further includes storing code configured to cause the at least one processor, in at least one of the case in which the content has been watched, the case in which the content has been listened to, or the case in which the content has been watched and listened to by the user, to associate information identifying the user with information identifying the content stored in a storage in association with information identifying the article, and to store the associated information, the forbidding code is configured to cause the at least one processor to forbid the unlocking when the information identifying the user is not associated with the information identifying the content, and the allowing code is configured to cause the at least one processor to allow the unlocking when the information identifying the user is associated with the information identifying the content.

16. The control device according to claim 14, wherein the program code further includes:

instructing code configured to cause the at least one processor to instruct the user to perform at least one of watching the content or listening to the content in at least one of the case in which the content has not been watched, the case in which the content has not been listened to, or the case in which the content has neither been watched nor listened to;

outputting code configured to cause the at least one processor to output the content; and detecting code configured to cause the at least one processor to detect at least one of that the outputted content has been watched or that the content has been listened to by the user, and the allowing code is configured to cause the at least one processor to allow the unlocking when the at least one is detected.

17. The control device according to claim 16, wherein the outputting code is configured to cause the at least one processor to output a question related to the outputted content, and the detecting code is configured to cause the at least one processor to detect the at least one of that the content has been watched or that the content has been listened to when an answer of the user to the outputted question is a correct answer.

* * * * *